(12) United States Patent
Yamazaki et al.

(10) Patent No.: US 6,266,113 B1
(45) Date of Patent: Jul. 24, 2001

(54) REFLECTION TYPE LIQUID CRYSTAL DISPLAY DEVICE

(75) Inventors: Osamu Yamazaki; Shunichi Motte; Teruo Ebihara; Shigeru Senbonmatsu; Kaori Taniguchi; Takakazu Fukuchi; Hiroshi Sakama; Masafumi Hoshino; Naotoshi Shino; Shuhei Yamamoto, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 08/879,286

(22) Filed: Jun. 19, 1997

(30) Foreign Application Priority Data

| Jun. 20, 1996 | (JP) | 8-160302 |
| Jul. 4, 1996 | (JP) | 8-175261 |
| Jul. 16, 1996 | (JP) | 8-186396 |
| Sep. 9, 1996 | (JP) | 8-237583 |
| Dec. 26, 1996 | (JP) | 8-347831 |
| May 29, 1997 | (JP) | 9-140712 |

(51) Int. Cl.[7] .................................................. G02F 1/1335
(52) U.S. Cl. .......................... 349/115; 349/105; 349/106; 349/88
(58) Field of Search .................... 349/106, 88, 115, 349/113, 105, 114

(56) References Cited

U.S. PATENT DOCUMENTS

| 5,317,431 | * | 5/1994 | Yoshida et al. | 359/51 |
| 5,452,113 | * | 9/1995 | Ikeno | 359/53 |
| 5,734,457 | * | 3/1998 | Mitsui et al. | 349/106 |

FOREIGN PATENT DOCUMENTS

| 2612423 | 9/1977 | (DE) . |
| 569922A1 | 11/1993 | (EP) . |
| WO 9003593 | 4/1990 | (WO) . |
| WO 9214182 | 8/1992 | (WO) . |
| WO 9323496 | 11/1993 | (WO) . |
| WO 9534834 | 12/1995 | (WO) . |

OTHER PUBLICATIONS

Patent Abstracts of Japan, vol.096, No. 003 Mar. 29, 1996.
Patent Abstracts of Japan, vol. 095, No. 006 Jul. 31, 1995.

* cited by examiner

Primary Examiner—Kenneth Parker
(74) Attorney, Agent, or Firm—Adams & Wilks

(57) ABSTRACT

A reflection type liquid crystal display device according to the present invention is constructed to include: a light modulation layer having a light scattering state changed when a voltage is applied between electrode faces; at least one kind of color separation layer arranged at the back of the liquid crystal; and a reflection layer arranged at the back of the color separation layer. The light modulation layer is a polymer network type polymer scattered liquid crystal layer or a phase conversion type liquid crystal layer, and the color separation mirror is a cholesteric liquid crystal polymer layer or a dielectric multi-layered thin film characterized to reflect a light within a predetermined wavelength range in the visible light region selectively. A reflection preventing layer and an ultraviolet ray cut-off layer are further arranged on the surfaces of the electrode faces.

96 Claims, 25 Drawing Sheets

REFLECTION TYPE LIQUID CRYSTAL DISPLAY DEVICE

BACKGROUND OF THE INVENTION

The present invention relates to a reflection type liquid crystal display device using a light scattering type liquid crystal display element which is capable of displaying bright and beautiful colors such as white as bright as paper white and of operating when being driven at a low voltage and with a small current, and which can be used, for example, in a clock, a mobile telephone or a mobile information terminal.

The liquid crystal display device is frequently used as a display panel in devices for various applications because it has excellent features such as a small thickness and a low power consumption.

The display modes of the liquid crystal display element are exemplified by one which makes use of the double refraction or the optical rotary power of the liquid crystal with one or two polarizing plates, as represented by the TN (Twisted Nematic) mode or the STN (Super Twisted Nematic) mode. The efficiency of using the light in the TN mode or in the STN mode is theoretically 50% or less to thereby present a dark display because of a light absorption loss by a polarizing plate.

There is another display system not using a polarizing plate instead but the light scattering characteristics of the liquid crystal, as represented by the phase conversion mode and the polymer dispersed mode. These light scattering modes need no polarizing plate and are thus without the optical absorption loss of the polarizing plate so that they can make effective use of the light to provide a bright display.

The polymer dispersed type liquid crystal display panel includes a multi-layered construction in which the liquid crystal material and the polymer material are phase-separated to disperse the liquid crystal in small droplets or in a minute continuous phase in the polymer layer, so that it is enabled to display an image by switching the scattering state and the transparent state in dependence on the existence of an electric field. The polymer dispersed type liquid crystal panel is disclosed in Japanese Patent Publication No. 52843/1991 or Japanese Patent Laid-Open No. 501512/1988 or 6150218/1986, for example.

As a means for coloring the light scattering mode liquid crystal panel, there has been proposed a method of arranging various mirrors or optical absorbing plates. At the back of the dynamic scattering mode light modulation layer, there are arranged a non-metallic multi-layered thin film (e.g., an interference filter) and a low lightness background substrate (e.g., a colored background plate), as disclosed in Japanese Patent Laid-Open No. 20749/1975. In Japanese Patent Laid-Open No. 10924/1984, likewise, a dichroic mirror and a bright color scattering reflection plate are arranged at the back of the phase conversion type or dynamic scattering mode display layer. In Japanese Patent Laid-Open No. 152029/1995, moreover, a color filter is arranged on the front face of a polymer dispersing type liquid crystal layer, and a selective reflection layer (e.g., an interference filter) and a scattering reflection layer for reflecting a white color or a color transmitted through the selective reflection layer are arranged at the back of the liquid crystal layer. According to the means common among those techniques, the non-metallic multi-layered thin film and the so-called "interference filter" such as the dichroic mirror or the selective reflection layer are arranged at the back of the light scattering mode display element whereas the scattering reflection plate such as paper or pain is arranged at the back of the interference filter, and the color filter is arranged in front of the light scattering mode display element. Moreover, the light scattering mode display element is exemplified by the liquid crystal in the light scattering mode such as the dynamic scattering mode (DSM), the phase conversion mode or the polymer dispersed mode.

However, the display device, as disclosed in Japanese Patent Laid-Open No. 20749/1975, 10924/1984 or 152029/1995, has the following defects.

Firstly, in the liquid crystal display device of the prior art, the liquid crystal of the light scattering mode such as the dynamic scattering mode (DSM), the phase conversion mode (PCM) or the polymer dispersed mode is used as the light scattering mode display element.

The dynamic scattering mode liquid crystal display device has problems in that it is driven by an electric current as much as by 10 to 100 times higher than the general TN mode or STN mode and that the reliability of the dynamic scattering mode itself is poor. Therefore, the dynamic scattering mode liquid crystal display device of the prior art is hard to mount in equipment especially of the type stressing high battery lifetime such as a watch or small-sized mobile equipment.

The phase conversion mode liquid crystal display device may use the thermal opaqueness for the scattering state. This thermal opaqueness is seriously deteriorated by the influence of external stress and the heat cycle. This problem makes it difficult to mount and use the phase conversion mode liquid crystal display device of the prior art in a small-sized mobile device such as a watch.

The polymer dispersed mode liquid crystal display device has been exemplified in the prior art by the liquid crystal display element having the micro-capsuled structure, in which a low-molecule nematic liquid crystal is confined in a high-molecule micro capsule, or the liquid crystal display element having the polymer matrix structure in which a low-molecule nematic liquid crystal is confined in a porous polymer matrix. In a polymer dispersed type liquid crystal display element having a structure in which the liquid crystal droplets are arranged in those polymers, however, the liquid crystal molecules are arranged along the polymer wall faces of the liquid crystal droplets so that the liquid crystal molecules in the vicinity of the polymer wall faces are seriously influenced by the polymer wall faces. As a result, the liquid crystal molecules cannot be easily arrayed, even if a voltage is applied, in the direction of the electric field but at an angle. For an obliquely incident light, therefore, an inconsistency occurs between the refractive index in the longitudinal direction of the liquid crystal molecules and the refractive index of the polymer so that a slight scattering cannot be avoided. This raises a problem in that an excellently transparent state cannot be achieved unless an extremely high voltage is applied. If the cell gap is increased to raise the scattering characteristics, moreover, the obliquely incident light is liable to be slightly scattered when the voltage is applied, and the display color turns opaque so that a clear color cannot be reconstructed to fail to retain the contrast. In the droplet type polymer dispersed type liquid crystal display element, on the other hand, the method of lowering the drive voltage is exemplified by reducing the cell gap. If the cell gap is reduced to 10 microns or less, for example, the scattering state is seriously deteriorated to fail to reach the practical level. This makes it difficult for the droplet type polymer dispersed type liquid crystal display element to make a sufficient scattered state and transparent state compatible and to realize an excellent contrast. This makes it difficult for the droplet type polymer scattered type liquid crystal display element of the prior art to be mounted and practiced in a small-sized mobile device of low voltage and power consumption type such as the watch.

Secondly, in the liquid crystal display device having a structure in which the liquid crystal display element of the aforementioned light scattering mode of the prior art such as the dynamic scattering mode (DSM), the phase conversion mode (PCM) or the droplet type polymer scattered mode is used as a light modulation layer and in which an interference filter and a scattering reflection layer are arranged at the back, the light scattering layer has weak scattering characteristics so that the light having passed through the color separation layer is scattered and reflected, when no voltage is applied (i.e., in the scattering state), by the scattering/reflecting layer. Because of a serious influence of the scattered and reflected light, the region in the scattering state is colored to the same color as that of the light having passed through the color separation layer. In short, there arises a problem in that a color as white as paper white cannot be realized, namely, that the background which should be intrinsically white is colored. Another problem is the dependency of color on the visual sense.

In the case of the reflection type liquid crystal display device having the structure in which the droplet type polymer dispersed type liquid crystal layer is used as the light modulation layer and in which the interference filter and the mirror layer as the reflection layer are arranged at the back, with no application of voltage (i.e., in the transparent state), the liquid crystal molecules can be arrayed not in the field direction but at an angle to cause an inconsistency between the longitudinal refractive index of the liquid crystal molecules and the refractive index of the polymer thereby to leave a slight dispersion. As a result, the regularly reflected light is diffused with a width to raise a problem in that the invisible range is widened, and the diffused color is mixed with the color having passed through the color separation layer to raise the problem that the color purity drops.

Thirdly, in the case of the reflection liquid crystal display device, because of an unnecessary reflection of an ambient light on the liquid crystal panel surface, there arises a problem in that the displayed content is hard to view and that the use efficiency of the ambient light drops.

Moreover, the ambient light contains an ultraviolet ray so that the liquid crystal display device of the light scattering mode of the prior art, as weak to the ultraviolet ray, is troubled by a problem in that the light modulation layer is deteriorated by the ultraviolet ray.

SUMMARY OF THE INVENTION

It is, therefore, an object of the present invention to provide a reflection type liquid crystal display device which has excellent scattering characteristics and which can be driven by a remarkably low voltage so that it can realize a display of high quality in high contrast and in an excellent color purity.

Another object is to provide a reflection type liquid crystal display device which can be manufactured at a low cost.

Still another object is to provide a reflection type liquid crystal display device which is given a high reliability by improving the poor visibility, as caused by the reflection of an ambient light, of the displayed content and by preventing the light modulation layer from being deteriorated by an ultraviolet ray.

A further object is to provide a reflection type liquid crystal display device of low power consumption type for realizing a bright display, which is enabled to store an optical energy, when the atmosphere is bright, and to emit a light, when the atmosphere is dark, by using a reflection layer having photo-storage characteristics so that the display can be viewed even in the dark atmosphere.

A further object is to provide a reflection type liquid crystal display device which is enabled to convert the light such as the ultraviolet ray within a wavelength range invisible to human eyes efficiently into a light in a visible range and to realize a brighter and clear display by using a reflection layer having fluorescent characteristics.

In order to achieve the above-specified objects, there is provided according to the present invention a reflection type liquid crystal display device in which the light modulation layer is controlled into a light scattering state or a light transmitting state by a voltage applied between the electrode faces, and which comprises: at least one kind of color separation layer mounted at the back of the light modulation layer; and a reflection layer mounted at the back of the color separation layer. Moreover, the reflection type liquid crystal display device can be characterized by at least one of the following items.

a) The light modulation layer is a polymer dispersed type liquid crystal layer or a phase conversion type liquid crystal layer having a light scattering state changed when the voltage is applied.

b) The polymer dispersed type liquid crystal layer has a structure including a liquid crystal material forming a continuous layer and a three-dimensional net-shaped photo-setting resin in the continuous layer.

c) The phase conversion type liquid crystal layer has a structure including a planar texture or a focal conic texture stabilized by a three-dimensional net-shape photo-setting resin dispersed in a liquid crystal material.

d) The color separation layer is made of a cholesteric liquid crystal polymer layer characterized to reflect a light of a predetermined wavelength range selectively.

e) The color separation layer, as made of the cholesteric liquid crystal polymer layer, is prepared: by making a fundamental reflection unit of a construction, in which a cholesteric liquid crystal polymer layer for selectively reflecting a clockwise circular polarized light within a predetermined wavelength range in a visible light region and a cholesteric liquid crystal polymer layer for selectively reflecting a counter-clockwise circular polarized light of the same wavelength as the wavelength range are arranged to have their optical axes in parallel; and by laminating at least one fundamental reflection unit of cholesteric liquid crystal polymer layers having different selective reflection wavelength ranges in the visible light region.

f) The color separation layer, as made of the cholesteric liquid crystal polymer layer, is prepared: by making a fundamental reflection unit of a construction, in which a cholesteric liquid crystal polymer layer for selectively reflecting a clockwise circular polarized light within a predetermined wavelength range in a visible light region and a cholesteric liquid crystal polymer layer for selectively reflecting a counter-clockwise circular polarized light of the same wavelength as the wavelength range are arranged to have their optical axes in parallel; and by arranging in a common plane a plurality of regions of the fundamental reflection unit of cholesteric liquid crystal polymer layers having different selective reflection wavelength ranges in the visible light region.

g) The color separation layer, as made of the cholesteric liquid crystal polymer layer, is prepared by making in a common plane a plurality of and laminating at least one fundamental reflection unit of cholesteric liquid crystal polymer layers having different selective reflection wavelength ranges in the visible light region.

h) The color separation layer, as made of the cholesteric liquid crystal polymer layer, is prepared: by making a fundamental reflection unit of a construction, in which between two cholesteric liquid crystal polymer layers overlapped to have parallel optical axes for selectively reflecting circular polarized lights within a predetermined equal wavelength range in the visible light region and in the same turning direction, there is sandwiched a conversion element for the phase of the light within the predetermined identical wavelength range by 180 degrees; and by laminating at least one fundamental reflection unit of cholesteric liquid crystal polymer layers having different selective reflection wavelength ranges in the visible light region.

i) The color separation layer, as made of the cholesteric liquid crystal polymer layer, is prepared: by making a fundamental reflection unit of a construction, in which between two cholesteric liquid crystal polymer layers overlapped to have parallel optical axes for selectively reflecting circular polarized lights within a predetermined equal wavelength range in the visible light region and in the same turning direction, there is sandwiched a conversion element for the phase of the light within the predetermined identical wavelength range by 180 degrees; and by arranging in a common plane a plurality of regions of the fundamental reflection unit of cholesteric liquid crystal polymer layers having different selective reflection wavelength ranges in the visible light region.

j) The color separation layer, as made of the cholesteric liquid crystal polymer layer, is prepared by making in a common plane a plurality of and laminating at least one fundamental reflection unit of cholesteric liquid crystal polymer layers having different selective reflection wavelength ranges in the visible light region.

k) The color separation layer is made of a dielectric multi-layered thin film characterized to transmit a light within a predetermined wavelength range and to reflect the remaining lights.

l) The color separation layer is made of a dielectric multi-layered thin film characterized to transmit a light within a predetermined wavelength range in the visible light region and an ultraviolet ray within a wavelength range of 370 nm to 400 nm and to reflect the remaining lights.

m) The color separation layer is patterned in one or at least two kinds.

n) The pattern of the color separation layer has multi-color segments.

o) The reflection layer is a diffuse reflection layer having a uniform diffuse reflectivity over the whole wavelength in the visible light region and high characteristics.

p) The reflection layer has photo-storing characteristics.

q) The reflection layer has fluorescent characteristics.

r) The color separation layer is a hologram layer, and the reflection layer is a mirror layer.

s) The hologram layer is a Bragg reflection layer.

t) The Bragg reflection layer is a volume hologram.

u) The interference fringe of the volume hologram has an angle of no more than 30 degrees with respect to the electrode faces.

v) The mirror layer is a metallic or dielectric multi-layered film containing at least one of a metal selected from the group consisting of aluminum, silver, nickel, chromium, palladium and rhodium, its alloy or its oxide.

w) A reflection preventing layer and an ultraviolet ray cut-off layer are arranged on the closest one of the paired electrode faces to an observer for absorbing or reflecting an ultraviolet ray harmful to the liquid crystal.

x) The ultraviolet ray cut-off layer is characterized to absorb or reflect an ultraviolet ray of a wavelength no more than 370 nm and to transmit the remaining lights.

According to the above-specified constructions of the present invention, the scattering characteristics of the light modulation layer are drastically improved, and driving at a remarkably low voltage can be performed while improving the contrast ratio between the optically scattered state and the transparent state, thereby to provide a reflection type liquid crystal display device capable of realizing a display in white as bright as the paper white and of highly pure color quality.

When the cholesteric liquid crystal polymer layer is used as the color separation layer, moreover, it can be prepared with a less expensive material and at a lower cost by a relatively easy process as compared to other color separation layers, thereby to provide a reflection type liquid crystal display device which can be manufactured at a far lower cost.

Moreover, it is possible to provide a reflection type liquid crystal display device which is enabled to have a high reliability by improving the poor visibility, as might otherwise be caused by the reflection of the ambient light, of the displayed content and by preventing the light modulation layer from being deteriorated by the ultraviolet ray.

It is further possible to provide a reflection type liquid crystal display device of power economy type and bright display state, in which the reflection layer, if used, having the photo-storage characteristics can emit a light by its own characteristics, when the atmosphere is dark, so that the display can be viewed even in a dark atmosphere.

It is further possible to provide a reflection type liquid crystal device which is enabled by using the reflection layer having fluorescent characteristics to convert the light within the wavelength range invisible to human eyes, efficiently into a light in the visible light region thereby to realize a brighter and clearer display.

Figure 1:
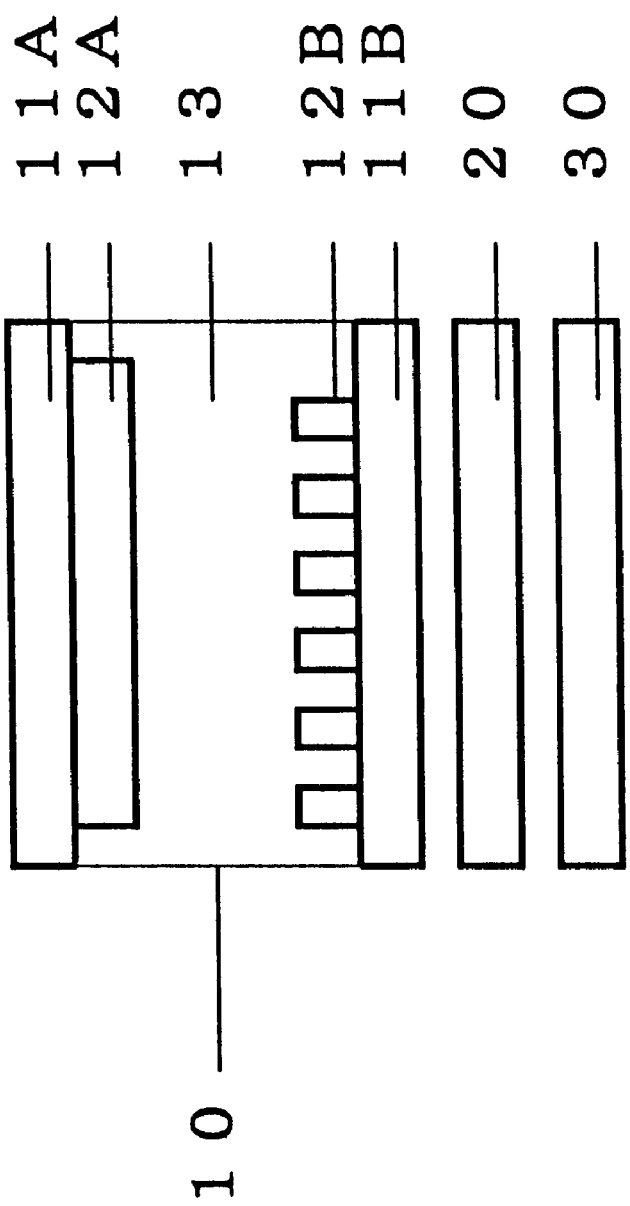
FIG. 1 is a section showing a structure of a reflection type liquid crystal device in a light scattering mode according to an embodiment of the present invention.

| Designations of Reference Characters | |
|---|---|
| 2R, 2G, 2B | Color Separation Layer |
| 3 | Optically Diffuse Reflection Layer |
| 5 | Polymer Dispersed Liquid Crystal Layer |
| 13 | Light Modulation Layer |
| 20, 20R, 20G, 20B | Color Separation Layer |
| 20A | Interference Fringes |
| 20B | Volume Hologram |
| 21R | Bragg Reflection Layer |
| 30 | Reflecting Layer |
| 40 | Antireflection Layer |
| 45 | Ultraviolet Cutoff Layer |
| L1 | Incident Light |
| L2 | Backward Scattered Light |
| L3, L5, L8, L10 | Forward Scattered Light |
| L4 | Reflected Light |
| L6 | Transmitted Light |
| L7, L9 | Diffusely Reflected Light |

DETAILED DESCRIPTION OF THE PREFERRED EMBODIMENTS

Hereinafter will be described an example of a fundamental construction of a reflection type liquid crystal display device of the present invention.

A light modulation layer to be used in the present invention employs a liquid crystal display element in a light scattering mode, in which a light scattering state is changed by applying a voltage. In this liquid crystal display element in the light scattering mode, the light scattering mode liquid crystal layer such as a polymer network type polymer dispersed type liquid crystal layer or a phase conversion type liquid crystal layer is sandwiched between substrates provided with transparent electrodes.

These transparent electrodes may be so patterned on the whole or partial face of at least one of the substrates that they can display characters or seven segments or display a dot matrix.

This pattern may be provided at the unit of pixel with an active element such as a diode or a transistor.

The substrates can be made of glass or flexible plastics.

On the other hand, the light scattering mode liquid crystal display element is equipped with means for applying an image signal to the transparent electrode so that it is brought into a light transmitting state, when the applied voltage level is high, and into a scattered state when the applied voltage level is lower. Alternatively, the liquid crystal display element may come into the scattered state, when the applied voltage level is high, and into the light transmitting state when the applied voltage level is lower.

On the other hand, the polymer dispersed type liquid crystal layer to be used as the light modulation layer of the present invention is made of neither the micro-capsuled nematic liquid crystals nor the small liquid crystal droplets dispersed in a resin matrix, as disclosed in Japanese Patent Publication No. 52843/1991 or 501512/1988, but a polymer network type liquid crystal layer having a structure in which the liquid crystal forms a continuous layer having a photo-setting resin of a three-dimensional net structure therein. In this polymer network type liquid crystal layer, the ratio of the liquid crystal to the photo-setting resin may preferably be within a range of 60 to 99%, and the pore size of the three-dimensional net structure may preferably be equal to 0.5 to 3.5 microns or the wavelength of the light with less dispersion. Thus, it is possible to realize a light modulation layer which is far superior in the light scattering characteristics to those of the light modulation layer of the micro-capsuled nematic liquid crystal or the liquid crystal droplets dispersed in the resin matrix and which can lower the voltage drastically.

In the phase conversion type liquid crystal layer to be employed as the light modulation layer of the present invention, on the other hand, the so-called "cholesteric/nematic phase conversion type liquid crystal layer", in which the chiral agent is mixed with the nematic liquid crystal having a positive or negative dielectric anisotropy, is used in the cells which are oriented vertically or horizontally. Another preferable one is the polymer-stabilized phase conversion type liquid crystal layer which is given a structure having a planar texture or focal-conic texture stabilized by the three-dimensional net shaped photo-setting resin dispersed in the cholesteric/nematic phase conversion type liquid crystal. The nematic liquid crystal can be exemplified by any one of cyano, fluorine or chlorine. Any liquid crystal is desired to have high $\Delta n$ and $\Delta \epsilon$ characteristics. Moreover, the chiral agent has no limitation. The photo-setting resin may be a precursor of a polymer resin of meta-acryloyls, acrylates or meta-acrylates, that is, a precursor of a polymer resin having a copolymerizable photo-polymerizing group. A photo-polymerization initiator may be added. The photo-setting resin is desirably within a range of 0.5% to 8% in the cholesteric/nematic liquid crystal. Excessive addition raises the drive voltage. The mixing ratio between the nematic liquid crystal and the chiral agent may desirably be set to give a chiral pitch of 0.2 to 5.0 microns.

On the other hand, the cholesteric liquid crystal polymer layer to be employed as the color separation layer of the present invention takes a helical structure in which the orientation of the directors indicating the average orientation of the liquid crystal molecules is continuously clockwise or counter-clockwise. The cholesteric liquid crystal polymer layer is characterized to selectively reflect only the light which is helically (or circularly) polarized in the turning direction according to the direction of the helical axis and which has a wavelength $\lambda$ within a range, as expressed by the following Formula 1, if it has a helical structure pitch p and a refractive index (n1, n2) and if the incident angle of the incident angle upon the helical face of the cholesteric liquid crystal polymer layer is $\theta$:

$$p \times n2 \times \sin\theta < \lambda < p \times n1 \times \sin\theta \quad \text{[Formula 1]}.$$

Of the refractive indexes n1 and n2, as taken in parallel with and at a right angle with respect to the director and indicating the orientation of the cholesteric liquid crystal polymer layer, the former n1 has a larger refractive index whereas the latter n2 has a smaller refractive index. Since the wavelength range of the selective reflection is sufficiently narrow, the reflected light is colored.

As apparent from Formula 1, the selective reflection wavelength $\lambda$ is related to the refractive indexes (n1, n2) and the helical pitch p of the layer itself. Since the refractive indexes (n1, n2) ordinarily takes substantially constant values, the selective reflection wavelength $\lambda$ can be set to an arbitrary value by varying the helical pitch p.

For n1=1.73, n2=1.51 ($\Delta n$=0.22) and p=265 nm, for example, the wavelength range of the selective reflection is given a range of 400 to 458 nm and a width of 58 nm for a normally incident light by the Formula 1.

For n1=1.76 n2=1.51 ($\Delta n$=0.25 and p=338, on the other hand, the wavelength range of the selective reflection is given a range of 510 to 595 nm and a width of 85 nm for a normally incident light.

By thus adjusting the refractive indexes (n1, n2, $\Delta n$) and the helical pitch p of the cholesteric liquid crystal polymer layer, it is possible to arbitrarily form the cholesteric liquid crystal polymer layer which has the wavelength range of selective reflections corresponding to the blue (B), green (G) and red (R) colors.

Figure 7:
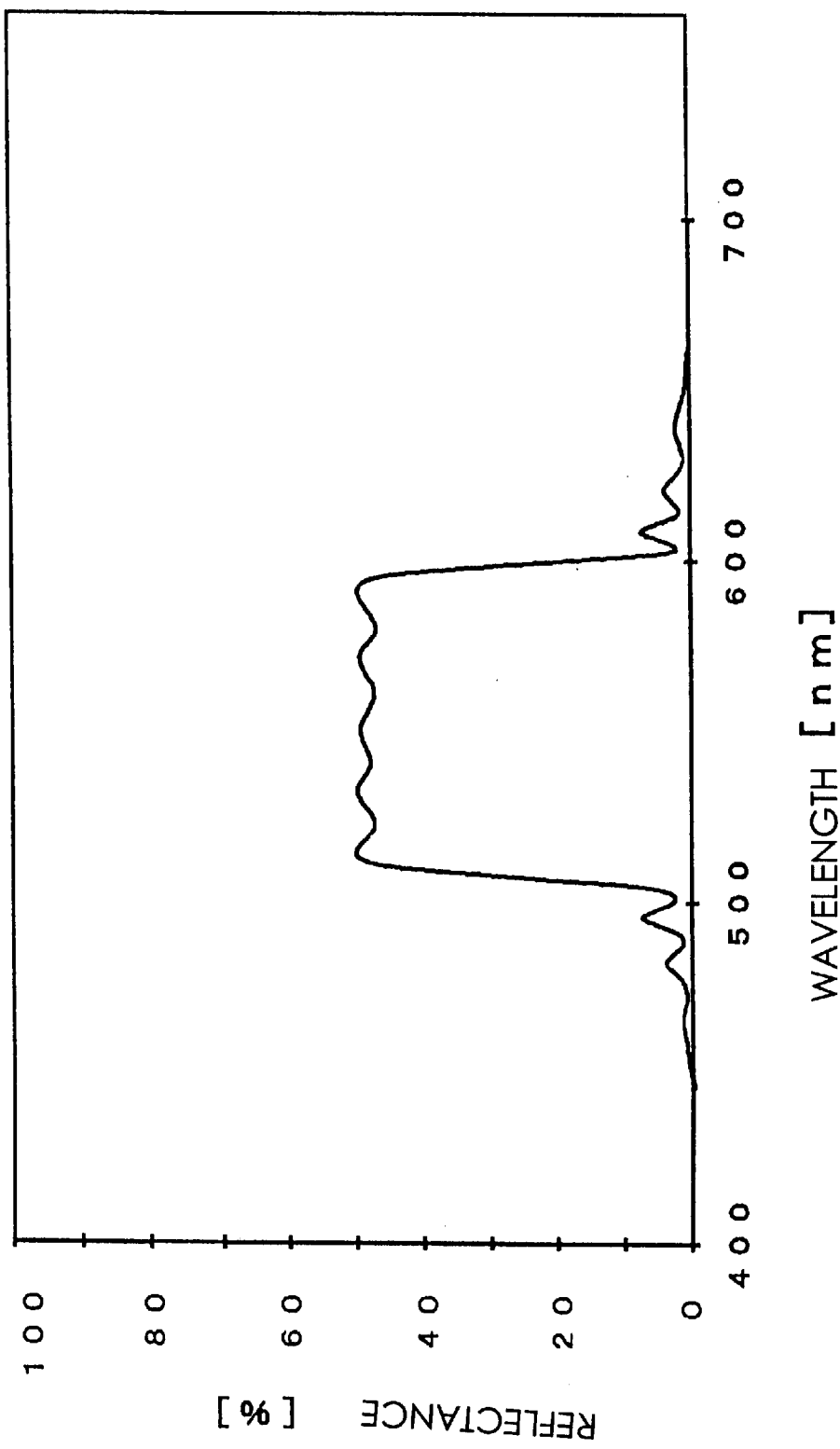
FIG. 7 illustrates one example of reflection spectrum diagram of the cholesteric liquid crystal polymer layer.

FIG. 7 illustrates one example of the reflection spectrum of the cholesteric liquid crystal polymer layer. As apparent from FIG. 7, the reflectivity is as high as about 50% over a wavelength of 510 nm to 595 microns and exhibits considerably sharp rising and falling characteristics.

Here, of the elliptical (or circular) polarized components of the incident light, the clockwise elliptical (or circular) polarized component is reflected, if the helical structure of the cholesteric liquid crystal polymer layer has the clockwise turning direction, and the counter-clockwise elliptical (or circular) polarized component is reflected if the helical structure has the clockwise turning direction.

The color separation layer thus constructed of the cholesteric liquid crystal polymer layer by making use of those characteristics is the color separation layer which is made by laminating at least one of the following fundamental reflection units A of the cholesteric liquid crystal polymer layers having different selective reflection wavelengths of the visible light region. This fundamental reflection unit A is constructed by arranging the cholesteric liquid crystal polymer layer for selectively reflecting the clockwise circular polarized light having a predetermined wavelength range in the visible light region and cholesteric liquid crystal polymer layer for selectively reflecting the counter-clockwise polarized light having the same wavelength as the predetermined wavelength range, such that their optical axes are parallel to each other. By this construction, both the clockwise and counter-clockwise circular polarized lights within the predetermined wavelength ranges of the incident light can be reflected so that the light within the predetermined wavelength range of the incident light can be exclusively reflected highly efficiently at a reflectivity as high as 100%.

As a result, the various color displays can be reproduced by forming a cholesteric liquid crystal polymer layer which is enabled to reflect light of a predetermined wavelength range highly efficiently with a reflectivity as high as 100%, by so laminating a plurality of the fundamental reflection units A having wavelength ranges of selective reflections corresponding to the blue (B), green (G) and red (R) colors by changing the helical pitches that their optical axes are in parallel.

The color separation layer may be given another structure in which a plurality of regions of fundamental reflection units A of the cholesteric liquid crystal polymer layers having different selective reflection wavelengths of the visible light region are arranged in a common plane. In other words, a multi-color display can be realized by combining two or more colors of cholesteric liquid crystal polymer layers having wavelength ranges of selective reflection corresponding to the blue (B), green (G) and red (R) colors by changing the helical pitches, to form the polymer layers in a stripe or mosaic shape in a common plane.

Still moreover, a multi-color display of an arbitrary color can be realized by laminating at least one of the fundamental reflection units A and by forming the fundamental reflection units A having different selective reflection wavelength ranges of the visible light region in combination of two or more colors in the stripe or mosaic shape.

In another example, the color separation layer constructed of cholesteric liquid crystal polymer layers is a color separation layer which is formed by laminating at least one of the following fundamental reflection units of cholesteric liquid crystal polymer layers having different selective reflection wavelengths of the visible light region. The fundamental reflection unit B is constructed by sandwiching between two cholesteric liquid crystal polymer layers, which are overlapped to have parallel optical axes thereby to selectively reflect the circular polarized lights of the same turning direction (e.g., clockwise) having predetermined equal wavelengths in the visible light region, a conversion element (as will be called the "½ wavelength plate") for converting light of the same predetermined wavelength by 180 degrees. By this construction, the circular polarized component (e.g., the clockwise circular polarized component) of the incident light within the predetermined wavelength range is selectively reflected by the first-layered cholesteric liquid crystal polymer layer, but the counter-clockwise polarized component within the predetermined wavelength range is transmitted. This counter-clockwise circular polarized component is converted in phase by 180 degrees into the clockwise circular polarized light by the ½ wavelength plate for converting the phase of the light within the predetermined wavelength range by 180 degrees. This clockwise circular polarized component is selectively reflected by the second-layered cholesteric liquid crystal polymer layer. As a result, only incident light within the predetermined wavelength range can be highly efficiently reflected at a reflectivity as high as 100%.

As a result, the various color displays can be reconstructed by forming a cholesteric liquid crystal polymer layer which is enabled to reflect light of a predetermined wavelength range highly efficiently at a reflectivity as high as 100%, by so laminating a plurality of the fundamental reflection units B having wavelength ranges of selective reflections corresponding to the blue (B), green (G) and red (R) colors by changing the helical pitches so that their optical axes are parallel.

In order to achieve the multi-color display, moreover, the color separation layer can be given another structure in which a plurality of regions of fundamental reflection units B of the cholesteric liquid crystal polymer layers having different selective reflection wavelengths of the visible light region are arranged in a common plane. As a result, a multi-color display can be realized by combining two or more colors of cholesteric liquid crystal polymer layers having wavelength ranges of selective reflections corresponding to the blue (B), green (G) and red (R) colors by changing the helical pitches, to form the polymer layers in a stripe or mosaic shape in a common plane.

Still moreover, a multi-color display of an arbitrary color can be realized by laminating at least one of the fundamental reflection units B and by forming the fundamental reflection units B having different selective reflection wavelength ranges of the visible light region in combination of two or more colors in a stripe or mosaic shape.

On the other hand, the color separation layer may be positioned at the back of the light modulation layer, or in front and at the back of the transparent electrodes or the substrates. By mounting the light scattering mode display element, on the other hand, the color separation layer, as separately formed on the transparent substrate, may be arranged in close contact with the light scattering mode display element. The color separation layer may be formed on a base forming the reflection layer.

On the other hand, one or more colors of the lights to pass through the color separation layer may be two-dimensionally arranged. According to the present process, the multi-color display can be achieved by forming either a pattern capable of displaying characters or seven segments corresponding to the transparent electrodes, or a pattern capable of displaying dot matrixes, in combination of two or more colors in a common plane in a manner so as to correspond to the individual pixels.

On the other hand, the reflection layer to be employed in the present invention may be a diffuse reflection layer, i.e., a white diffuse reflection layer having a uniform diffuse reflectivity and high characteristics over the whole wavelength in the visible light region. The white diffuse reflection layer plays an important role in the realization of clear colors of high purity. In order to realize clear colors of high purity, it is desirable to use the diffuse reflection layer (i.e., the white diffuse reflection layer) which has a uniform diffuse reflectivity over the whole wavelength in the visible light region and high characteristics. On the other hand, the diffuse reflection layer desirably has sufficient a so thickness as not to be influenced by the color of an object at the back of the diffuse reflection layer. The white diffuse reflection layer, which is excellent in the diffuse reflectivity characteristics for realizing clear colors of high purity, may be exemplified by either a white diffuse reflection layer, which is made of another polymer film having a uniform diffuse reflectivity over the whole wavelength in the visible light region and high characteristics, or a white diffuse reflection layer which is made of an inorganic substance such as powder of barium sulfate. This white diffuse reflection layer may be commercially available as the polyester film "Lumirror E60L" (having a thickness: 188 microns) from Toray Industries, Inc. Another white diffuse reflection layer having a uniform diffuse reflectivity over the whole wavelength in the visible light region and high characteristics may be formed by coating the surface of a metallic film such as silver (Ag) or Aluminum (Al) having a high reflectivity in the visible light region, with splashed glass beads having a predetermined particle diameter.

On the other hand, the reflection layer to be employed in the present invention may be a reflection layer having photo-storage characteristics. By making the reflection layer of a material having the photo-storage characteristics to store the light energy when the surrounding atmosphere is bright, the reflection layer itself can emit a light to realize a bright display face even when the atmosphere becomes dark. The material having the photo-storage characteristics can be exemplified by the material (e.g., the product of Nemoto & Co., Ltd.) which is prepared by adding a rare earth element to the mother crystal of strontium aluminate $SrAl_2O_4$.

On the other hand, the reflection layer to be employed in the present invention may be a reflection layer having fluorescent characteristics. The fluorescent reflection layer emits a light, when stimulated by irradiating a daylight (of sunshine) or an artificial light such as a fluorescent lamp or mercury lamp, and stops the emission when not stimulated. As a result, by using the reflection layer having the fluorescent characteristics to transform a light such as an ultraviolet ray in the wavelength range invisible to human eyes highly efficiently into a light in the visible range, so that the brightness of the reflection layer can be further improved to improve the brightness of the reflection type liquid crystal display device better.

Examples of the fundamental construction of the reflection type liquid crystal display device of the present invention will be sequentially described with reference to the accompanying drawings.

I) One example of the fundamental construction of the reflection type liquid crystal display device of the present invention will be described with reference to FIGS. 1, 2 and 3, in which a light scattering mode liquid crystal display element (e.g., a polymer network type polymer dispersed type liquid crystal element) is used as the light modulation layer and in which the color separation layer is combined with the technique of the white diffuse reflection layer as the reflection layer.

FIG. 1 is a section of a reflection type liquid crystal display device of Embodiment 1 of the present invention; FIG. 2 is an explanatory diagram of the display principle in the case of a scattered state (with no voltage being applied); and FIG. 3 is an explanatory diagram of the display principle in the case of a transparent state (with a voltage being applied).

As shown in FIG. 1, a liquid crystal panel 10 is constructed to include a pair of transparent substrates 11a and 11B equipped with transparent electrodes 12A and 12B, and an optically scattering light modulation layer 13 sandwiched between the transparent substrates 11A and 11B and containing a nematic liquid crystal material having a positive dielectric anisotropy. At the back of the liquid crystal panel 10 (as located at the lower side in FIG. 1), there is arranged a color separation layer 20, at the back of which is arranged a reflection layer 30 (as will be the white diffuse reflection layer 30) having a uniform diffuse reflectivity over the whole wavelength in the visible light region and high characteristics.

Here will be described the case in which the light modulation layer 13 is a polymer network type polymer dispersed liquid crystal layer 13'.

Figure 2:
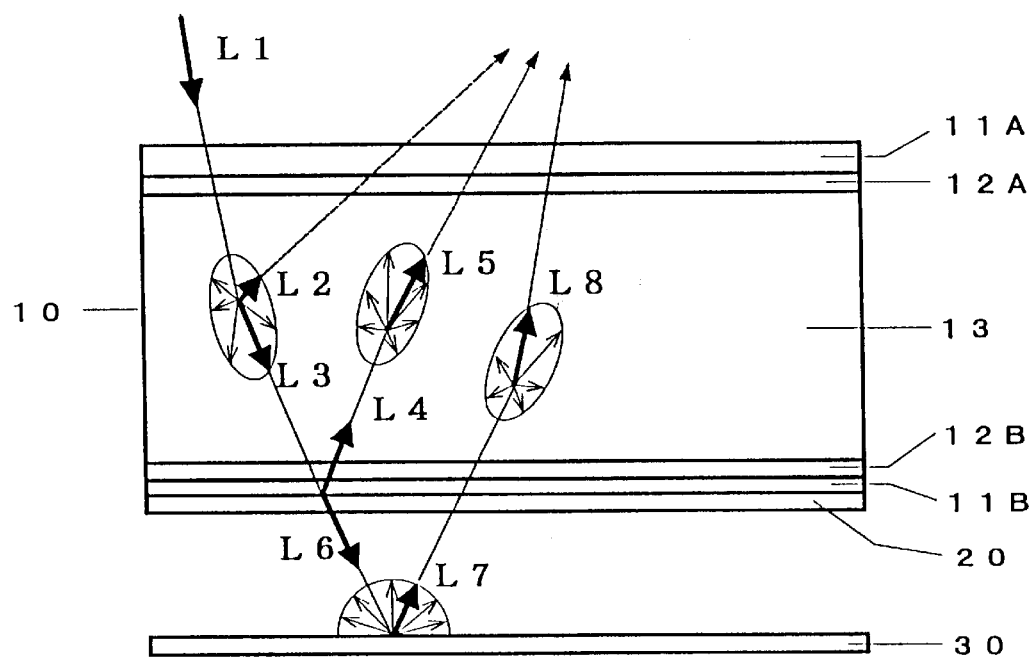
FIG. 2 is an explanatory diagram of a display when a light modulation layer is in a light scattering state.

In the scattered state (with no voltage being applied), as shown in FIG. 2, no voltage is applied so that the liquid crystal molecules are oriented in various direction. In this state, the light coming into the polymer dispersed liquid crystal layer 13' is scattered by the light scattering action at the interface between the liquid crystals and the polymer. With no application of voltage, a light L1 coming from the outside is scattered by the polymer dispersed liquid crystal layer 13'. A portion of the backward scattered light L2 of the incident light L1 advances in a viewing direction to reach the eyes of an observer SO. Here in the optically scattered state of the light modulation layer such as the polymer dispersed liquid crystal layer 13', the ratio of the forward scattered lights is generally considerably high. The light at this considerable ratio of the incident light becomes a forward scattered light L3 to go into the color separation layer 20.

The color separation layer 20 is exemplified by a mirror which is characterized to have an extremely small optical absorption loss and excellent optical reflecting/transmitting characteristics.

The color separation layer 20 is characterized to transmit a light within a predetermined wavelength range in the visible light region and to reflect the other visible lights.

Of the forward scattered lights L3 incident on the color separation layer 20, therefore, the light other than the transmitted light within the predetermined wavelength range is highly efficiently reflected (as at L4) by the color separation layer 20. The light (L4), as reflected by the color separation layer 20, goes again into the polymer dispersed liquid crystal layer 13' and is scattered by this liquid crystal layer 13' until it reaches the eyes of the observer SO as a forward scattered light L5 having a relatively high optical density.

On the other hand, a light (L6) of a predetermined wavelength, as having passed through the color separation layer 20, goes into the reflection layer 30. This reflection layer 30 plays a remarkably important role in the reconstruction of a clear color of high purity. In order to reconstruct this clear color of high purity, therefore, the reflection layer may preferably be exemplified by that (i.e., the white diffuse reflection layer) having a uniform diffuse reflectivity over the whole wavelength in the visible light region and high characteristics.

This white diffuse reflection layer 30 diffuses and reflects the incident light L6 isotropically and highly efficiently (as indicated at L7). This diffused and reflected light L7 is transmitted again through the color separation layer 20 and goes into the polymer dispersed liquid crystal layer 13' so that it is scattered by this liquid crystal layer 13', until it reaches the eyes of the observer SO as a forward scattered light L8 of a relatively high optical intensity.

In the present embodiment, the color separation layer 20 is exemplified by a mirror which is characterized to have an extremely small optical absorption loss and excellent light reflecting/transmitting characteristics.

As a result, the incident light L1 is scattered by the light modulation layer into the backward scattered light L2 and the forward scattered lights L5 and L8, which are subjected to little absorption loss, so that the lights (L2+L5+L8) synthesized by the scattered lights have an optical intensity as high as that of the incident light. Moreover, this uncolored white light of high brightness is observed by the observer SO. In other words, the incident light coming from the outside is hardly lost by the optical absorption, and most can be effectively exploited as the white brightness to realize a highly bright and pure white color.

Figure 3:
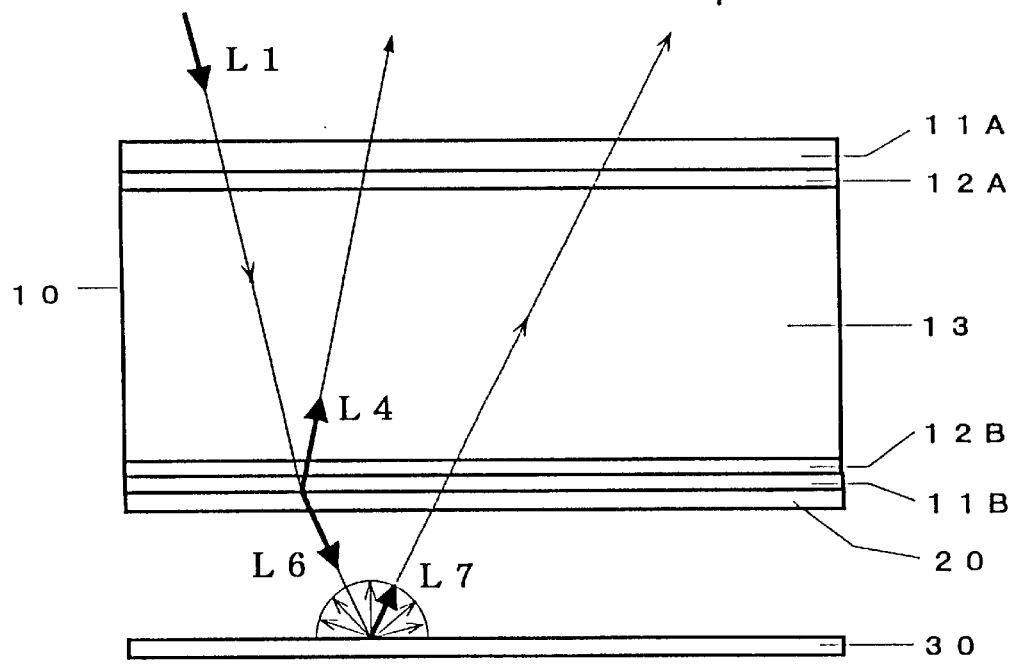
FIG. 3 is an explanatory diagram of a display when a light modulation layer is in a light transmitting state.

In the transparent state (with the application of voltage) as shown in FIG. 3, when a voltage higher than the saturation level of the liquid crystal is applied between the transparent electrodes 12A and 12B, the liquid crystal molecules are arrayed generally normal to the faces of the substrates 11A and 11B. In this state, the light scattering action disappears at the interface of the liquid crystal and the polymer so that the polymer dispersed liquid crystal layer 13' becomes transparent. As a result, the light L1 coming from the outside is transmitted through the polymer dispersed liquid crystal layer 13' and goes into the color separation layer 20.

This color separation layer 20 is characterized to transmit the light within a predetermined wavelength range in the visible light region and to reflect the remaining visible light. Of the light (L1) incident upon the color separation layer 20, a light within the predetermined wavelength range is highly efficiently transmitted (at L6) and goes into the diffuse reflection layer 30. This diffuse reflection layer 30 diffuses and reflects the incident light L6 isotropically and highly efficiently (at L7). This diffused and reflected light L7 is transmitted again through the color separation layer 20 and goes into the voltage-applied region, i.e., the region having the transparent polymer dispersed liquid crystal layer so that it is substantially transmitted through the polymer dispersed liquid crystal layer 13' until it reaches the eyes of the observer SO. As a result, only the light, as selected by the color separation layer 20, within the predetermined wavelength range reaches the eyes of the observer SO.

Of the light (L1) incident upon the color separation layer 20, the light other than the component within the predetermined wavelength range is reflected (at L4) by the color separation layer 20. This reflected light L4 is a regular one because of the reflection characteristics of the color separation layer 20 so that it is transmitted as it is through the transparent light modulation layer 13, but it is outside of the range of the visible angle of the observer SO so that it fails to reach the eyes of the observer SO. As a result, this regular reflected light L4 (i.e., the light outside of the predetermined wavelength range) is invisible to the observer SO, but only the selected light within the predetermined wavelength range can be observed in the clear color corresponding to the light of the predetermined wavelength range by the observer SO.

In the present embodiment, the color separation layer 20 is exemplified by a mirror which is characterized to have an extremely small optical absorption loss and excellent light reflecting/transmitting characteristics. On the other hand, the reflection layer 30 is exemplified by the white diffuse reflection layer having a uniform diffuse reflectivity over the whole wavelength in the visible light region and high characteristics so that it may play a remarkably important role to reconstruct a clear color of high purity.

As a result, only the light, as transmitted through the color separation layer 20, within the predetermined wavelength range is effectively diffused and reflected by the diffuse reflection layer 30 o reach the eyes of the observer SO so that a remarkably clear color corresponding to the light within the selected predetermined wavelength range can be observed.

According to one example of the fundamental construction of the reflection type liquid crystal display device of the present invention thus far described, in which the light scattering mode liquid crystal display device (i.e., the polymer network type polymer dispersed type liquid crystal layer in the present embodiment) is employed as the light modulation layer and in which the color separation layer is combined with the technique of the white diffuse reflection layer as the reflection layer, the forward scattered light can be highly efficiently exploited. As a result, the opaque state of the polymer dispersed liquid crystal layer 13' with no voltage application can be realized by a highly bright white like the paper white. While the voltage is being applied to the polymer dispersed liquid crystal layer 13', an arbitrary color such as the red, blue or green color can be remarkably clearly reconstructed in an excellent contrast by the combined action of the color separation layer 20 and the white diffuse reflection layer so that a display of high quality can be realized.

II) One example of the fundamental construction of the reflection type liquid crystal display device of the present invention will be described with reference to FIGS. 18, 19 and 20, in which a light scattering mode liquid crystal display element (e.g., a polymer network type polymer dispersed type liquid crystal element) is used as the light modulation layer and in which the color separation layer is exemplified by a Bragg reflection layer and combined with the technique of the white diffuse reflection layer as the reflection layer.

Figure 18:
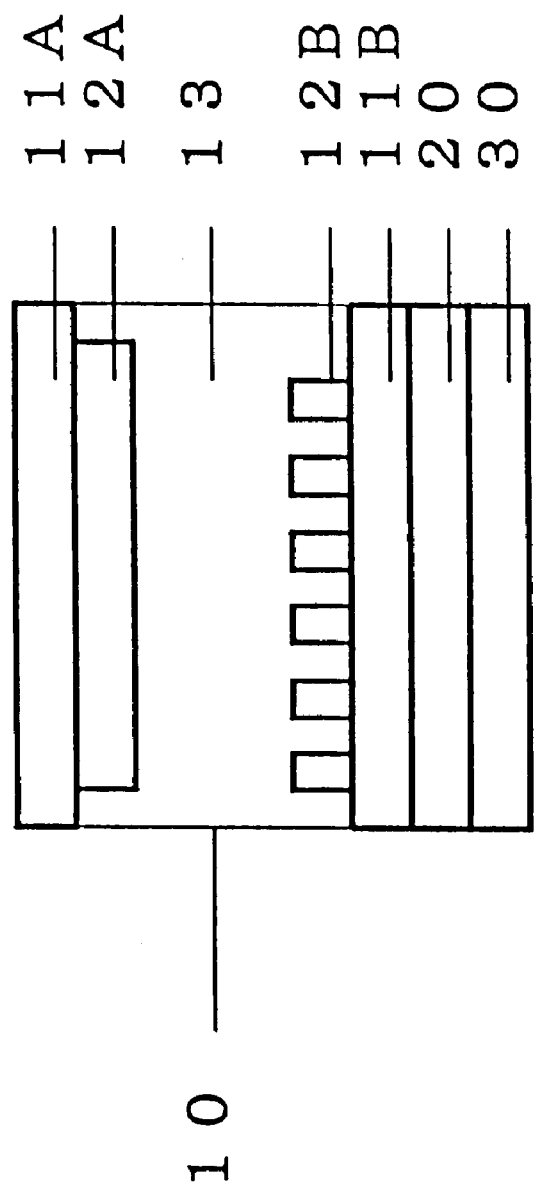
FIG. 18 is a section of a reflection type liquid crystal display device of the present invention.

FIG. 18 is a section of a reflection type liquid crystal display device of Embodiment 2 of the present invention; FIG. 19 is an explanatory diagram of the display principle in the case of a scattered state (with no voltage being applied); and FIG. 20 is an explanatory diagram of the display principle in the case of a transparent state (with a voltage being applied).

In FIG. 18, the liquid crystal panel 10 is constructed to include a pair of transparent substrates 11A and 11B provided with transparent electrodes 12A and 12B, and a light modulation layer 13 (as will be described in connection with the polymer dispersed liquid crystal in the description of the operation principle of the present invention) sandwiched between the transparent substrates 11A and 11B. The liquid crystal panel 10 is further constructed by arranging a Bragg reflection layer 20 as the color separation layer and a mirror layer 30 as the reflection layer at the back face side (as located at the lower side of FIG. 18) of the liquid crystal panel 10. The display principle will be described with reference to FIGS. 19 and 20.

Figure 19:
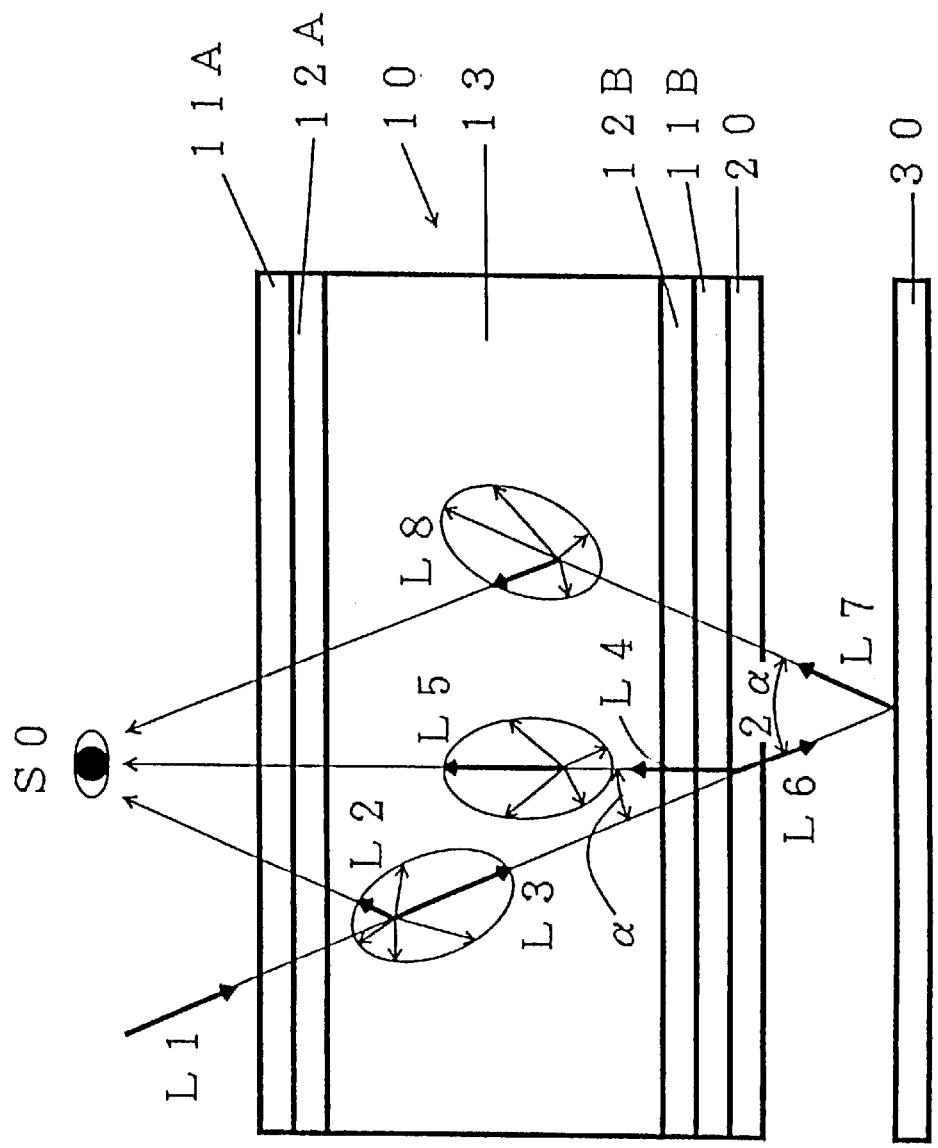
FIG. 19 is an explanatory diagram showing the reflection type liquid crystal display device of the present invention when no voltage is applied.

FIG. 19 is a diagram for explaining the state in which no voltage is applied. The molecules in the liquid crystal in the light modulation layer 13 of the polymer dispersed liquid crystal layer are oriented in various direction when no voltage is applied. In this state, the light coming into the light modulation layer 13 is scattered by the light scattering action at the interface between the liquid crystals and the polymer. With no application of voltage, a light L1 coming from the outside is scattered by the light modulation layer 13. A portion of the backward scattered light L2 of the incident light L1 advances in a viewing direction to reach the eyes of an observer SO. Here in the optically scattered state of the light modulation layer 13, the ratio of the forward scattered lights is generally considerably high. The light at this considerable ratio of the incident light becomes a forward scattered light L3 to go into the Bragg reflection layer 20.

The Bragg reflection layer 20 has an extremely small optical absorption loss and excellent optical reflecting/transmitting characteristics.

Figure 22:
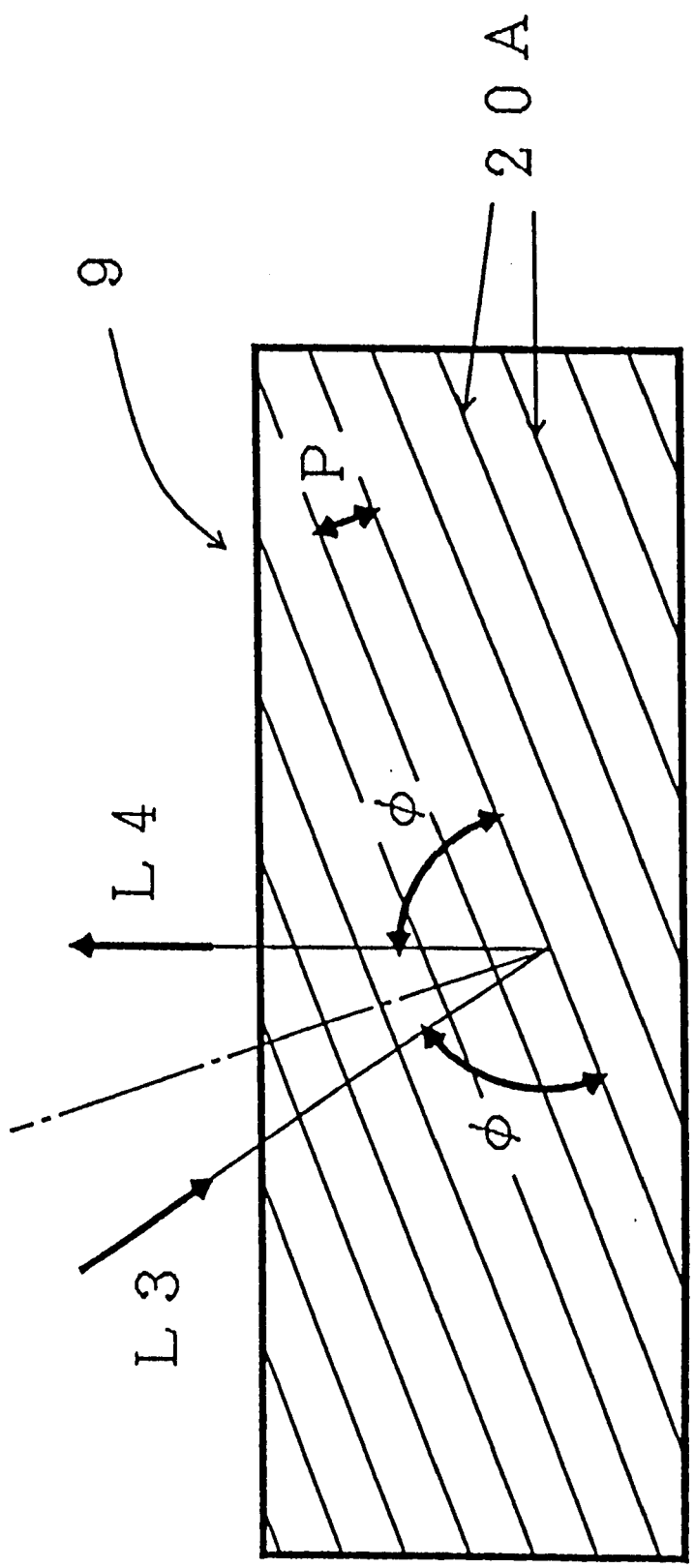
FIG. 22 is an explanatory diagram of a Bragg reflection of the embodiment of the present invention.

The Bragg reflection of the forward scattered light L3 will be described with reference to FIG. 22. A Bragg reflection layer 9 of FIG. 22 has a laminar structure having interference fringes 20A of a pitch P. The forward scattered light L3 or the incident light of the Bragg reflection layer is reflected in a direction to satisfy the following relation by the Bragg's law so that the diffracted light L4 emanates:

$$\lambda = 2P \sin \phi$$

($\lambda$: wavelength, and $\phi$: angle between the incident light and the interference fringes).

The Bragg reflection layer 20 can diffract the light within a predetermined wavelength range in the visible light region and can transmit the other visible light. Of the forward scattered lights L3 incident on the Bragg reflection layer 20, therefore, the light within the predetermined wavelength range is highly efficiently diffracted by the Bragg reflection layer 20 so that it becomes a diffracted light of an angle $\alpha$. The diffracted light L4 goes again into the light modulation layer 13 and is scattered by this liquid crystal layer 13 until it reaches the eyes of the observer SO as a forward scattered light L5 having a relatively high optical density.

On the other hand, a transmitted light L6 other than the light within a predetermined wavelength, as having passed through the Bragg reflection layer 20, goes into the reflection layer (or mirror layer) 30. The transmitted light L6 is regularly reflected at an angle $2\alpha$ by the reflection layer 30 into a reflected light L7. This reflected light L7 is transmitted again through the Bragg reflection layer 20 and goes into the light modulation layer 13 so that it is scattered by this light modulation layer 13, until it reaches the eyes of the observer SO as a forward scattered light L8 of a relatively high optical intensity.

In the present embodiment, the Bragg reflection layer 20 is exemplified by that which is characterized to have an extremely small optical absorption loss and excellent light diffracting/transmitting characteristics.

As a result, the incident light L1 is scattered by the light modulation layer into the backward scattered light L2 and the forward scattered lights L5 and L8, which are subjected to little absorption loss, so that the light, as synthesized from the scattered lights L2+L5+L8, is whitened again. This colorless light is observed by the observer SO. Thus, the incident light coming from the outside is hardly lost by the optical absorption, and most can be effectively exploited to realize a highly bright and pure white color.

Figure 20:
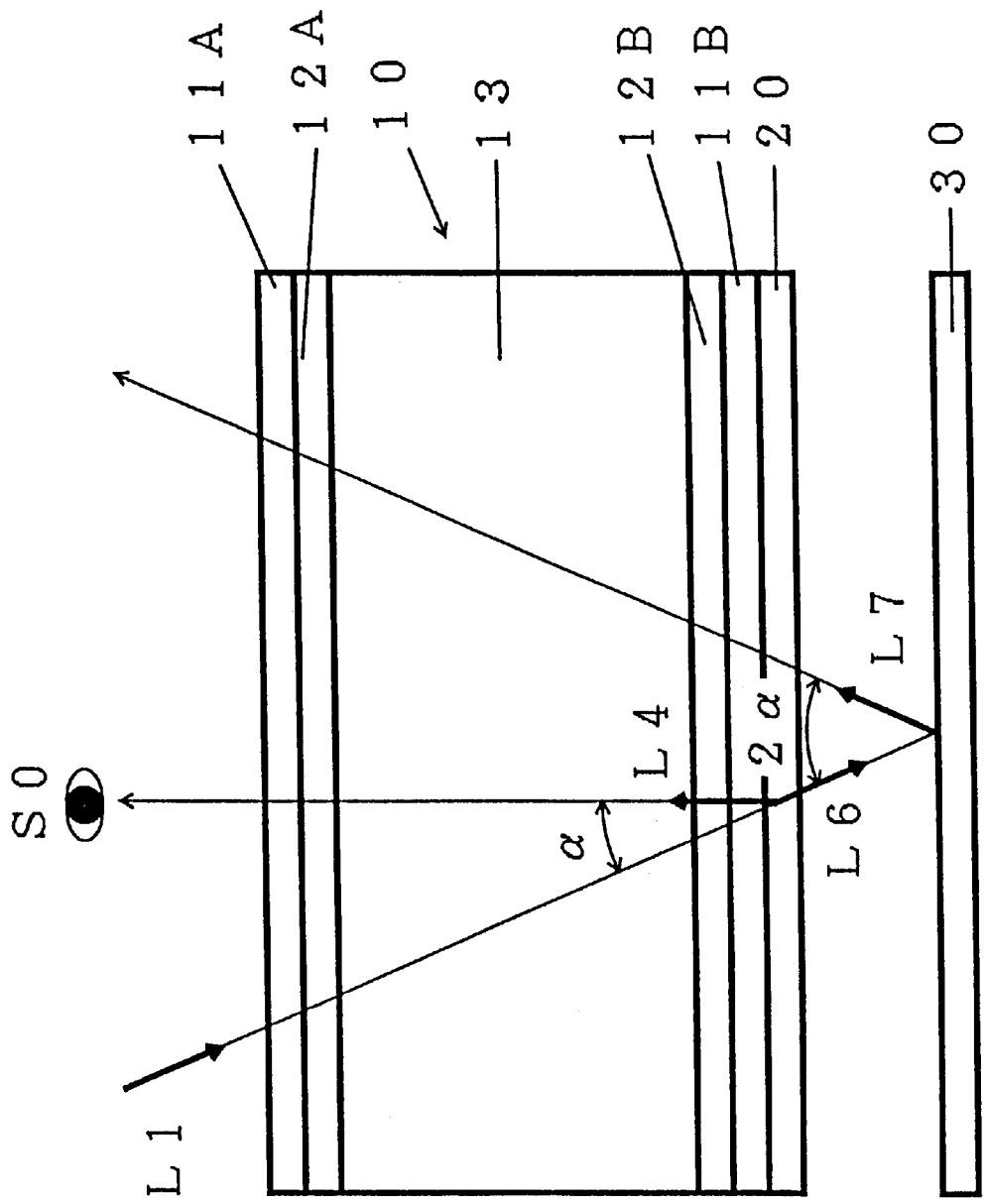
FIG. 20 is an explanatory diagram showing the reflection type liquid crystal display device of the present invention when a voltage is applied.

FIG. 20 is a diagram for explaining the state in which a voltage is applied. When a voltage higher than the saturation level of the liquid crystal is applied between the transparent electrodes 12A and 12B, the liquid crystal molecules are arrayed generally normal to the faces of the substrates 11A and 11B. In this state, the light scattering action disappears at the interface of the liquid crystal and the polymer so that the light modulation layer 13 becomes transparent. As a result, the incident light L1 is transmitted through the light modulation layer 13 and goes into the Bragg reflection layer 20.

This Bragg reflection layer 20 can diffract the light within a predetermined wavelength range in the visible light region and can transmit the remaining visible lights. Of the incident light L1, a light within the predetermined wavelength range is highly efficiently changed by the Bragg reflection layer 20 into the diffracted light L4 of the angle α and the transmitted light L6, of which the diffracted light L4 passes as it is through the light modulation layer 13 and reaches the eyes SO of the observer.

On the other hand, the transmitted light L6 goes into the reflection layer 30. By this reflection layer (or the mirror layer) 30, the incident light L6 is regularly reflected at the angle 2α into the reflected light L7. This reflected light L7 proceeds again through the Bragg reflection layer 20 into the voltage-applied region, i.e., the transparent region of the light modulation layer 13 and passes as it is through the light modulation layer 13. Although the diffracted light L4 goes at the angle α into the visual field of the observer SO, the reflected light L7 has the reflection angle 2α and is outside of the range of the field angle for the observer SO so that it fails to reach the eyes of the observer SO. Thus, the reflected light L7 (i.e., the light other outside of the predetermined wavelength range) is not viewed by the observer SO. As a result, what is observed by the observer is the light, as diffracted at the angle α, within the predetermined wavelength range. Thus, the observer SO can seen the color corresponding to the light of the predetermined wavelength range as a clear color of high impurity.

Figure 23:
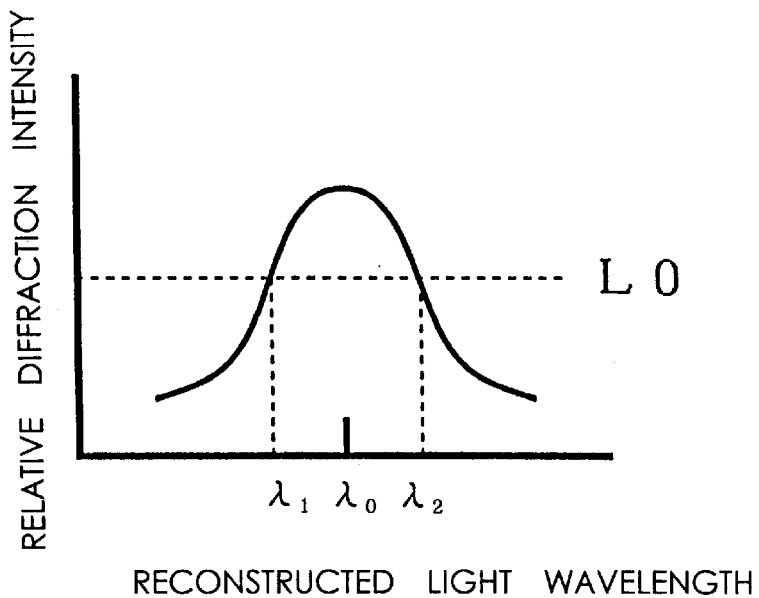
FIG. 23 is a diagram illustrating a wavelength sensitivity curve.

The visibility by the observer for the case, in which the Bragg reflection layer 20 is the volume hologram, will be described with reference to the wavelength sensitivity characteristics of FIG. 23 and reconstructed light incidence angle sensitivity curve of FIG. 24. FIG. 23 illustrates a wavelength sensitivity curve indicating a relation between the reconstructed light wavelength and the relative diffraction intensity, and a recording light wavelength is designated by λ0. If a relative diffraction intensity L0 allows the observer to view, for example, it is meant that the observer can observe the diffracted light within a reconstructed light wavelength range of λ1 to λ2. The reconstructed light is the forward scattered light L3 in FIG. 18 and the incident light L1 in FIG. 19.

Figure 24:
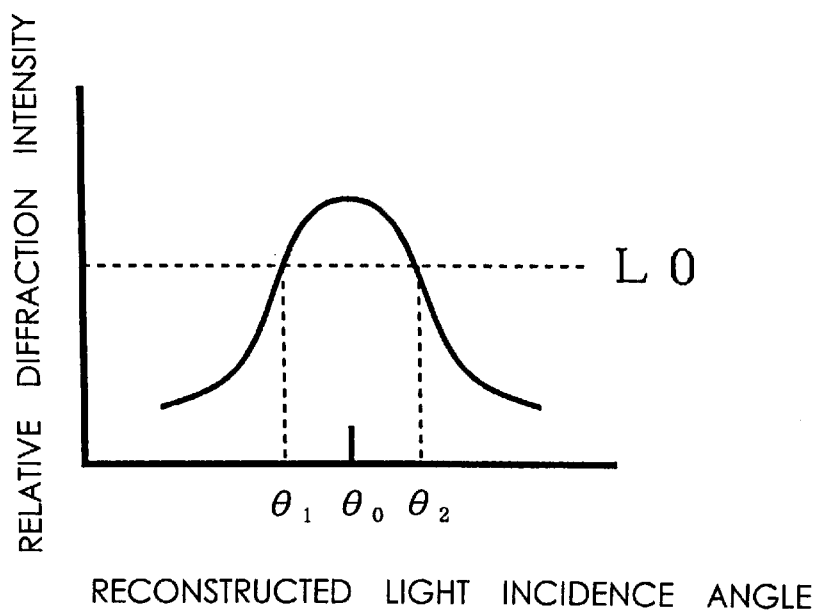
FIG. 24 is a diagram illustrating an incident angle sensitivity curve of a reconstructed light.

On the other hand, FIG. 24 illustrates a reconstructed light incidence angle sensitivity curve indicating a relation between the reconstructed incidence angle and the relative diffraction intensity, and a recording reference light incidence angle is designated by θ0. If the relative diffraction intensity L0 allows the observer to view, for example, it is meant that the observer can observe the diffracted light within a reconstructed light incidence angle of θ1 to θ2. For a constant reconstructed light incidence angle, it is conversely meant that the observable range of the observer is within the range of θ1 to θ2 around θ0.

In the embodiment of the present invention, specifically, the observer SO can view the color at the angle of ±(θ1 to θ2)/2 around the diffracted light L4.

According to the construction of the reflection type liquid crystal display device of the present embodiment, in which the Bragg reflection layer 20 is arranged at the back of the light modulation layer 13 and in which the reflection layer (or the mirror layer) is arranged at the back of the Bragg reflection layer 20, as described above, the forward scattered light can be highly efficiently exploited. As a result, the opaque state of the light modulation layer 13 made of the polymer dispersed liquid crystal layer with no voltage application can be realized by a highly bright white like the paper white. While the voltage is being applied to the light modulation layer 13, an arbitrary color such as the red, blue or green color can be remarkably clearly reconstructed in an excellent contrast by the combined action of the Bragg reflection layer 20 and the reflection layer (or the mirror layer) 30 so that a display of high quality can be realized.

Here will be specifically described the embodiments of the present invention.

(Embodiment 1)

FIG. 1 is a section showing the construction of a reflection type liquid crystal display device of the present embodiment.

As shown in FIG. 1, the liquid panel 10 is constructed to include the paired transparent substrates 11A and 11B provided with the patterned transparent electrodes 12A and 12B, and the light modulation layer 13 sandwiched between the transparent substrates 11A and 11B. The liquid crystal panel 10 was prepared to have a cell gap of 10 microns.

At the back of the liquid crystal panel 10 (as located at the lower side of FIG. 1), there was arranged the color separation layer 20, at the back of which was arranged the reflection layer 30.

The transparent substrates 11A and 11B were exemplified in the present embodiment 1 by smooth and transparent glass plates. In addition to these smooth and transparent glass plates, transparent polymer films may be used for the transparent substrates 11A and 11B.

In the present embodiment 1, the transparent electrodes 12A and 12B were prepared by patterning the transparent conductive films, which are formed of $In_2O_3$–$SnO_2$ films (as will be called the "ITO films") by the sputtering method or the vacuum evaporation method, by the photolithography. In addition to the ITO films, $SnO_2$ films may be used for the transparent electrodes 12A and 12B.

The light modulation layer 13 was exemplified in the present embodiment by the polymer network type polymer dispersed liquid crystal layer.

The polymer dispersed liquid crystal layer was prepared by injecting into the vacant liquid crystal panel 10 the mixed solution, in which a polymer resin such as acrylate monomers to bridge and polymerize with an ultraviolet ray (UV), a nematic liquid crystal having a positive dielectric anisotropy and an ultraviolet setting initiator were homogeneously mixed and dissolved, to set only the polymer resin while being exposed to the ultraviolet ray, so that the nematic liquid crystal having the positive dielectric anisotropy was phase-separated. If the polymer resin and the nematic liquid crystal are then blended at a higher ratio of the former, there are formed independent liquid crystal particles (or liquid crystal droplets). At a lower ratio of the polymer resin, on the other hand, the polymer resin forms the net-shaped (or network-shaped) structure, and the liquid crystal is present in a continuous phase in the network (or the three-dimensional net-shaped structure) of the polymer resin.

In the embodiment of the present invention, the polymer dispersed liquid crystal layer to be used as the light modulation layer is neither the micro-capsuled nematic liquid crystal having the positive dielectric anisotropy nor the liquid crystal particles (or the liquid crystal droplets) dispersed in the resin matrix, but the polymer network type polymer dispersed liquid crystal layer having the structure in which the liquid crystal forms the continuous layer and in which the photo-setting resin of the three-dimensional net structure is in the continuous layer. For this polymer network type polymer dispersed liquid crystal layer, the ratio of the liquid crystal to the photo-setting resin may be within a range of 60 to 99%, more preferably 75% to 95%. For realizing the satisfactory light scattering state, on the other hand, the pore size of the three-dimensional net-shaped structure may be about the wavelength of light and may be uniformly distributed, and the average pore size of the three-dimensional net-shaped structure of the polymer network may be 0.5 microns to 3.5 microns. More preferably, the average pore size of the three-dimensional net-shaped structure may be within a range of 0.8 microns to 1.8 microns. The average pore size of this range can realize the optimum light scattering state. Outside of the range 0.5 microns to 3.5 microns of the average pore size of the three-dimensional net-shaped structure, the light scattering state is deteriorated to lower the contrast seriously.

On the other hand, it is the easier to lower the voltage and the hysteresis for the structure, in which the liquid crystal of the polymer network three-dimensional net-shaped structure is in the continuous phase, than for the structure of the independent small liquid crystal particles (or the liquid crystal droplets). It is, therefore, more preferable that the ratio of the liquid crystal to the photo-setting resin is within the range of 75 to 99%. As a result, it is possible to realize the light scattering mode light modulation layer which is far more excellent in the light scattering characteristics and which can have a far lower voltage and a far lower hysteresis characteristics, than the light modulation layer in which the nematic liquid crystal is micro-capsuled or in which the small liquid crystal particles are dispersed in the resin matrix.

More specifically, the liquid crystal material was prepared by vacuum-injecting the "PNM-156" of Rodic Inc. into the vacant cell while keeping the temperature of 30° C. This liquid crystal material was irradiated, while being kept at a temperature of 25.5° C., with an ultraviolet ray of 80 mW/cm$^2$ by a metallic halide lamp, to prepare the polymer network type polymer dispersed liquid crystal layer panel 10 having the light modulation layer 13. The wavelength of the ultraviolet ray was achieved by using a filter for absorbing a wavelength of 350 nm or less. For initiating the irradiation of the ultraviolet ray, it is important that the irradiation can be instantly initiated by a shutter from the lamp which is ready for irradiating the an intensity of 80 mW/cm$^2$. Moreover, the temperature for the vacuum injection and the temperature for the ultraviolet ray irradiation have to be higher than the phase conversion level of the liquid crystal material. Especially the temperature of the ultraviolet irradiation may be set higher by 1.5 ° C. than the phase conversion level.

The light modulation layer 13 of the polymer network type polymer dispersed liquid crystal display panel 10 thus manufactured was observed by using the scanning type electronic microscope and was confirmed that it has the three-dimensional net structure made of the polymer. This three-dimensional net structure has an average size of about 1.0 micron. The electrooptical characteristics are measured by the photometer made by Canon Inc. Here, if the transmittance is designated at To for no voltage application and at 100% when it is saturated with the increase in the applied voltage. The applied voltage indicating a transmittance of 90% is designated by Vsat, and the applied voltage indicating a transmittance of 10% is designated by Vth. Moreover, the hysteresis indicating a transmittance of 50% is designated by VH50.

The result of measurements were as follows:

| | |
|---|---|
| Vth = | 1.69 V |
| Vsat = | 2.70 V |
| VH50 = | 0.05 V |
| To = | 2.3% |
| Vop: (Absolute Transmittance at 3.0 V) = | 86% |
| Current Consumption at Vsat = | 0.45 $\mu$A/cm$^2$. |

Here, VH50 indicate the hysteresis characteristics, as defined by the following formula:

$$VH50=VUP50-VDW50.$$

Here, VUP50 designate the applied voltage indicating the transmittance of 50% when the applied voltage is raised, and VDW50 the applied voltage indicating the transmittance of 50% when the applied voltage is lowered.

From the aforementioned results of measurement, it has been confirmed that the polymer network type polymer dispersed liquid crystal panel 10 was the scattering mode light modulation layer which was remarkably excellent in the light scattering characteristics, drastically dropped the voltage and had low hysteresis characteristics.

The reflection layer 30 plays an important role for reproducing a clear color of high purity. In order to reproduce this clear color of high purity, it is desirable to use the reflection layer (i.e, the white diffuse reflection layer) which has a uniform diffuse reflectivity over the whole wavelength in the visible light region and high characteristics. Moreover, the reflection layer desirably has a thickness sufficient for avoiding the influence of the color of the object at the back of the reflection layer.

In order to reproduce the clear color of high purity, the white diffuse reflection layer having the excellent diffuse reflectivity was exemplified in the present embodiment by the polyester film "Lumirror E60L" (having the thickness of 188 microns) of Toray Industries, Inc.

The reflection layer 30 may be exemplified by the white diffuse reflection layer, which is constructed of another polymer film having a uniform diffuse reflectivity over the whole wavelength in the visible light region and high characteristics, or the white diffuse reflection layer which is made of an inorganic substance such as powder of barium sulfate.

Another white diffuse reflection layer having a uniform diffuse reflectivity over the whole wavelength in the visible light region and high characteristics may be formed by coating the surface of a metallic film such as silver (Ag) or Aluminum (Al) having a high reflectivity in the visible light region, with splashed glass beads having a predetermined particle diameter.

The color separation layer 20 was exemplified in the present embodiment by the mirror which is made of a cholesteric liquid crystal polymer layer having selectively reflecting characteristics within a predetermined wavelength range in the visible light region. The color separation layer 20 is made by laminating at least one of the fundamental reflection units A of the cholesteric liquid crystal polymer layers having different selective reflection wavelengths of the visible light region. This fundamental reflection unit A is constructed by arranging the cholesteric liquid crystal polymer layer for selectively reflecting the clockwise circular polarized light having a predetermined wavelength range in the visible light region and cholesteric liquid crystal polymer layer for selectively reflecting the counter-clockwise polarized light having the same wavelength as the predetermined wavelength range, such that their optical axes are parallel to each other.

Figure 4:
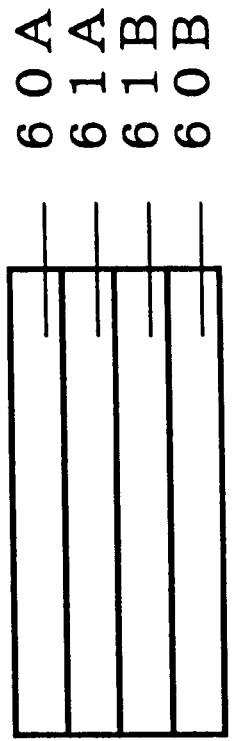
FIG. 4 is a section showing a structure of a color separation layer having one fundamental reflection unit A of a cholesteric liquid crystal polymer layer.

FIG. 4 is a section showing the structure of a color separation layer having one fundamental reflection unit A of the cholesteric liquid crystal polymer layer.

This color separation layer is given, as shown in FIG. 4, the structure in which a cholesteric liquid crystal polymer layer 61A for selectively reflecting the clockwise circular polarized light and a cholesteric liquid crystal polymer layer 61B for selecting reflecting the counter-clockwise circular polarized light having the same wavelength as the predetermined wavelength range are so sandwiched between transparent support substrates 60A and 60B that their optical axes are parallel to each other. According to this structure, both the clockwise and counter-clockwise circular polarized components with the predetermined wavelength range of the incident light can be reflected so that only the light within the predetermined wavelength range of the incident light can be highly efficiently reflected in a reflectivity as high as 100%.

Here, the transparent support substrates 60A and 60B were made of a polyethylene terephthalate film. The cholesteric liquid crystal polymer layers 61A and 61B were made of a polymer layer having the cholesteric liquid crystal structure and made of polypeptide such as polyglutamate for selectively the clockwise and counter-clockwise circular polarized lights of the predetermined wavelength range, respectively.

These cholesteric liquid crystal polymer layers 61A and 61B were laminated and sandwiched and sealed between the transparent support substrates 60A and 60B. Then, this cholesteric structure was quenched and solidified from the heated state of a predetermined temperature to form a color separation layer which was characterized to have a thickness of about 0.2 mm, a selective reflection center wavelength X of 552 nm, a wave band $\Delta\lambda$ of 85 nm and the maximum reflectivity of 95% (under the measuring condition of no polarization).

The cholesteric liquid crystal polymer layers 61A and 61B for selectively reflecting the circular polarized lights of the predetermined wavelength range can be prepared by forming a cholesteric structure using the lyotropic cholesteric liquid crystal as with a solvent of photo-polymerizable unsaturated monomer, and by photo-polymerizing and solidifying the cholesteric structure.

The light scattering mode reflection type liquid crystal display device was manufactured by using the color separation layer 20 which is made of the cholesteric liquid crystal polymer layer prepared as described above.

When this reflection type liquid crystal display device was observed in the room illuminated with a white light, the incident light L1 is scattered by the light modulation layer into the backward scattered light L2 and the forward scattered lights L5 and L8, as illustrated in the principle diagram of FIG. 2, so that the observer views the light which is whited by synthesizing those scattered lights. As a result, the light was highly efficiently used so that it was observed in the white color of high brightness like the paper white.

When a sufficient drive voltage is applied, on the other hand, the light modulation layer is transparent, as shown in the principle diagram of FIG. 3, the light of the color, as corresponding to the transmitted light of the color separation layer 20, of the incident light L1 is highly efficiently diffused and reflected (at L7) by the white diffuse reflection layer 30 so that the diffused and reflected light L7 arrives as it is at the eyes of the observer. As a result, the clear color of high purity can be seen by the observer.

In other words, the reflection type liquid crystal display device, as provided with the color separation layer 20 made of the aforementioned cholesteric liquid crystal polymer layer, could display a clear magenta color (M) [complementary to green (G)] of high purity on the highly bright white background like the paper white. The color separation layer, as constructed of the cholesteric liquid crystal polymer layer of the present embodiment 1, is enabled, in addition to the structure shown in section in FIG. 4, to reflect the light in a region within a predetermined wavelength range selectively in a reflectivity as high as 100%, by laminating a plurality of fundamental reflection units A of the cholesteric liquid crystal polymer layers for selectively reflecting the different wavelengths of the visible light region, such that their optical axes are in parallel.

In order to display multiple colors, moreover, the color separation layer 20, as made of the cholesteric liquid crystal polymer layer of the present embodiment 1, is enabled to produce the selective reflection lights of different wavelengths simultaneously from the predetermined regions in a common plane, by arranging a plurality of the regions of the fundamental reflection unit A of the cholesteric liquid crystal polymer layer for selectively reflecting the different wavelengths of the visible light region, in the common plane.

In order to display the multiple colors by the reflection type liquid crystal display device of the present invention, for example, the wavelength ranges of the selective reflections are enabled to correspond to blue (B), green (G) and red (R) colors by arranging three kinds of cholesteric liquid crystal polymer layers having the selective reflection characteristics within the wavelength ranges of 400 to 510 nm, 510 to 595 nm and 595 to 720 nm with respect to a normally incident light, individually in the stroke shape or the mosaic shape in the common plane of the color separation layer 20. By making the display pixels correspond to those individual regions, it is possible to display the multiple colors in the complementary colors of yellow (Y) [complementary to blue (B)], magenta (M) [complementary to green (G)] and cyan (C) [complementary to red (R)].

Moreover, the wavelength ranges of the selective reflections are enabled to correspond to cyan (C), magenta (M) and yellow (Y) colors by arranging three kinds of cholesteric liquid crystal polymer layers having the selective reflection characteristics within the wavelength ranges of 510 to 720 nm, 400 to 510 nm, 595 to 720 nm and 400 to 595 nm with respect to a normally incident light, individually in the stroke shape or the mosaic shape in the common plane of the color separation layer 20. By making the display pixels correspond to those individual regions, it is possible to display the multiple colors in the complementary colors of blue (B) [complementary to yellow (Y)], green (G) [complementary to magenta (M)] and red (R) [complementary to cyan (C)].

In order to reconstruct the red (R) as the display color, for example, there is needed the cholesteric liquid crystal polymer layer exhibiting the selective reflection within the wavelength range of the cyan (C) [=blue (B)+green (G)] complementary to the red (R).

At present, there has never been found a single layer of the cholesteric liquid crystal polymer layer having the selective reflection within two wavelength ranges. As a result, a display color corresponding to the red (R) can be reconstructed if two cholesteric liquid crystal polymer layers exhibiting the selective reflections within the wavelength ranges of blue (B) and green (G).

It is difficult at present to form the cholesteric liquid crystal polymer layer which is characterized to have a selective reflection over the wavelength range of 100 nm or more by the single layer.

When the colors are displayed by using the colors of yellow (Y), magenta (M) and cyan (C), and blue (B), green (G) and red (R), there are laminated a plurality of cholesteric liquid crystal polymer layers having different wavelength ranges for the selective reflection. Here, the number of layers to be laminated can be reduced by using cholesteric liquid crystal layers of high double-refractions.

Manufacture Example 1

In order to realize the reconstruction of two colors of yellow (Y) and magenta (M) as the display colors in the reflection type liquid crystal display device of the present invention, it is sufficient to form the two-color stripe-shaped color separation layer which corresponds to the blue (B) [complementary to yellow (Y)] and the green (G) [complementary to magenta (M)] having the individual wavelength ranges of the selective reflection at the wavelengths of 400 to 510 nm and 510 to 595 nm. According to the manufacturing procedure, therefore, the cholesteric liquid crystal polymers having the wavelength ranges of 400 to 460 nm (AA) and 510 to 595 nm for the selective reflection are applied at first in a striped shape to a transparent support substrate and are flattened. Next, the cholesteric liquid crystal polymer of 450 to 510 nm is applied to the polymer (AA) and flattened. Finally, a flattening layer for flattening the whole face is formed to eliminate the step thereby to manufacture a striped color separation layer which can reconstruct the two colors of yellow (Y) and magenta (M) as the display colors.

Manufacture Example 2

In order to realize the reconstruction of three colors of yellow (Y), magenta (M) and cyan (C) as the display colors in the reflection type liquid crystal display device of the present invention, it is sufficient to form the three-color stripe-shaped color separation layer which corresponds to the blue (B) [complementary to yellow (Y)], the green (G) [complementary to magenta (M)] and the red (R) [complementary to cyan (C)] having the individual wavelength ranges of the selective reflection at the wavelengths of 400 to 510 nm, 510 to 595 nm and 595 to 720 nm. According to the manufacturing procedure, therefore, the cholesteric liquid crystal polymers having the wavelength ranges of 400 to 460 nm (AA), 510 to 595 nm and 595 to 665 nm (BB) for the selective reflection are applied at first in a striped shape to a transparent support substrate and are flattened. Next, the cholesteric liquid crystal polymers of 450 to 510 nm and 630 to 720 nm are applied to the polymers (AA) and (BB), respectively, and are flattened. Finally, a flattening layer for flattening the whole face is formed to eliminate the step thereby to manufacture a striped color separation layer which can reconstruct the three colors of yellow (Y), magenta (M) and cyan (C) as the display colors.

Manufacture Example 3

In order to realize the reconstruction of three colors of blue (B), green (G) and red (R) as the display colors in the reflection type liquid crystal display device of the present invention, it is sufficient to form the three-color stripe-shaped color separation layer which corresponds to the yellow (Y) [complementary to blue (B)], magenta (M) [corresponding to the green (G)] and cyan (C) [complementary to the red (R)] having the individual wavelength ranges of the selective reflection at the wavelengths of 510 to 720 nm, 400 to 510 nm, 595 to 720 nm and 400 to 595 nm. According to the manufacturing procedure, therefore, the cholesteric liquid crystal polymers having the wavelength ranges of 510 to 595 nm (AA), 400 to 460 nm (BB) and 400 to 460 nm (CC) for the selective reflection are applied at first in a striped shape to a transparent support substrate and are flattened. Next: the cholesteric liquid crystal polymer of 595 to 665 (DD) nm is applied to the polymer (AA); the polymer (EE) of 450 to 510 nm to the polymer (BB); and the polymer of 450 to 510 (FF) to the polymer (CC), and these polymers are flattened. Next: the polymer of 630 to 720 nm is applied to the polymer (DD); the polymer (GG) to the polymer (EE); and the cholesteric liquid crystal polymer of 510 to 595 nm to the polymer (FF), and these polymers are flattened. Next, the cholesteric liquid crystal polymer of 630 to 720 nm is applied to the polymer (GG) and is flattened. Finally, a flattening layer for flattening the whole face is formed to eliminate the step thereby to manufacture a striped color separation layer which can reconstruct the three colors of blue (B), green (G) and red (R) as the display colors.

In another example, the color separation layer 20 constructed of the cholesteric liquid crystal polymer layers is the color separation layer which is formed by laminating at least one of the following fundamental reflection units of cholesteric liquid crystal polymer layers having different selective reflection wavelengths of the visible light region. The fundamental reflection unit B is constructed by sandwiching between two cholesteric liquid crystal polymer layers, which are overlapped to have parallel optical axes thereby to selectively reflect the circular polarized lights of the same turning direction (e.g., clockwise) having predetermined equal wavelengths in the visible light region, a conversion element (as will be called the "½ wavelength plate") for converting the lights of the same predetermined wavelength by 180 degrees.

Figure 5:
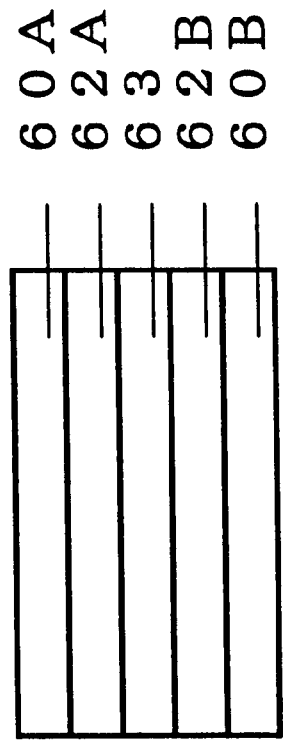
FIG. 5 is a section showing a structure of a color separation layer having one fundamental reflection unit B of a cholesteric liquid crystal polymer layer.

FIG. 5 is a section showing the structure of a color separation layer having one fundamental reflection unit B of the cholesteric liquid crystal polymer.

As shown in FIG. 5, this color separation layer is given the construction in which two cholesteric liquid crystal polymer layers 62A and 62B having parallel optical axes for selectively reflecting the circular polarized lights of the same turning direction (e.g., clockwise) having the equal wavelengths in the visible light region are arranged between the two transparent support substrates 60A and 60B and in which a ½ wavelength plate 63 for converting the lights of the same predetermined wavelength by 180 degrees is sandwiched between the two cholesteric liquid crystal polymer layers 62A and 62B. By this construction, the circular polarized component (e.g., the clockwise circular polarized component) of the incident lights within the predetermined wavelength range is selectively reflected by the first-layered cholesteric liquid crystal polymer layer 62A, but the counter-clockwise polarized component within the predetermined wavelength range is transmitted. This counter-clockwise circular polarized component is converted in phase by 180 degrees into the clockwise circular polarized light by the ½ wavelength plate 63 for converting the phase of the light within the predetermined wavelength range by 180 degrees. This clockwise circular polarized component is selectively reflected by the second-layered cholesteric liquid crystal polymer layer 62B. As a result, only the light of the incident light within the predetermined wavelength range can be highly efficiently reflected in a reflectivity as high as 100%.

The transparent support substrates 60A and 60B are made of a polyethylene terephthalate film.

The cholesteric liquid crystal polymer layers 62A and 62B were made by coating the polypeptide such as polyglutamate for selectively the clockwise and counter-clockwise circular polarized lights of the predetermined wavelength range on the individual one sides of the transparent support substrates 60A and 60B, and by quenching and solidifying the cholesteric structure from the heated state of a predetermined temperature. This cholesteric structure thus made had a thickness of about 0.1 mm, a selective reflection center wavelength $\lambda$ of 552 nm, a wave band $\Delta\lambda$ of 85 nm and the maximum reflectivity of 48% (under the measuring condition of no polarization).

The ½ wavelength plate 63 is an oriented polymer film made of polyester, polycarbonate or polystyrene and has a phase difference $\Delta n \cdot d$ of 276 nm about one half of the selective reflection center wavelength $\lambda$ of the cholesteric liquid crystal polymer layers 62A and 62B.

These layers were laminated, as shown in FIG. 5, to form the color separation layer 20.

The color separation layer 20 thus constructed had the maximum reflectivity of about 92% (under the measuring condition of no polarization).

The light scattering mode reflection type liquid crystal display device was manufactured by using the color separation layer 20 which was made of the cholesteric liquid crystal polymer layer prepared as described above.

When this reflection type liquid crystal display device is observed in the room illuminated with a white light, the incident light L1 is scatted by the light modulation layer into the backward scattered light L2 and the forward scattered lights L5 and L8, as illustrated in the principle diagram of FIG. 2, so that the observer SO views the light which is whited by synthesizing those scattered lights. As a result, the light is highly efficiently used so that it is observed in the white color of high brightness like the paper white.

When a sufficient drive voltage is applied, on the other hand, the light modulation layer is transparent, as shown in the principle diagram of FIG. 3, the light of the color, as corresponding to the transmitted light of the color separation layer, of the incident light L1 is highly efficiently diffused and reflected (at L7) by the white diffuse reflection layer 30 so that the diffused and reflected light L7 arrives as it is at the eyes of the observer SO. As a result, the clear color of high purity can be seen by the observer.

In other words, the reflection type liquid crystal display device, as provided with the color separation layer 20 made of the aforementioned cholesteric liquid crystal polymer layer, could display a clear magenta color (M) [complementary to green (G)] of high purity on the highly bright super white background.

Next, this reflection type liquid crystal display device was packaged in a wrist watch and observed, it displayed a clear magenta (M) color on the white background so that it could improve the additional value of beauty of the digital wrist watch. When the observation was then made at a temperature ranging from −20° C. to 90° C., the display color of magenta (M) was hardly changed to satisfy the circumferential conditions for the real use of the wrist watch.

The color separation layer 20, as constructed of the cholesteric liquid crystal polymer layer of the present embodiment, is enabled, in addition to the structure shown in section in FIG. 5, to reflect the light in a region within a predetermined wavelength range selectively in a reflectivity as high as 100%, by laminating a plurality of fundamental reflection units B of the cholesteric liquid crystal polymer layers for selectively reflecting the different wavelengths of the visible light region, such that their optical axes are in parallel.

Moreover, the color separation layer 20, as made of the cholesteric liquid crystal polymer layer of the present embodiment 1, is enabled to produce the selective reflection lights of different wavelengths simultaneously from the predetermined regions in a common plane, by arranging a plurality of the regions of the fundamental reflection unit B of the cholesteric liquid crystal polymer layer for selectively reflecting the different wavelengths of the visible light region, in the common plane.

In order to display the multiple colors by the reflection type liquid crystal display device of the present invention, for example, the wavelength ranges of the selective reflections are enabled to correspond to blue (B), green (G) and red (R) colors by arranging three kinds of cholesteric liquid crystal polymer layers having the selective reflection characteristics within the wavelength ranges of 400 to 510 nm, 510 to 595 nm and 595 to 720 nm with respect to a normally incident light, individually in the stripe shape or the mosaic shape in the common plane of the color separation layer 20. By making the display pixels correspond to those individual regions, it is possible to display the multiple colors in the complementary colors of yellow (Y) [complementary to blue (B)], magenta (M) [complementary to green (G)] and cyan (C) [complementary to red (R)].

Moreover, the wavelength ranges of the selective reflections are enabled to correspond to cyan (C), magenta (M) and yellow (Y) colors by arranging three kinds of cholesteric liquid crystal polymer layers having the selective reflection characteristics within the wavelength ranges of 510 to 720 nm, 400 to 510 nm, 595 to 720 nm and 400 to 595 nm with respect to a normally incident light, individually in the stripe shape or the mosaic shape in the common plane of the color separation layer 20. By making the display pixels correspond to those individual regions, it is possible to display the multiple colors in the complementary colors of blue (B) [complementary to yellow (Y)], green (G) [complementary to magenta (M)] and red (R) [complementary to cyan (C)].

In the sectional diagram (of FIG. 1) of the structure of the present embodiment, the color separation layer 20 is arranged at the outer back side of the liquid crystal panel 10, and the diffuse reflection layer 30 is arranged at the back of the color separation layer 20. However, the effect of the present invention capable of reconstructing the clear colors of high purity to be displayed on the highly bright paper white background can be retained as it is, even if the positions and sequences of arrangement are modified, as shown in FIGS. 8, 9, 10 and 11. Therefore, the optimum positions and sequences of arrangement of the components of the reflection type liquid crystal display device of the present embodiment 1 may be selected according to the actual applications of use from those of FIG. 1 and FIGS. 8 to 11.

Figure 8:
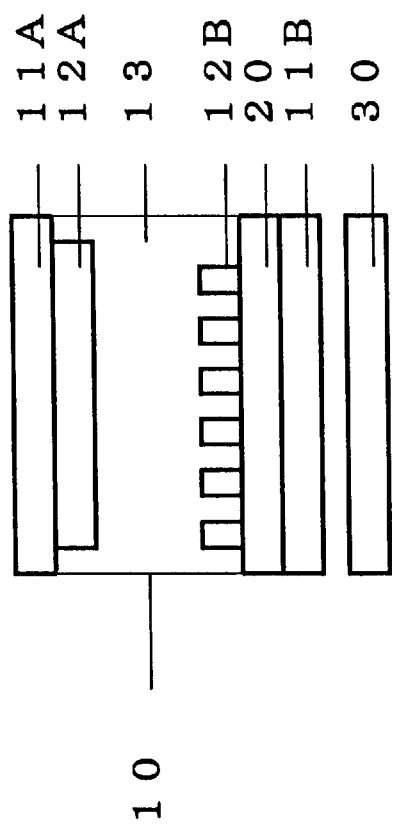
FIG. 8 is a section showing another example of the structure of the reflection type liquid crystal device in the light scattering mode according to the embodiment of the present invention.

FIG. 8 shows a structure in which the color separation layer 20 is arranged between the transparent electrode 12B and the transparent substrate 11B. As a result, the color separation layer 20 is arranged inside of the liquid crystal panel 10, and the diffuse reflection layer 30 is arranged outside.

Figure 9:
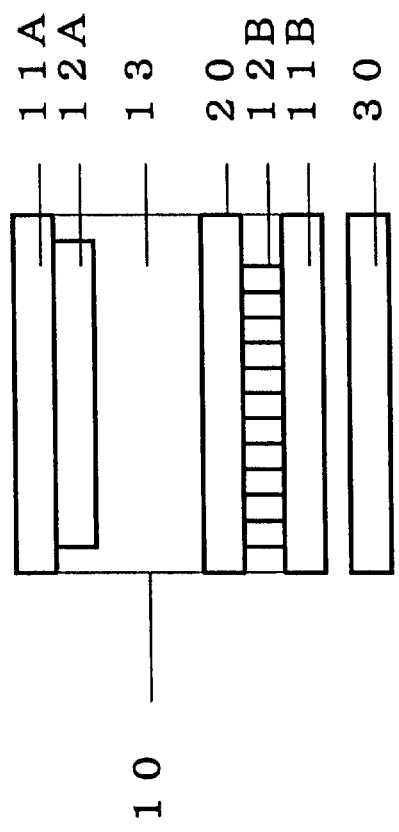
FIG. 9 is a section showing another example of the structure of the reflection type liquid crystal device in the light scattering mode according to the embodiment of the present invention.

FIG. 9 shows a structure in which the color separation layer 20 is arranged over the transparent electrodes 12B. As a result, the color separation layer 20 is arranged inside of the liquid crystal panel 10, and the diffuse reflection layer 30 is arranged outside.

Figure 10:
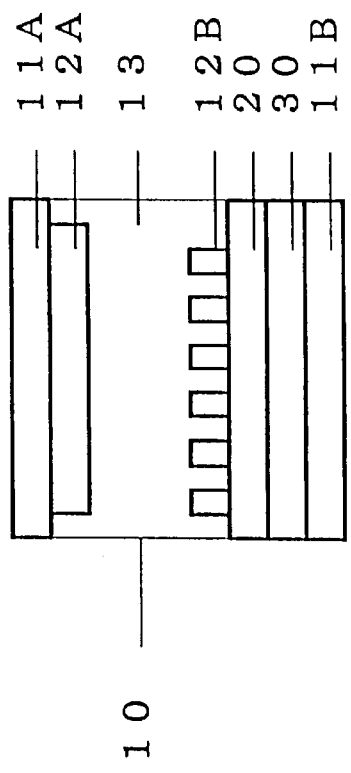
FIG. 10 is a section showing another example of the structure of the reflection type liquid crystal device in the light scattering mode according to the present invention.

FIG. 10 shows a structure in which the color separation layer 20 is arranged below the transparent electrodes 12B, in which the diffuse reflection layer 30 is arranged below the transparent electrodes 12B and in which the transparent substrate is arranged below the diffuse reflection layer 30. As a result the color separation layer 20 and the diffuse reflection layer 30 are arranged inside of the liquid crystal panel 10.

Figure 11:
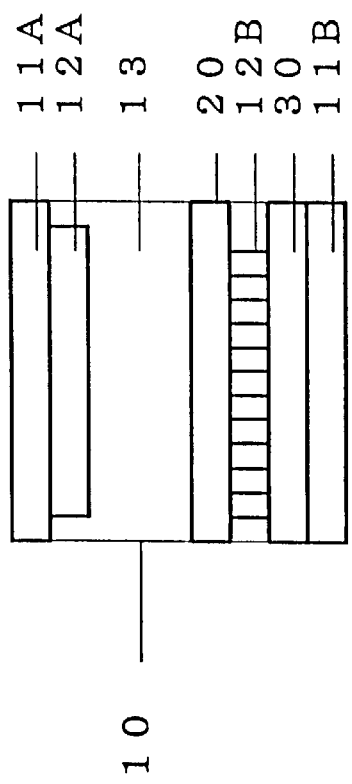
FIG. 11 is a section showing another example of the structure of the reflection type liquid crystal device in the light scattering mode according to the present invention.

FIG. 11 shows a structure in which the color separation layer 20 is arranged over the transparent electrodes 12B, in which the diffuse reflection layer 30 is arranged below the transparent electrodes 12B and in which the transparent substrate is arranged below the diffuse reflection layer 30. As a result, the color separation layer 20 and the diffuse reflection layer 30 are arranged inside of the liquid crystal panel 10.

Here, the color separation layer 20, as made of the cholesteric liquid crystal polymer layer, may be formed to have such a size as to cover the whole face of the display region of the cholesteric liquid crystal polymer layer of the same spectral characteristics or may be formed of a cholesteric liquid crystal polymer layer having different spectral characteristics for the individual pixel electrodes.

Figure 12:
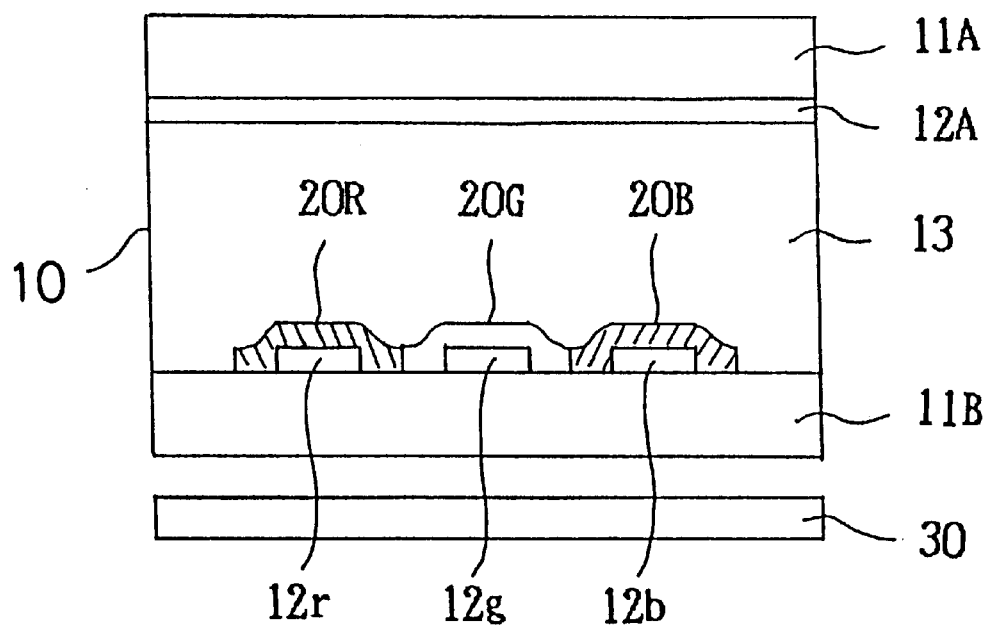
FIG. 12 is a section showing a structure, in which color separation layers corresponding to blue (B), green (G) and red (R) wavelength ranges of selective reflections are formed for individual pixel electrodes on the upper face of a back electrode, according to the embodiment of the present invention.

In order to reconstruct the three colors of yellow (Y), magenta (M) and cyan (C) as the display colors in the reflection type liquid crystal display device of the present invention, as shown in FIG. 12, the color separation layer is formed of three kinds of cholesteric liquid crystal polymer layers having the wavelength ranges for the selection display corresponding to the blue (B) [complementary to yellow (Y)], green (G) [complementary to magenta (M)] an red (R) [complementary to cyan (C)]. Over electrodes 12b, 12g and 12r corresponding to the blue (B), green (G) and red (R) of the back electrodes, more specifically, there are formed color separation layers 20B, 20G and 20R which are made of cholesteric liquid crystal polymer layers having the selective reflection characteristics of blue (B), green (G) and red (R) corresponding to the back electrodes.

Figure 13:
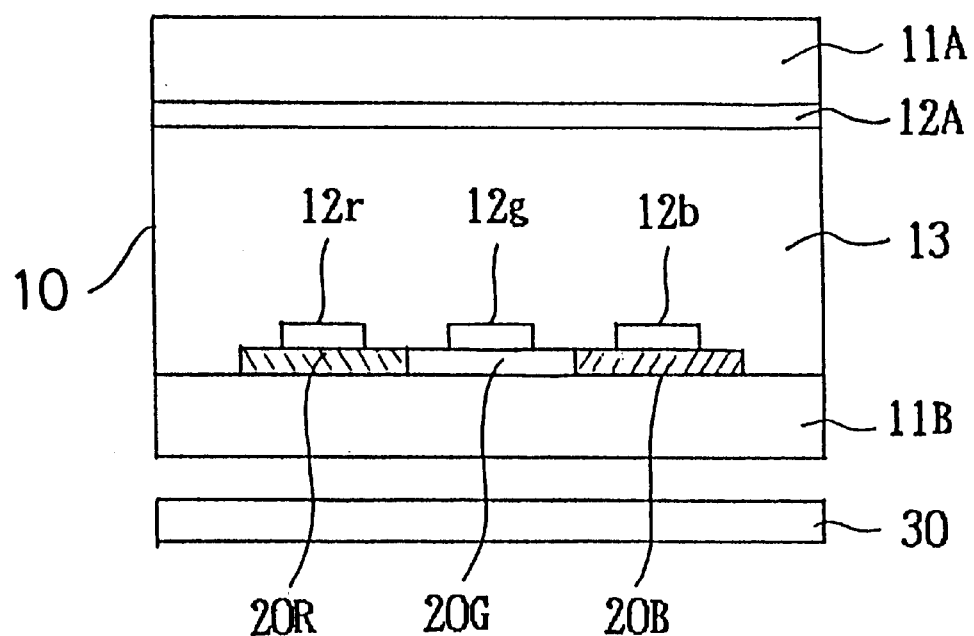
FIG. 13 is a section showing a structure, in which color separation layers corresponding to blue (B), green (G) and red (R) wavelength ranges of selective reflections are formed for individual pixel electrodes on the lower face of a back electrode, according to the embodiment of the present invention.

In order to reconstruct the three colors of yellow (Y), magenta (M) and cyan (C) as the display colors in the reflection type liquid crystal display device of the present invention, as shown in FIG. 13, between the back substrate and the back electrodes, and below the electrodes 12b, 12g and 12r corresponding to the blue (B), green (G) and red (R) of the back electrodes, there are formed the color separation layers 20B, 20G and 20R which are formed of cholesteric liquid crystal polymer layers having the selective reflection characteristics of blue (B), green (G) and red (R) corresponding to the back electrodes.

By adopting these structures, it is possible to increase the number of reconstructed colors to be displayed drastically. The structure need not be limited to that of the three primaries of the yellow (Y), magenta (M) and cyan (C) but may be a color separation layer made of cholesteric liquid crystal polymer layers of arbitrary two or more colors, as selected from the yellow (Y), magenta (M), cyan (C), blue (B), green (G) and red (R).

The liquid crystal display panel 10 can be used in combination with an active element such as the MIM or the TFT.

(Embodiment 2)

FIG. 1 is a section showing a schematic structure of a reflection type liquid crystal display device of the present embodiment.

As shown in FIG. 1, the liquid panel. 10 is constructed to include the paired transparent substrates 11A and 11B provided with the patterned transparent electrodes 12A and 12B, and the light modulation layer 13 sandwiched between the transparent substrates 11A and 11B. The liquid crystal panel 10 was prepared to have a cell gap of 10 microns. At the back of the liquid crystal panel 10 (as located at the lower side of FIG. 1), there was arranged the color separation layer 20, at the back of which was arranged the reflection layer 30.

The liquid crystal panel 10 and the reflection layer 30 were prepared by a process similar to that of Embodiment 1.

The color separation layer 20 was exemplified in the present embodiment by a dielectric multi-layered thin film which is characterized to transmit the light within a predetermined wavelength range in the visible light region and to reflect the remaining visible lights. This color separation layer 20 of the dielectric multi-layered films is formed by alternately laminating highly transparent dielectric thin films having relatively high refractive indexes and transparent dielectric thin films having relatively low refractive indexes. The individual dielectric multi-layered thin films to be laminated are given an optical thickness as large as one quarter of the center wavelength to be reflected.

At the boundary of the individual dielectric thin films, the reflectivity is the larger for the larger difference between the refractive indexes, as expressed by the following Formula:

$$R=\{(n2-n1)^2/(n2+n1)^2\} \times 100 \ [\%].$$

Here, letter R designates the reflectivity at the boundary between two adjacent films to be laminated, and characters n2 and n1 designate the refractory indexes of the individual dielectric thin films.

The materials to be used in the dielectric thin films are $SiO_2$, $MgF_2$ and $Na_3AlF_6$ for the transparent dielectric thin film of the lower refractive index and $TiO_2$, $ZrO_2$, $Ta_2O_5$, ZnS, ZnSe, ZnTe, Si, Ge, $Y_2O_3$ and $Al_2O_3$ for the transparent dielectric thin film of the higher refractive index. The dielectric material, the film thickness and the number of layers are set according to the reflection wave band, transmission wave band, reflectivity and transmittance. These dielectric thin films can be easily formed by the vacuum evaporation method or the sputtering method. The dielectric multi-layered thin films are given various spectral characteristics by varying their structures so that they can enjoy a higher degree of freedom for design than the metallic thin films.

Figure 14:
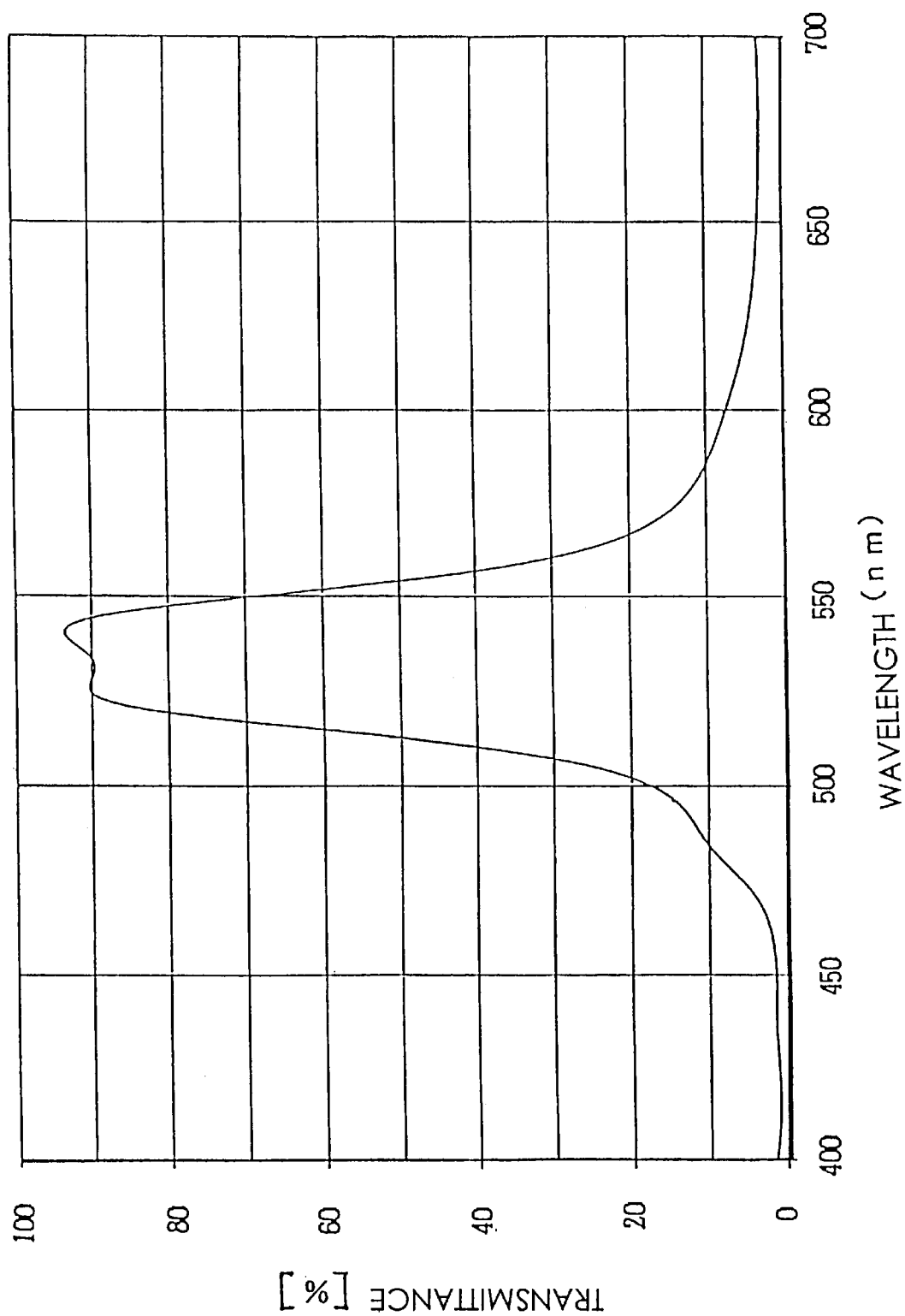
FIG. 14 is a characteristic diagram illustrating the wavelength-transmittance characteristics of a dielectric multi-layered thin film for transmitting a green light.
Figure 15:
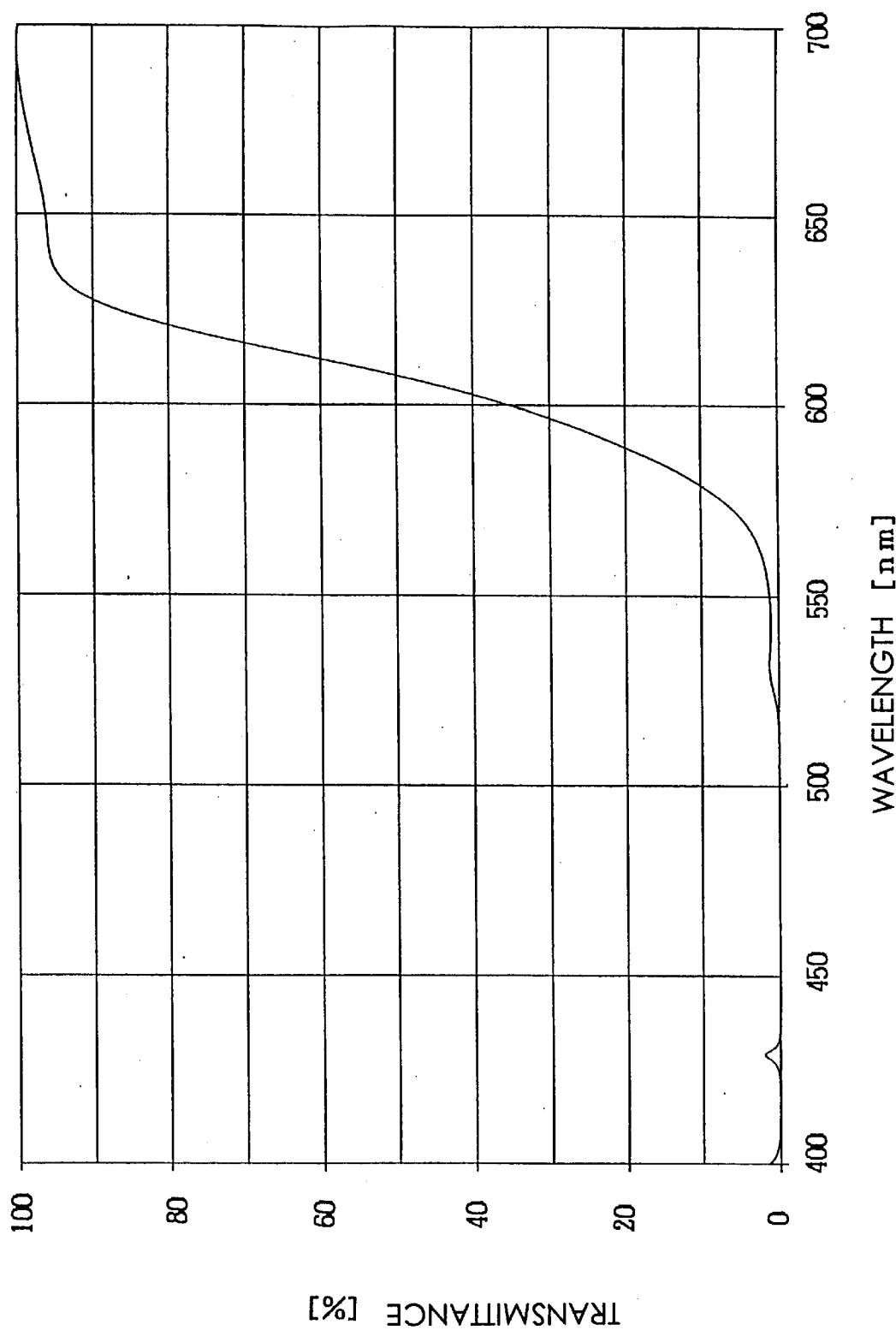
FIG. 15 is a characteristic diagram illustrating the wavelength-transmittance characteristics of a dielectric multi-layered thin film for transmitting a red light.
Figure 16:
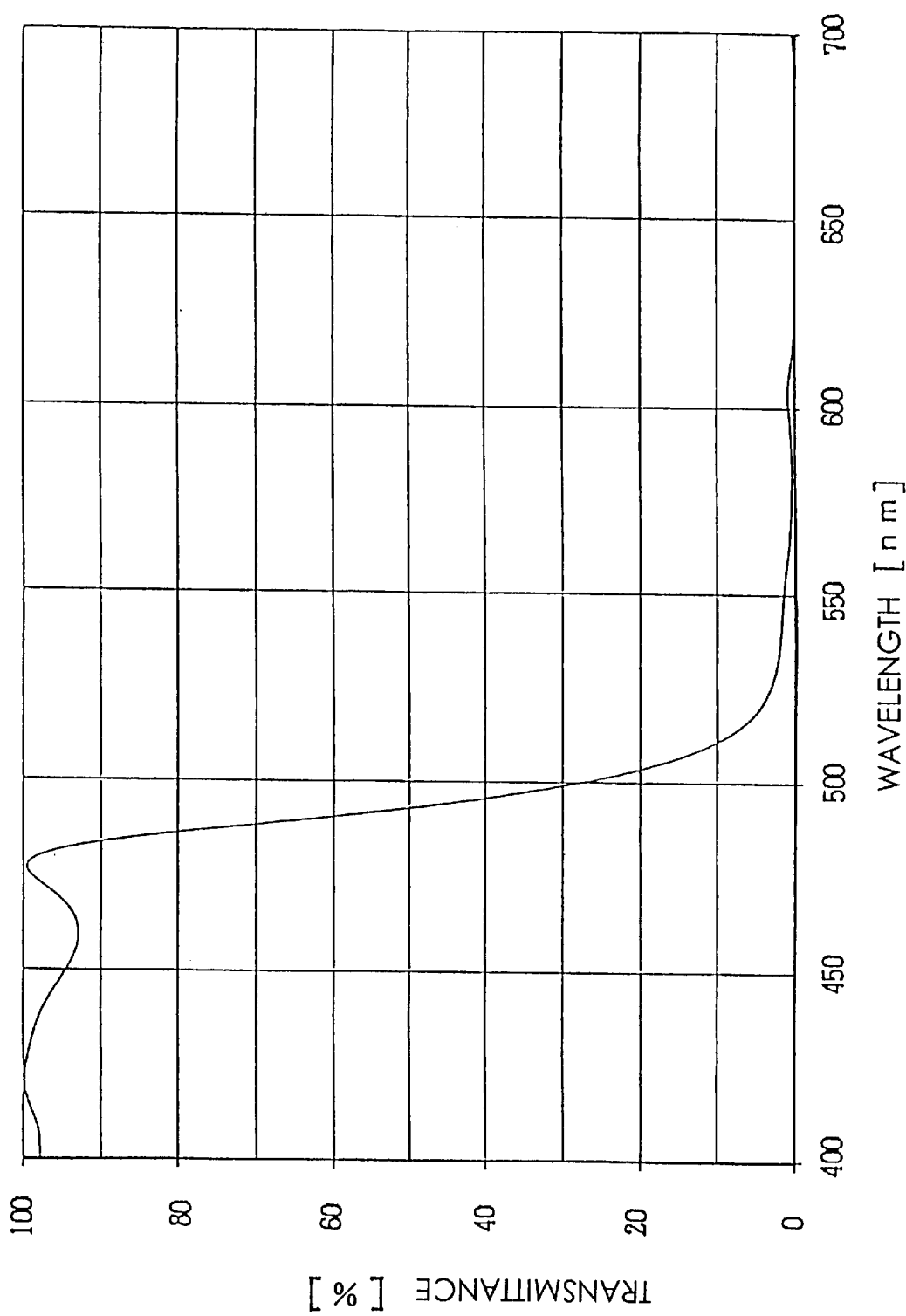
FIG. 16 is a characteristic diagram illustrating the wavelength-transmittance characteristics of a dielectric multi-layered thin film for transmitting a blue light.

In the present embodiment, the color separation layers 20 of three kinds of dielectric multi-layered thin films for transmitting the green, red and blue colors were individually prepared by the vacuum evaporator. Twenty five to thirty color separation layers 20 of those dielectric multi-layered thin films were laminated by using TiO2 for the higher refractive index films and SiO2 for the lower refractive index films. FIGS. 14, 15 and 16 are characteristic diagram illustrating the wavelength-transmittance characteristics of the dielectric multilayered thin films, as measured by the spectro-photometer, for transmitting the green, red and blue lights, respectively.

The color separation layers 20, thus prepared, of these three kinds of dielectric multi-layered thin films for transmitting the green, red and blue colors were individually used to make three kinds of light scattering mode reflection type liquid crystal display devices for displaying the green, red and blue colors.

When these reflection type liquid crystal display devices are observed in the room illuminated with a white light, the incident light L1 is scatted by the light modulation layer into the backward scattered light L2 and the forward scattered lights L5 and L8, as illustrated in the principle diagram of FIG. 2, so that the observer SO views the light which is whited by synthesizing those scattered lights. The color separation layers 20 of the dielectric multi-layered thin films 20' are extremely low in the optical absorption loss and remarkably excellent in the light reflecting/transmitting characteristics. As a result, the light is highly efficiently used so that it is observed in the white color of high brightness like the paper white.

When a sufficient drive voltage is applied, on the other hand, the light modulation layer is transparent, as shown in the principle diagram of FIG. 3, the light of the color, as corresponding to the transmitted light of the color separation layer 20, of the incident light L1 is highly efficiently diffused and reflected (at L7) by the white diffuse reflection layer 30 so that the diffused and reflected light L7 arrives as it is at the eyes of the observer SO. As a result, the clear color of high purity can be seen by the observer.

The reflection type liquid crystal display device, as equipped with the color separation layers 20 of the three kinds of dielectric multi-layered thin films for transmitting the green, red and blue colors, could display the clean green, red and blue colors of high purities on the highly bright white background like the paper white.

The results of the reflectivities and color characteristics of the reflection type liquid crystal display device using the polymer network type polymer dispersed type liquid crystal display panel thus manufactured according to the present embodiment were measured (in the regularly reflection eliminated mode) by the spectro-photometer [CM2002 of Minolta Camera Co., Ltd. adopting the photometric method of the d/8 optical system conforming to DIN(5033 Teil 7) and ISO (7724/1), and the diffuse illumination / vertical light receiving method of JIS-Z8722-1982 conforming to the JIS and are enumerated in Table 1:

TABLE 1

Reflectivities and Color Characteristics of
Reflection Type Liquid Crystal Display Device
of Embodiment 1 of the Invention

| Color Mirror | Voltage ON/OFF | Y | L* | a* | b* |
|---|---|---|---|---|---|
| Green Mirror | Voltage OFF | 45.23 | 73.04 | 5.94 | 3.88 |
| | Voltage ON | 22.83 | 54.90 | −94.27 | 71.37 |
| Red Mirror | Voltage OFF | 44.02 | 72.24 | −0.65 | 2.41 |
| | Voltage ON | 11.95 | 41.13 | 70.89 | 65.85 |
| Blue Mirror | Voltage OFF | 31.40 | 62.84 | 2.96 | 5.85 |
| | Voltage ON | 16.83 | 48.04 | −3.18 | −65.60 |

It is apparent from the measurement data of Table 1 that the reflection type liquid crystal display device, as provided with the color separation layers of three kinds of dielectric multi-layered thin films prepared in Embodiment 1 of the present invention for transmitting the green, red and blue colors, could realize a high bright white like the paper white, when no voltage was applied, and could display the clear green, red and blue colors of high purity when the voltage was applied.

Figure 33:
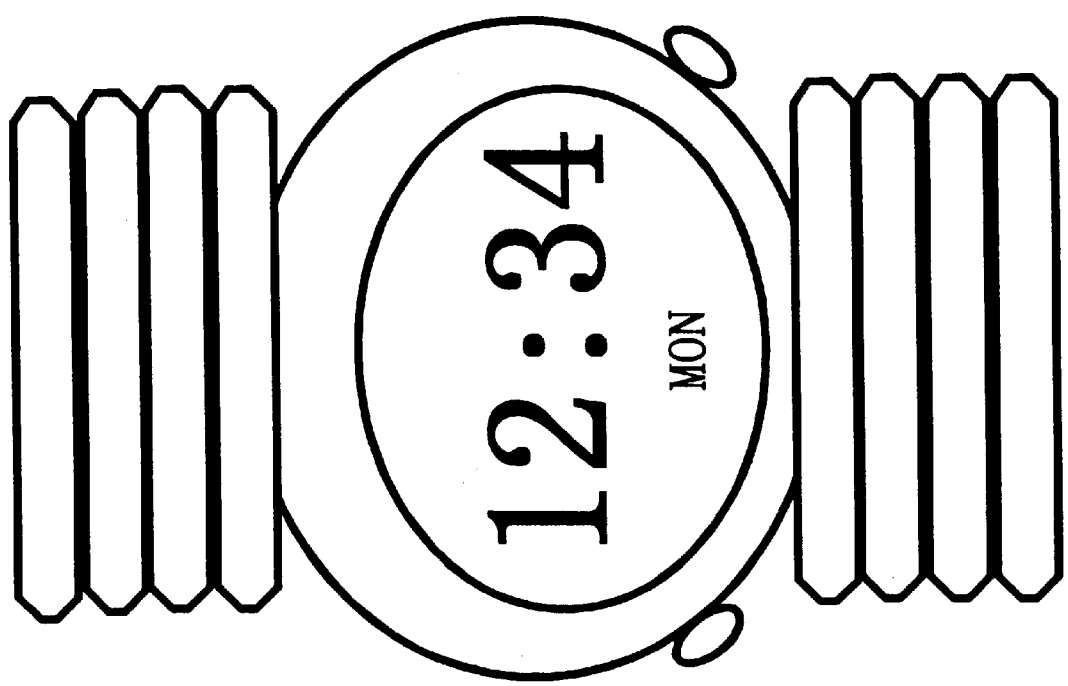
FIG. 33 is a digital wrist watch according to an embodiment of the present invention.

The liquid crystal panel 10 and the reflection layer 30 thus prepared were used, and the color separation layers 20 of three kinds dielectric multi-layered thin films for transmitting the green, red and blue colors were used as the color separation layers 20 to manufacture three kinds of light scattering mode reflection type liquid crystal display device for displaying the green, red and blue colors. These liquid crystal display devices were individually connected with watch driving ICs and were packaged in digital wrist watches, as shown in FIG. 33. these reflection type liquid crystal display devices were observed under the vertically incident condition of a white light. The highly bright white color like the paper white was observed in the regions where no drive voltage was applied, and the displays of the clear green, red and blue colors were observed in the regions of the segment display portions where the drive voltage was applied. As a result, the time could be expressed at the clear color segments on the background as white as the floss thereby to improve the display quality of the watch drastically.

The drive voltage was as low as 3 V, and the current consumption was 0.32 $\mu$A for each liquid crystal panel. The battery was exemplified by the lithium cell of CR2025 type and could live three or more years for the energy source of the wrist watch.

(Embodiment 3)

FIG. 1 is a section showing a schematic structure of a reflection type liquid crystal display device of the present embodiment.

As shown in FIG. 1, the liquid panel 10 is constructed to include the paired transparent substrates 11A and 11B provided with the patterned transparent electrodes 12A and 12B, and the light modulation layer 13 sandwiched between the transparent substrates 11A and 11B. The liquid crystal panel 10 was prepared to have a cell gap of 10 microns. At the back of the liquid crystal panel 10 (as located at the lower side of FIG. 1), there was arranged the color separation layer 20, at the back of which was arranged the reflection layer 30.

The liquid crystal panel 10 and the reflection layer 30 were prepared by a process similar to that of Embodiment 1.

The light modulation layer 13 was exemplified by the polymer-stabilized phase conversion type liquid crystal layer which was given a structure having a planar texture or focal-conic texture stabilized by the three-dimensional net shaped photo-setting resin dispersed in the cholesteric/nematic phase conversion type liquid crystal.

The mixture solution, which was composed of 95.7 wt. % of the chlorine nematic liquid crystal TL215 (of Merck & Co., Inc.), 2.3 wt. % of chiral agent S811 (of Merck & Co., Inc.), 1.9 wt. % of polymer polymer resin precursor 2.7-diacryloyl oxyfluoren and 0.1 wt. % of polymerization initiator of benzoyl methyl-ether, was vacuum-injected into the same vacant cell as that of Embodiment 1, as horizontally oriented in the isotropic state. This cell was irradiated, while being kept at 21° C., to an intensity of 0.1 mW/cm² for sixty min. and then to 40 mW/cm² for 20 secs. to set the polymer resin precursor by the metallic halide lamp using a filter for transmitting an ultraviolet ray of 350 nm to 400 nm.

The light modulation layer 13 of the polymer network type polymer dispersed liquid crystal display panel 10 thus manufactured was observed by using the scanning type electronic microscope and was confirmed that it has the three-dimensional net structure made of the polymer.

The electrooptical characteristics are measured by the photometer made by Canon Inc. Here: the absolute transmittance is designated at T0 for no voltage application; the relative transmittance for no voltage application is 100%;

the transmittance decreased and saturated with the increase in the applied voltage is 0%;

the applied voltage indicating a transmittance of 10% is designated by Vsat; and the applied voltage indicating a transmittance of 90% is designated by Vth.

The result of measurements were as follows:

| | |
|---|---|
| Vth = | 3.6 V |
| Vsat = | 5.7 V |
| T0 = | 82% |
| Absolute Transmittance at Vsat = | 3.6% |
| Current Consumption at Vsat = | 0.95 $\mu A/cm^2$. |

The liquid crystal panel 10 and the reflection layer 30 thus prepared were used, and the color separation layers 20 of three kinds dielectric multi-layered thin films for transmitting the green, red and blue colors were used as the color separation layers 20 to manufacture three kinds of light scattering mode reflection type liquid crystal display device for displaying the green, red and blue colors. These liquid crystal display devices were individually connected with watch driving ICs and were packaged in digital wrist watches, as shown in FIG. 33. these reflection type liquid crystal display devices were observed under the vertically incident condition of a white light. The highly bright white color like the paper white was observed in the regions where no drive voltage was applied, and the displays of the clear green, red and blue colors were observed in the regions of the segment display portions where the drive voltage was applied. As a result, the time could be expressed at the clear color segments on the background as white as the floss thereby to improve the display quality of the watch drastically. The drive voltage was at 6 V, and the current consumption was 0.64 $\mu A$ for each liquid crystal panel. The battery was exemplified by the lithium cell of CR2025 type and could live two or more years for the energy source of the wrist watch.

(Embodiment 4)

Figure 6:
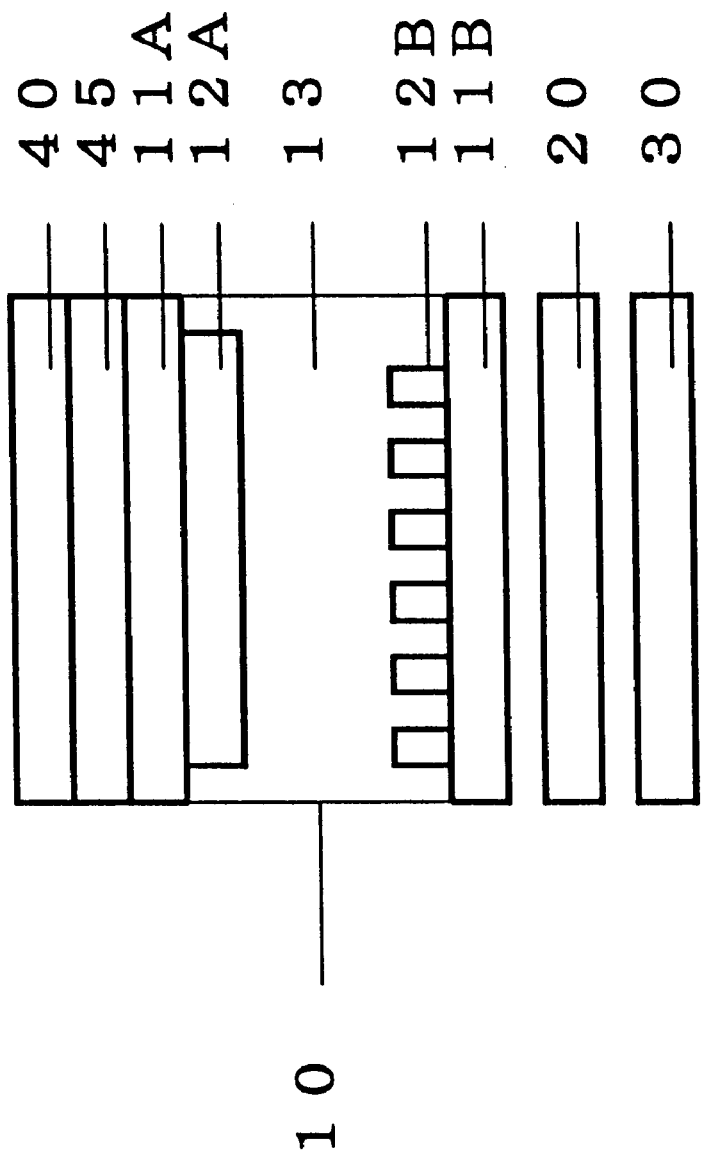
FIG. 6 is a section showing a structure of a reflection type liquid crystal device in a light scattering mode according to an embodiment of the present invention.

FIG. 6 is a section showing a structure of a reflection type liquid crystal display device of the present embodiment. As shown, a liquid crystal panel 10 is constructed to include a pair of transparent substrates 11a and 11B provided with patterned transparent electrodes 12A and 12B, and a light modulation layer 13 sandwiched between the transparent substrates 11A and 11B. The liquid crystal panel 10 was prepared to have a cell gap of 10 microns. On the closest face (as located at the upper side in FIG. 6) of the liquid crystal panel 10 to the observer, there was arranged a reflection preventing layer 40, at the back of which was arranged an ultraviolet cut-off layer 45. At the back (as located at the lower side in FIG. 6) of the liquid crystal panel 10, there was arranged the color separation layer 20, at the back of which was arranged the reflection layer 30.

The liquid crystal panel 10, the color separation layer 20 and the reflection layer 30 were prepared by a process similar to that of Embodiment 2.

Since the light scattering mode reflection type liquid crystal display device requires no polarizing plate, the liquid crystal layer has to be protected by any method because it is weak to the ultraviolet ray. The unnecessary reflection of an ambient light on the liquid crystal panel surface causes problems that the displayed content is hard to view and that the using efficiency of the ambient light drops.

In order to solve these problems, in the reflection type liquid crystal display device of the present embodiment, the reflection preventing layer 40 and the ultraviolet ray cut-off layer 45 were arranged on the closest upper face of the liquid crystal to the observer.

In addition to the method of arranging the two kinds of films of the ultraviolet ray cut-off layer and the reflection preventing layer individually on the liquid crystal panel 10, there is another method of arranging the ultraviolet ray cut-off layer and the reflection preventing layer, as integrated, on the liquid crystal panel 10. This latter arrangement is preferred because its larger practical effect.

The reflection preventing layer 40 was provided for preventing the visibility from being deteriorated by the unnecessary reflection of the ambient light on the liquid crystal panel surface. This reflection preventing layer 40 may be exemplified by a single- or multi-layered interference film of a transparent substrate or transparent electrode and an inorganic substance having an adjusted refractive index such as $SiO_2$, $TiO_2$, $ZrO_2$, $MgF_2$, $Al_2O_3$ or $CeF_3$ or an organic substance such as polyimide, a film having a finely roughed surface (facing the incident light) for preventing the regular reflection by the scattering, or a composite of the two.

On the other hand, the ultraviolet ray cut-off layer is exemplified by a transparent glass plate or a transparent plastic sheet which is prepared by absorbing or reflecting the ultraviolet ray of a wavelength of 390 nm or shorter.

In the present embodiment, more specifically, the ultraviolet ray cut-off layer 45 was exemplified by the TAC (triacetyl cellulose) containing about 0.1% of an ultraviolet ray absorbing agent of benzotriazole, to form the reflection preventing layer 40 on the upper face of the TAC by the vacuum evaporator. This reflection preventing layer 40 was formed by laminating four layers of $MgF_2$ (n=1.38) as the low refractive index film, $TiO_2$ (n=2.3) as a high refractive index film and $CeF_3$ (n=1.63) as an intermediate refractive index film. A transparent adhesive layer was arranged on the lower ace of the TAC (triacetyl cellulose).

Figure 17:
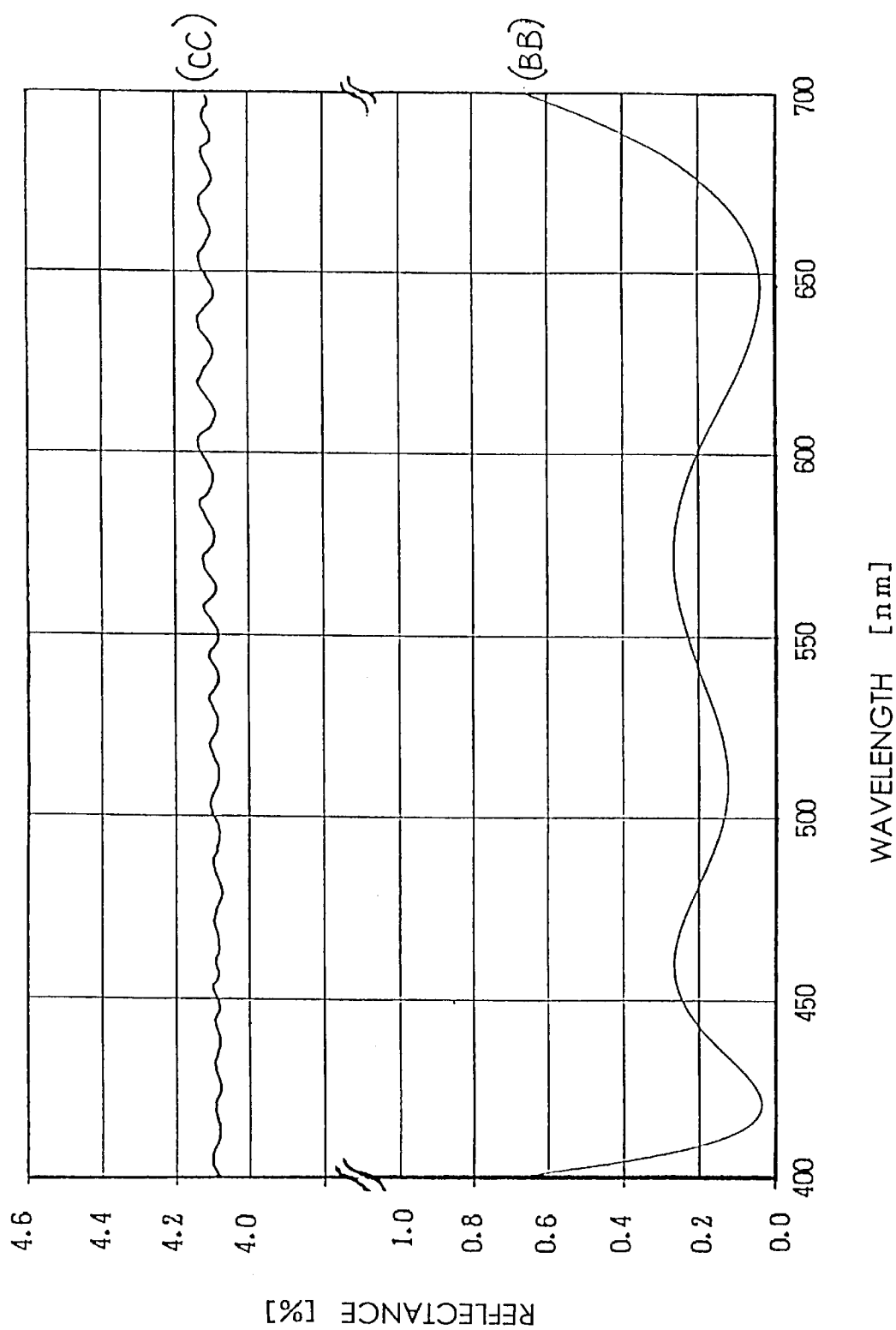
FIG. 17 is a characteristic diagram illustrating a reflection spectrum of a transparent substrate surface on which are arranged an anti reflection layer and an ultraviolet ray cutoff layer of the present invention.

The integrated structure thus made of the ultraviolet ray cut-off layer ad the reflection preventing layer was adhered to the surface of the transparent substrate 11A of the liquid crystal panel 10, and its reflection spectrum was measured. The measurement result is plotted by (BB) in FIG. 17. Here, curve (CC) in FIG. 17 plots the case having no integral film of the ultraviolet ray cut-off layer and the reflection preventing layer. As apparent from FIG. 17, the reflectivity is drastically lower over the range of 400 nm to 700 nm. Over the reflection type liquid crystal display device having no lamination of the ultraviolet ray cut-off layer+the reflection preventing layer, the reflection type liquid crystal display device of Embodiment 2 having the lamination of the ultraviolet ray cut-off layer+the reflection preventing layer is considerably improved in the visibility of the displayed content, as might otherwise be deteriorated by the reflection of the ambient light on the liquid crystal panel surface, and is drastically improved in the deterioration of the liquid crystal, as might otherwise be caused by the ultraviolet ray in the fading test.

(Embodiment 5)

FIG. 6 is a section showing a structure of a reflection type liquid crystal display device of the present embodiment. As shown, a liquid crystal panel 10 is constructed to include a pair of transparent substrates 11a and 11B provided with patterned transparent electrodes 12A and 12B, and a light modulation layer 13 sandwiched between the transparent substrates 11A and 11B. The liquid crystal panel 10 was prepared to have a cell gap of 10 microns. On the closest face (as located at the upper side in FIG. 6) of the liquid crystal panel 10 to the observer, there was arranged a reflection preventing layer 40, at the back of which was arranged an ultraviolet cut-off layer 45. At the back (as located at the lower side in FIG. 6) of the liquid crystal panel 10, there was arranged the color separation layer 20, at the back of which was arranged a reflection layer 30 having photo-storage characteristics, so that a reflection type liquid crystal display device was constructed. The liquid crystal panel 10, the color separation layer 20 and the reflection preventing layer 40 were prepared by a process similar to that of Embodiment 4.

In the present embodiment, the reflection layer 30 was exemplified by one which was made of a substance having the photo-storage characteristics. This photo-storage material absorbs and stores the light energy of the ultraviolet ray of the illumination or daylight and emits of itself by its stored light energy. By using the reflection layer made of the substance having the photo-storage characteristics, it is possible to realize a power economy type liquid crystal display device which is bright and visible even in the dark atmosphere.

In the present embodiment, more specifically, the photo-storage material was exemplified by the material (or the product of Nemoto & Co., Ltd.) which was prepared by a rare earth metal element to the mother crystal of strontium aluminate $SrAl_2O_4$ of an excellent photostorage, and by applying the prepared material to a pulp member. The photo-storage material thus prepared absorbs and stores the light energy efficiently within the range (i.e., 370 nm to 400 nm) of the ultraviolet ray and has an remarkably excellent light emitting efficiency.

In the present embodiment, the ultraviolet ray cut-off layer 45 was exemplified by the ultraviolet ray cut-off layer which was characterized to transmit the ultraviolet ray of the wavelength necessary for the photo-storage characteristics of the reflection layer and to cut off the ultraviolet ray of the wavelength harmful to the liquid crystal layer. Specifically, this ultraviolet ray cut-off layer 45 was exemplified by the transparent glass substrate or the transparent plastic sheet which was prepared to absorb or reflect the ultraviolet ray of a wavelength of 370 nm or shorter. More specifically, the ultraviolet ray cutoff layer 45 was prepared by using the TAC (triacetyl cellulose) containing the ultraviolet ray absorbing agent.

At the same time, the reflection preventing layer 40 was prepared to have characteristics for transmitting the lights excellently from the ultraviolet ray of 370 nm or longer to the visible light so that the spectral characteristics within the ultraviolet region (i.e., 370 nm to 400 nm) might conform to those of the ultraviolet ray cut-off layer 45.

The integral structure thus made of the ultraviolet ray cut-off layer 45 and the reflection preventing layer 40 was adhered to the surface of the transparent substrate 11A of the liquid crystal panel 10, and the w diffuse layer having the photo-storage characteristics was used as the reflection layer 30. The color separation layer 20 was exemplified by that of three kinds of dielectric multi-layered thin films for transmitting the ultraviolet ray (i.e., 370 nm to 400 nm) and the green light, the ultraviolet ray (i.e., 370 nm to 400 nm) and the red light, and the ultraviolet ray (i.e., 370 nm to 400 nm) and the blue light, thereby to prepare three kinds of light scattering mode reflection type liquid crystal display devices fo displaying the green, red and blue colors. These three kinds of reflection type liquid crystal display devices were left under a fluorescent lamp for 5 mins., and the displays were confirmed in a dark room. All the displays could be clearly visibly confirmed, and this state continued for 1 hour or more. Even when the atmosphere grew darker, it was also confirmed that the bright displays could be kept.

These three kinds of reflection type liquid crystal display devices were subjected to the sun shine carbon arc tests. As a result, it was confirmed that the deterioration of the liquid crystal was made drastically different depending upon whether or not the ultraviolet ray cut-off layer 45 thus prepared was present, and that the liquid crystal of the reflection liquid crystal display device provided with the ultraviolet ray cut-off layer was hardly deteriorated but stable.

As a result, by the reflection liquid crystal display device thus constructed according to the present embodiment in combination of the ultraviolet ray cut-off layer 45, the reflection preventing layer 40, the color separation layer 20 and the reflection layer 30 made of the photostorage characteristics, it was possible to realize the power economy type liquid crystal display device which can continue the highly clear and visible state even when the atmosphere was dark.

(Embodiment 6)

FIG. 6 is a section showing a structure of a reflection type liquid crystal display device of the present embodiment. As shown, a liquid crystal panel 10 is constructed to include a pair of transparent substrates 11a and 11B provided with patterned transparent electrodes 12A and 12B, and a light modulation layer 13 sandwiched between the transparent substrates 11A and 11B. The liquid crystal panel 10 was prepared to have a cell gap of 10 microns. On the closest face (as located at the upper side in FIG. 6) of the liquid crystal panel 10 to the observer, there was arranged a reflection preventing layer 40, at the back of which was arranged an ultraviolet cut-off layer 45. At the back (as located at the lower side in FIG. 6) of the liquid crystal panel 10, there was arranged the color separation layer 20, at the back of which was arranged a reflection layer 30 having fluorescent characteristics, so that a reflection type liquid crystal display device was constructed. The liquid crystal panel 10, the color separation layer 20 and the reflection preventing layer 40 were prepared by a process similar to that of Embodiment 5.

In the present embodiment, the reflection layer 30 was exemplified by a white diffuse reflection layer having fluorescent characteristics. A substance having the fluorescent characteristics emits a light, when stimulated by the irradiation of the daylight (of the sunshine) or the artificial light such as the fluorescent or mercury lamp, but not without the irradiation.

In the present embodiment, the fluorescent white diffuse reflection layer was prepared by dying the pulp paper with a fluorescent brightening agent. This brightening agent was exemplified by "Kayaphor 3BS Liquid" of Nippon Kayaku Co., Ltd. The fluorescent brightening agent can convert the light in a wavelength range of the ultraviolet ray, as invisible to human eyes, efficiently into a light in the visible range and can increase the brightness of the optically diffuse reflection layer and accordingly the brightness of the reflection type liquid crystal display device.

This fluorescent diffuse reflection layer may be formed not only by the method of dying with the fluorescent brightening agent but also by a method of coating with the fluorescent brightening agent or a method of mixing a resin called the binder and the fluorescent brightening agent to print with the mixture.

This fluorescent brightening agent can convert the ultraviolet ray (especially within 370 to 400 nm) efficiently into a right in a visible range.

In the present embodiment, the ultraviolet ray cut-off layer 45 was exemplified by that which was characterized to transmit the ultraviolet ray (especially within 370 nm to 400 nm) within the wavelength necessary for the fluorescence of the reflection layer and to cut off the ultraviolet ray within the wavelength harmful to the liquid crystal layer. In short, the ultraviolet ray cut-off layer 45 is a transparent glass substrate or a transparent plastic sheet which was prepared for absorbing or reflecting the ultraviolet ray in the wavelength of 370 nm or shorter. Specifically, the ultraviolet ray cut-off layer 45 was made of the TAC (triacetyl cellulose) containing an ultraviolet ray absorbing agent.

At the same time, the reflection preventing layer 40 was formed to have characteristics to transmit the light from the ultraviolet ray of 370 nm or longer to the visible light efficiently so that the spectral characteristics within the ultraviolet range (especially within 370 nm to 400 nm) might conform to those of the ultraviolet ray cut-off layer 45.

At the same time, the color separation layer 20 was formed of a dielectric multi-layered thin film which was characterized to transmit the light within a predetermined wavelength range in the visible light region and the ultraviolet ray of 370 nm to 400 nm and to reflect the remaining lights.

The liquid crystal panel 10, the ultraviolet ray cut-off layer 45, the reflection preventing layer 40 and the reflection layer 30 having the fluorescent characteristics were used, and the color separation layers 20 of three kinds dielectric multi-layered thin films for transmitting the ultraviolet ray (especially within 370 nm to 400 nm) and the green color, the ultraviolet ray (especially within 370 nm to 400 nm) and the red color, and the ultraviolet ray (especially within 370 nm to 400 nm) and the blue color were used as the color separation layers 20 to manufacture three kinds of light scattering mode reflection type liquid crystal display device for displaying the green, red and blue colors. These liquid crystal display devices were individually connected with watch driving ICs and were packaged in digital wrist watches, as shown in FIG. 33. these reflection type liquid crystal display devices were observed under the vertically incident condition of a white light. The highly bright white color like the paper white was observed reflecting the effect of the fluorescent white diffuse reflection layer in the regions where no drive voltage was applied, and the displays of the clear green, red and blue colors were observed in the regions of the segment display portions where the drive voltage was applied. As a result, the time could be expressed at the clear color segments on the background as white as the floss thereby to improve the display quality of the watch drastically. The drive voltage was at 3 V, and the current consumption was 0.32 μA for each liquid crystal panel. The battery was exemplified by the lithium cell of CR2025 type and could live three or more years for the energy source of the wrist watch.

(Embodiment 7)

FIG. 18 is a section showing a structure of a reflection type liquid crystal display device of the present embodiment. As 'shown in FIG. 18, a liquid crystal panel 10 is constructed to include a pair of transparent substrates 11A and 11B provided with patterned transparent electrodes 12A and 12B, and a light modulation layer 13 sandwiched between the transparent substrates 11A and 11B. The liquid crystal panel 10 was prepared to have a cell gap of 10 microns. At the back (as located at the lower side in FIG. 18) of the liquid crystal panel 10, there was arranged a Bragg reflection layer 20 as the color separation layer, at the back of which was arranged a reflection layer 30. The liquid crystal panel 10 was prepared by a process similar to that of Embodiment 2.

In the present embodiment, the reflection layer 30 was exemplified by a regular reflection plate made of aluminum and having excellent reflectivity characteristics so as to realize a clear color of high purity. This reflection layer 30 plays an important role for realizing the clear color of high purity. In order to realize this clear color of high purity, it is desirable to use a regular reflection layer having a uniform reflectivity over the whole wavelength in the visible light region and high characteristics. Moreover, the reflection layer 30 is desired to have a thickness left uninfluenced by the color of the background object. For the reflection layer 30, not only the aluminum but also a material can be widely selected within the range of transmittance desired by the present invention. In addition to the aluminum, the present invention can employ a metal such as silver, nickel, chromium or palladium or their alloy or oxide. The alloy may be exemplified by the nichrome containing 80% of Ni and 20% of Cr. Two kinds of metallic films may be combined. For example, the reflection layer 30 was formed by forming a silver film of about 100 angstroms and then by forming an aluminum film of about 50 angstroms.

On the other hand, the reflection layer 30 may be formed of a dielectric multi-layered film, and the material, film thickness and layer number of the film of Si, $SiO_2$, Ge, $Y_2O_3$, $Al_2O_3$, $MgF_2$, $Na_3AlF_6$, $TiO_2$, $ZrO_2$, $Ta_2O_5$, ZnS, ZnSe or ZnTe are set according to the reflectivity and transmittance, as necessary.

Figure 21:
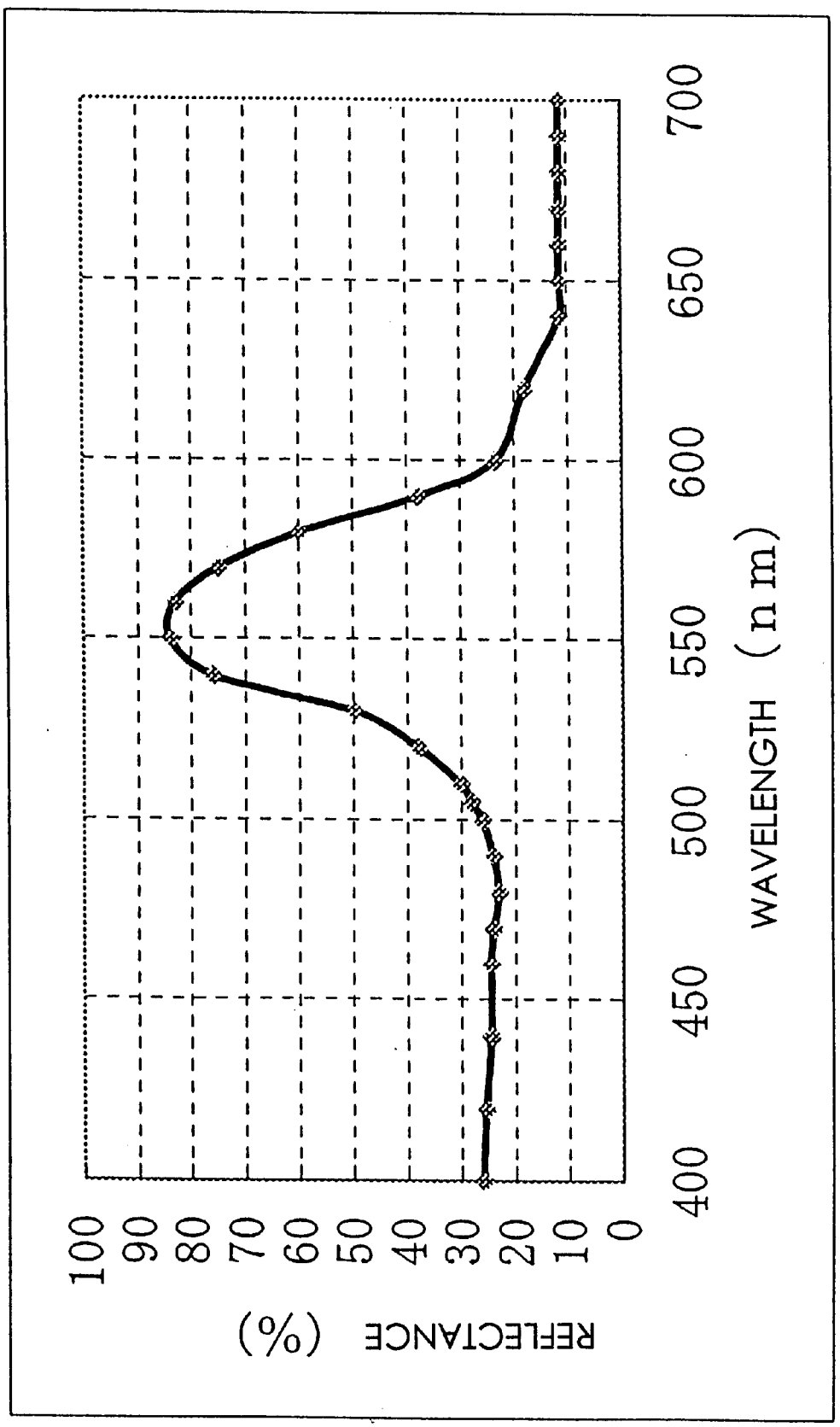
FIG. 21 is a diagram illustrating a spectral reflectivity of a green volume hologram.

In the present embodiment, the Bragg reflection layer 20 was exemplified by the volume hologram (HB-GS) of Polaroid Co., Ltd. FIG. 21 is a diagram illustrating wavelength-reflectivity characteristics, as measured by the spectral reflectivity meter from the Bragg reflection layer 20 for diffracting the green light of the volume hologram used in the present embodiment. The spectral reflectivity was measured by the meter (e.g., the self-recording spectrophotometer 330 of Hitachi, Ltd.), and the measuring method was under the condition III of JIS28722.

Thus, the green displaying light scattering mode reflection type liquid crystal display device was manufactured by using the Bragg reflection layer 20 made of the volume hologram 20A for diffracting the green color. This green displaying light scattering mode reflection type liquid crystal display device was observed under a fluorescent lamp of 60 W in the room and was found to display a clear green color on the white background of the paper white.

By using the red displaying (HB-RS) or blue displaying (HB-BS) Bragg reflection layer 20 of the volume hologram, moreover, a clear red or blue display was also achieved on the white background of the paper white.

(Embodiment 8)

Figure 26:
FIGS. 26A–26I presents schematic sections showing a process for manufacturing the reflection type liquid crystal display device of the present invention.

FIG. 26 shows one embodiment of a process for manufacturing a reflection type liquid crystal display device of the present invention. First of all, an optically diffuse reflection layer 3 is formed on a transparent substrate 1a, as shown in FIG. 26A. Specifically, a metallic silver film having a thickness of 0.5 microns is formed on the surface of the transparent substrate 1a by the sputtering method and is then finely roughed in the surface by the sandblasting method. By this treatment, the silver surface having a metallic luster is worked and denaturated into an optically diffuse surface. Thus, the optically diffuse reflection layer 3 was formed of the metallic silver. The sandblasting condition was adjusted to give a surface roughness of 1000 at the RA value. The reflective efficiency of the optically diffuse reflection layer was measured to indicate 140 for the standard diffuse plate of 100 by the spectro-photometer CM2002 of Minolta so that a remarkably bright reflection layer was provided. Here, the RA value was defined on an average roughness of the center line by DEKTAKIIA or the product of Nippon Shinku Gijutsu Co., Ltd.

Next in FIG. 26B, a color separation layer 2R for transmitting the red color and reflecting the remaining visible lights is formed of the dielectric multi-layered thin film by using the vacuum evaporation apparatus. This red-color transmitting color separation layer has the following construction (having an optical film thickness of n×d at nm, wherein n: a refractive index, and d: a film thickness). Letter×in "{ }$^{x}$" designates the number of repetitions of lamination. The spectral characteristics, as obtained by this dielectric multi-layered thin film, are plotted in FIG. 30. As seen from FIG. 30, the red-color transmitting color separation layer 2R has an extremely high transmittance in the vicinity of 630 nm indicating the red color and an excellent color purity.

The construction of the red-color transmitting color separation layer:

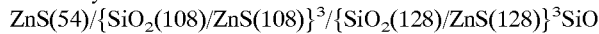
ZnS(54)/{SiO$_2$(108)/ZnS(108)}$^3$/{SiO$_2$(128)/ZnS(128)}$^3$SiO$_2$(128)/ZnS(64)

Figure 30:
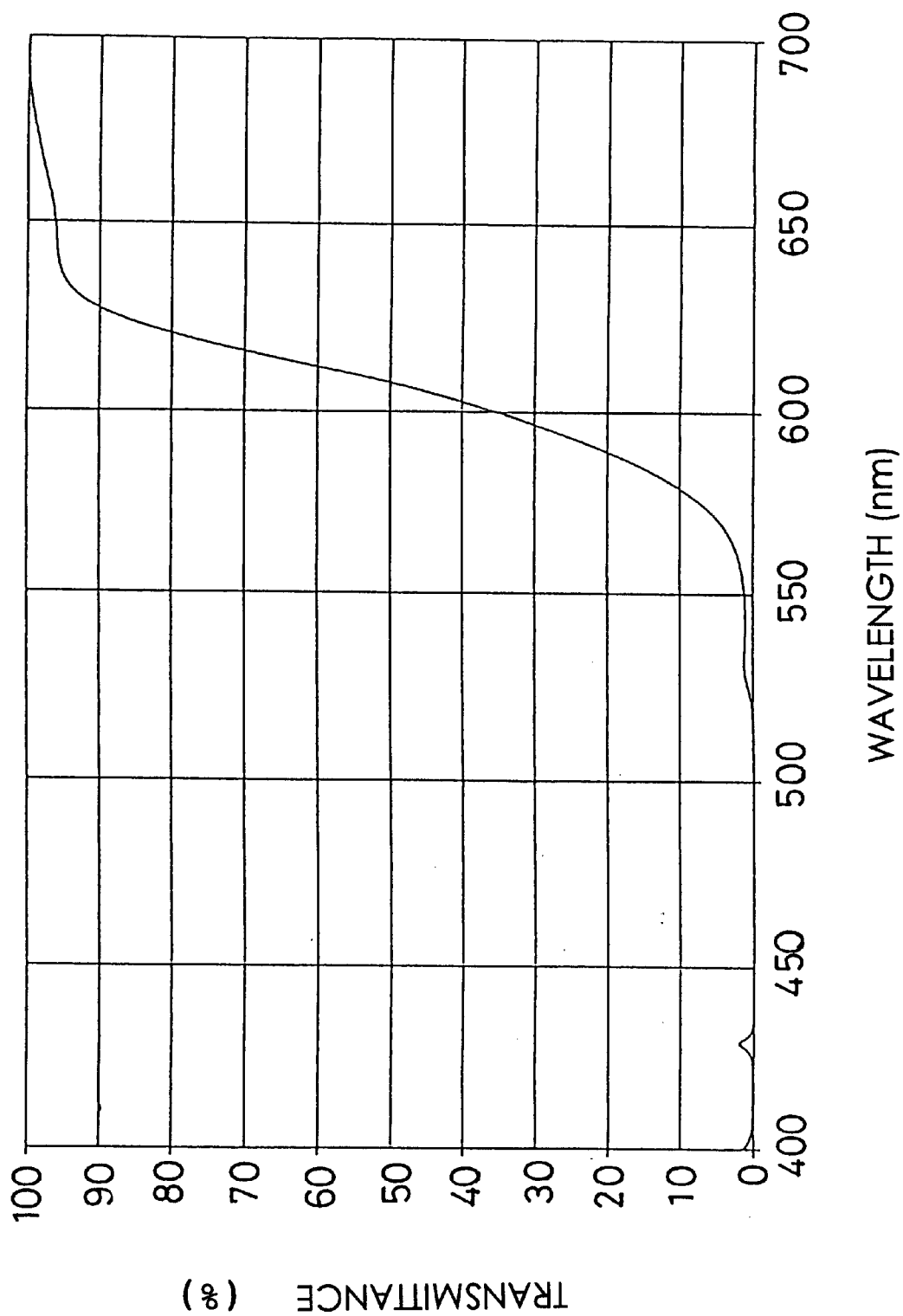
FIG. 30 illustrates spectral characteristics of a red separation layer of the embodiment of the present invention.
Figure 31:
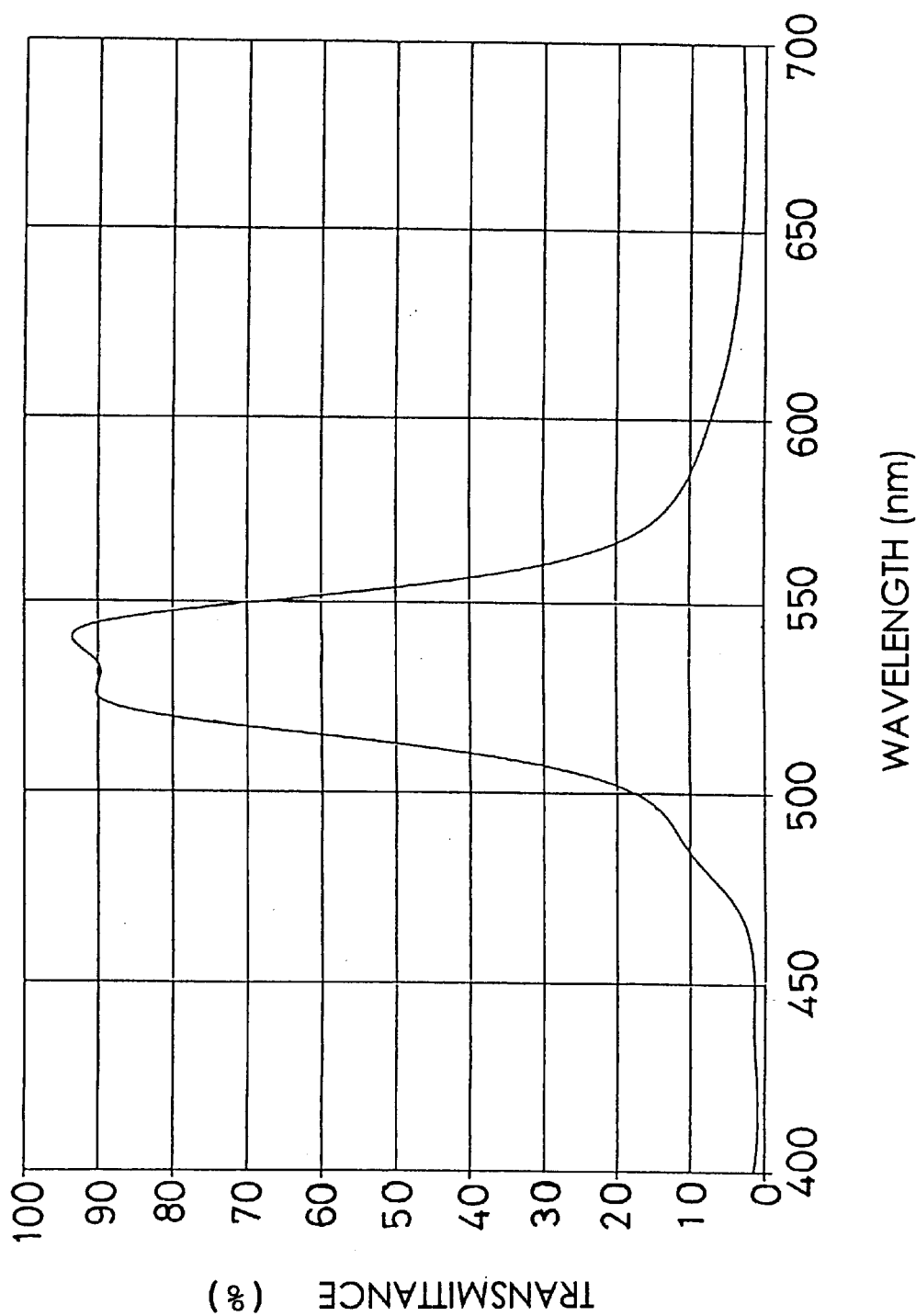
FIG. 31 illustrates spectral characteristics of a green separation layer of the embodiment of the present invention.
Figure 32:
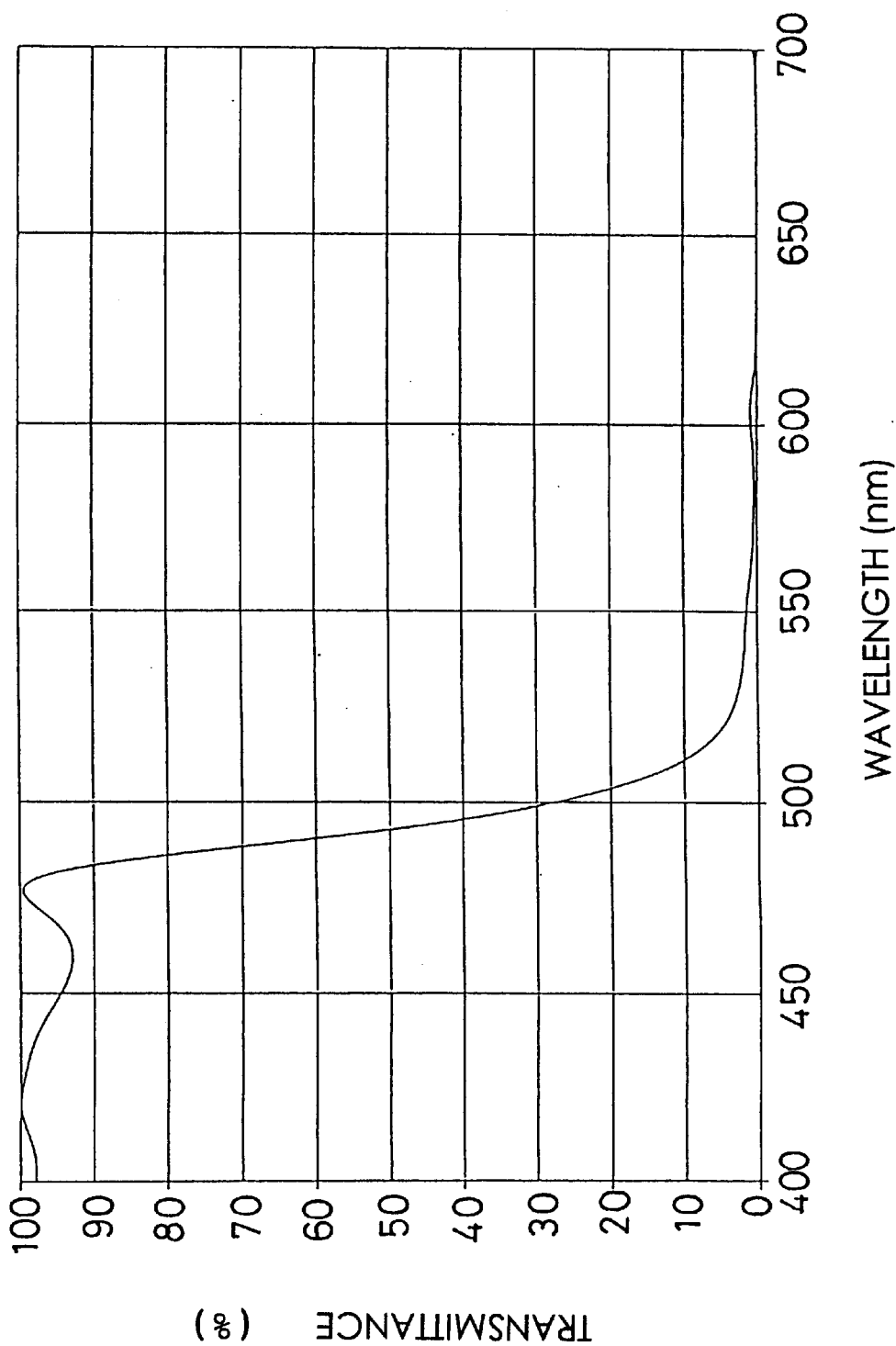
FIG. 32 illustrates spectral characteristics of a blue separation layer of the embodiment of the present invention.

A photosensitive resist 11 was applied to the surface of the dielectric multi-layered thin film 2R and exposed to an ultraviolet ray (as shown in FIG. 26C) by using a mask 12 having a desired pattern and was then etched to form the pattern (as shown in FIG. 26D) of the color separation layer 2R(as shown in FIG. 26E). Likewise, green color and blue-color transmitting color separation layers 2G and 2B were prepared (as shown in FIG. 26F). These green color and blue-color color separation layers 2G and 2B have the following constructions (having an optical film thickness of n×d at the unit of nm). These spectral characteristics are illustrated in FIGS. 30 and 31, respectively. The green-color and blue color transmitting color separation layers 2G and 2B, as illustrated in FIGS. 31 and 32, also have clear color purities at around 540 nm for the green color and at around 460 nm for the blue color.

The construction of the green-color transmitting color separation layer 2G:

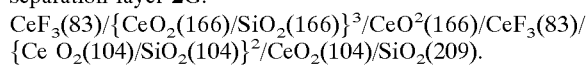
CeF$_3$(83)/{CeO$_2$(166)/SiO$_2$(166)}$^3$/CeO$^2$(166)/CeF$_3$(83)/{Ce O$_2$(104)/SiO$_2$(104)}$^2$/CeO$_2$(104)/SiO$_2$(209).

The construction of the blue color transmitting color separation layer 2B:

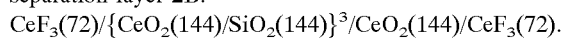
CeF$_3$(72)/{CeO$_2$(144)/SiO$_2$(144)}$^3$/CeO$_2$(144)/CeF$_3$(72).

Next, transparent electrodes 4a were filmed by the sputtering method on the surfaces of the color separation layers 2R, 2G and 2B, as shown in FIG. 26G. These transparent electrodes 4a were made of oxides of indium and tin, as called the "ITO", and had a sheet resistance of 20Ω/□.

Then, the transparent electrodes 4a were made similar to the color separation layers 2R, 2G and 2B by the photolithography, as shown in FIG. 26H and FIG. 26I.

Figure 25:
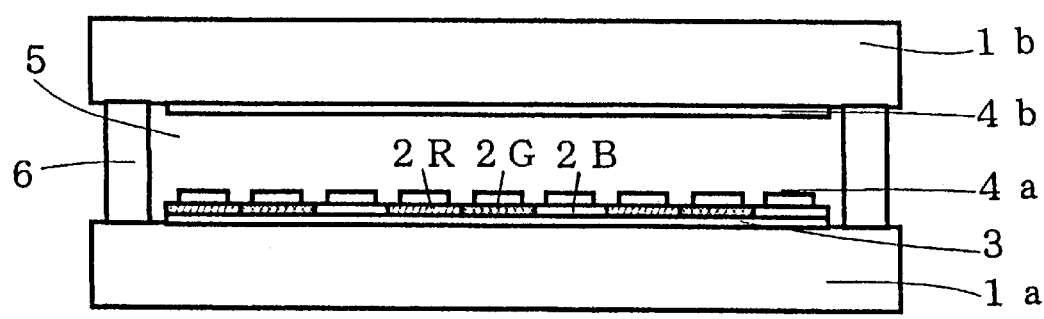
FIG. 25 is a schematic section of a reflection type liquid crystal display device according to one embodiment of the present invention.

The transparent substrate 1a, as formed of the optically diffuse reflection layer 3, the color separation layers 2R, 2G and 2B and the transparent electrodes 4a, and an opposed substrate 1b, as formed of patterned transparent electrodes 4b, constructed the cell of a reflection type liquid crystal display device, as shown in FIG. 25. At this time, the cell was manufactured by the thermocompression bonding method, that is, by selecting and scattering the spacer to give cell gaps of 8 microns and 16 microns and by printing and applying a sealer to the outer periphery of the opposed substrate 1b.

A polymer dispersed liquid crystal 5 of PN-LC (i.e., PSI-1010 made by DAINIPPON INK CHEMICAL, INCORPORATED) was injected into that cell and was irradiated with an ultraviolet ray having an energy intensity of 3,000 mj/cm$^2$, to form the light modulation layer. At the same time, there were manufactured under the same conditions an evaluating reflection type liquid crystal display device, which had unpatterned color separation layers 2R, 2G and 2B for covering the entire cell, and a comparing reflection type liquid crystal display device which employed a standard white plate as the reflection layer but no color separation layer.

By applying drive voltages of 0 V and 5 V to the evaluating reflection type liquid crystal display device thus manufactured, the x and y values indicating the color levels (i.e., the XYZ display color system of the standard display color system CIE1931) of the color display, and the Y value indicating the brightness were measured and are enumerated in Table 2 (in the regular reflection eliminated mode by using the spectrophotometer CM2002 of Minolta Camera Co., Ltd.):

TABLE 2

Optical Characteristics of Example of Reflection Type Liquid Crystal Display Device of the Invention

| | | Thickness of Light Modulation Layer | | | | | |
|---|---|---|---|---|---|---|---|
| | Applied | 8 μm | | | 16 μm | | |
| | Voltage | x | y | Y | x | y | Y |
| Characteristics of Standard White Plate | 0 V | 0.31 | 0.31 | 85.2 | 0.31 | 0.31 | 84.7 |
| | 5 V | 0.31 | 0.32 | 82.2 | 0.31 | 0.32 | 80.9 |
| Characteristics of Red Separating Mirror Cell | 0 V | 0.30 | 0.32 | 44.3 | 0.32 | 0.33 | 48.5 |
| | 5 V | 0.66 | 0.32 | 14.5 | 0.69 | 0.30 | 15.2 |
| Characteristics of Green Separating Mirror Cell | 0 V | 0.31 | 0.32 | 48.4 | 0.33 | 0.33 | 49.9 |
| | 5 V | 0.27 | 0.65 | 24.3 | 0.29 | 0.71 | 26.1 |
| Characteristics of Blue Separating Mirror Cell | 0 V | 0.30 | 0.31 | 33.9 | 0.33 | 0.33 | 38.3 |
| | 5 V | 0.15 | 0.14 | 17.8 | 0.13 | 0.13 | 19.3 |

It is found from Table 2 that the color display reflection type liquid crystal display device manufactured has a color purity similar to that of the standard white plate at the voltage of 0 V and has bright red, green and blue colors.

Moreover, the reflection type liquid crystal display device according to the present invention, as shown in FIG. 25, was driven under the condition that the voltage to be applied to each pixel portion at the intersection between each signal electrode 4a and each scanning electrode 4b is higher than the saturation level of PN-LC5. A variety of beautiful color displays were obtained in combination of the three red, green and blue colors on the bright white background of the paper white.

As another example of the multi-color display, the regions corresponding to the individual segments of the letters of a seven-segment construction of a digital watch were formed by a method similar to the aforementioned color separation layer forming method into the color separation layers of seven kinds of different hues (i.e., red, green, blue, yellow, red purple, blue green and orange). The color separation layers, the liquid crystal panel and the reflection layer 30, thus prepared, were used to manufacture a light scattering mode reflection type liquid crystal display device. This liquid crystal display device was connected with the watch driving IC and the battery and was packaged in the digital wrist watch, as shown in FIG. 33. The display state of the digital digital wrist watch was observed. The individual segments of the letters of the even-segment construction could be displayed in the seven kinds of different clear colors on the background as white as the floss thereby to make a very colorful, bright and attractive display of novel design.

As described above, according to the present invention, it is possible to realize the reflection type liquid crystal display device which can display multiple colors on the bright white background.

(Embodiment 9)

Figure 27:
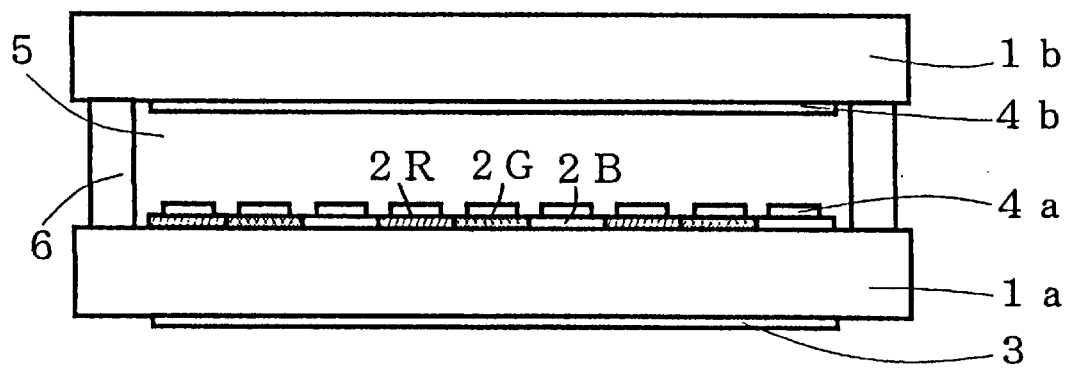
FIG. 27 presents schematic sections showing a reflection type liquid crystal display device of another embodiment of the present invention.

Another embodiment of the present invention will be described with reference to FIG. 27. FIG. 27 is a schematic section showing a reflection type liquid crystal display device according to the present invention when the optically diffuse reflection plate 3 of Embodiment 8 is formed on the opposite side of the substrate 1*a*.

First of all, to one substrate 1*a*, there was applied the optically diffuse reflection plate 3 (i.e., Lumirror E60L of Toray Industries, Inc.) which was prepared by treating the polymer resin film such as a polyester film to give it a high reflection and diffusion.

Next, the color separation layers 2R, 2G and 2B and the transparent electrodes 4*a* identical to those of Embodiment 8 were formed by the method, as described with reference to FIG. 26, on the surface, as opposed to the optically diffuse reflection layer 3, of the substrate 1*a*. Then, the two kinds of light modulation layers 5 having thicknesses of 8 microns and 16 microns were formed by a method similar to that of Embodiment 8 thereby to manufacture the reflection type liquid crystal display device, as shown in FIG. 27.

As in Embodiment 8, the evaluating reflection type liquid crystal display device was manufactured, and the drive voltages of 0 V and 5 V were applied to the evaluating reflection type liquid crystal display device. The x and y values indicating the color levels (i.e., the XYZ display color system of the standard display color system CIE1931) of the color display, and the Y value indicating the brightness were measured and are enumerated in Table 3 (in the regular reflection eliminated mode by using the spectrophotometer CM2002 of Minolta Camera Co., Ltd.):

TABLE 3

Optical Characteristics of Another Example of Reflection Type Liquid Crystal Display Device of the Invention

| | | Thickness of Light Modulation Layer | | | | |
|---|---|---|---|---|---|---|
| | Applied | 8 μm | | | 16 μm | |
| | Voltage | x | y | Y | x | y | Y |
| Characteristics of Standard White Plate | 0 V | 0.31 | 0.31 | 85.2 | 0.31 | 0.31 | 84.7 |
| | 5 V | 0.31 | 0.32 | 82.2 | 0.31 | 0.32 | 80.9 |
| Characteristics of Red Separating Mirror Cell | 0 V | 0.30 | 0.32 | 44.4 | 0.32 | 0.32 | 48.0 |
| | 5 V | 0.61 | 0.33 | 14.2 | 0.65 | 0.30 | 15.0 |
| Characteristics of Green Separating Mirror Cell | 0 V | 0.31 | 0.32 | 48.0 | 0.33 | 0.32 | 49.2 |
| | 5 V | 0.29 | 0.61 | 23.9 | 0.28 | 0.66 | 26.3 |
| Characteristics of Blue Separating Mirror Cell | 0 V | 0.30 | 0.31 | 33.8 | 0.32 | 0.32 | 37.5 |
| | 5 V | 0.15 | 0.15 | 17.6 | 0.13 | 0.14 | 18.9 |

It is found from Table 3 that the color display reflection type liquid crystal display device manufactured has a color purity similar to that of the standard white plate at the voltage of 0 V and has bright red, green and blue colors.

Moreover, the reflection type liquid crystal display device according to the present invention, as shown in FIG. 25, was driven under the condition that the voltage to be applied to each pixel portion at the intersection between each signal electrode 4*a* and each scanning electrode 4*b* is higher than the saturation level of PN-LC5. A variety of beautiful color displays were obtained in combination of the three red, green and blue colors on the bright white background of the paper white.

As another example of the multi-color display, the regions corresponding to the individual segments of the letters of a seven-segment construction of a digital watch were formed by a method similar to the aforementioned color separation layer forming method into the color separation layers of seven kinds of different hues (i.e., red, green, blue, yellow, red purple, blue green and orange). The color separation layers, the liquid crystal panel and the reflection layer 30, thus prepared, were used to manufacture a light scattering mode reflection type liquid crystal display device. This liquid crystal display device was connected with the watch driving IC and the battery and was packaged in the digital wrist watch, as shown in FIG. 33. The display state of the digital digital wrist watch was observed. The individual segments of the letters of the even-segment construction could be displayed in the seven kinds of different clear colors on the background as white as the floss thereby to make a very colorful, bright and attractive display of novel design.

As described above, according to the present invention, it is possible to realize the reflection type liquid crystal display device which can display multiple colors on the bright white background.

(Embodiment 10)

Figure 28:
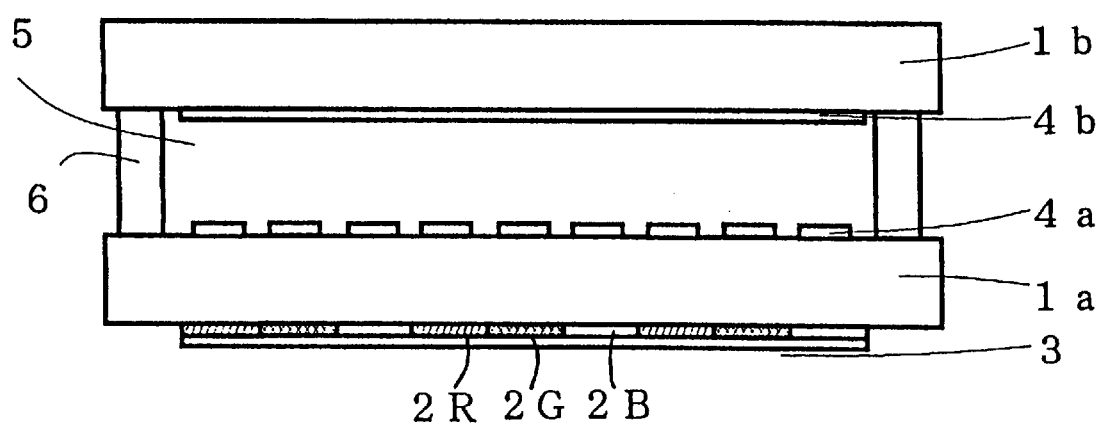
FIG. 28 presents schematic sections showing a reflection type liquid crystal display device of another embodiment of the present invention.

Still another embodiment of the present invention will be described with reference to FIG. 28. FIG. 28 is a schematic section showing a reflection liquid crystal display device which was manufactured according to the manufacture process of the present invention by forming the optically diffuse reflection plate 3 and the color separation layers 2R, 2G and 2B at the side, as opposed to that of Embodiment 8, of the substrate 1*a*.

First of all, the same color separation layers 2R, 2G and 2B as those of Embodiment 8 were formed on one surface of the substrate 1*a*. To the surfaces of the color separation layers 2R, 2G and 2B, there were applied the highly reflective and diffuse optically diffuse reflection plate 3 (i.e., the highly reflective and diffuse reflection SR film of Nemoto & Co., Ltd.) which was prepared by dispersing silver particles or titanium oxide particles homogeneously into the polymer resin film such as the polycarbonate film.

Next, the transparent electrodes 4*a* were formed as in Embodiment 8 on the surface, as opposed to the color separation layers 2R, 2G and 2B and the optically diffuse reflection layer 3, of the substrate 1*a*.

After this, the reflection type liquid crystal display device, as shown in FIG. 27, was manufactured of two kinds of light modulation layers 5 having thicknesses 8 microns and 16 microns by a manufacture process similar to that of Embodiment 8.

As in Embodiment 8, the evaluating reflection type liquid crystal display device was manufactured, and the drive voltages of 0 V and 5 V were applied to the evaluating reflection type liquid crystal display device. The x and y values indicating the color levels (i.e., the XYZ display color system of the standard display color system CIE1931) of the color display, and the Y value indicating the brightness were measured and are enumerated in Table 4 (in the regular reflection eliminated mode by using the spectrophotometer CM2002 of Minolta Camera Co., Ltd.):

TABLE 4

Optical Characteristics of Another Example of
Reflection Type Liquid Crystal Display Device
of the Invention

|  | Applied Voltage | Thickness of Light Modulation Layer | | | | | |
|---|---|---|---|---|---|---|---|
|  |  | 8 μm | | | 16 μm | | |
|  |  | x | y | Y | x | y | Y |
| Characteristics of Standard White Plate | 0 V | 0.31 | 0.31 | 85.2 | 0.31 | 0.31 | 84.7 |
|  | 5 V | 0.31 | 0.32 | 82.2 | 0.31 | 0.32 | 80.9 |
| Characteristics of Red Separating Mirror Cell | 0 V | 0.32 | 0.32 | 42.0 | 0.32 | 0.33 | 46.9 |
|  | 5 V | 0.61 | 0.29 | 14.2 | 0.63 | 0.31 | 15.6 |
| Characteristics of Green Separating Mirror Cell | 0 V | 0.31 | 0.32 | 47.3 | 0.33 | 0.32 | 48.3 |
|  | 5 V | 0.27 | 0.61 | 23.3 | 0.28 | 0.68 | 25.0 |
| Characteristics of Blue Separating Mirror Cell | 0 V | 0.30 | 0.31 | 32.5 | 0.33 | 0.33 | 35.7 |
|  | 5 V | 0.15 | 0.12 | 16.1 | 0.13 | 0.12 | 18.8 |

It is found from Table 4 that the color display reflection type liquid crystal display device manufactured has a color purity similar to that of the standard white plate at the voltage of 0 V and has bright red, green and blue colors.

Moreover, the reflection type liquid crystal display device according to the present invention, as shown in FIG. 25, was driven under the condition that the voltage to be applied to each pixel portion at the intersection between each signal electrode 4a and each scanning electrode 4b is higher than the saturation level of PN-LC5. A variety of beautiful color displays were obtained in combination of the three red, green and blue colors on the bright white background of the paper white.

As another example of the multi-color display, the regions corresponding to the individual segments of the letters of a seven-segment construction of a digital watch were formed by a method similar to the aforementioned color separation layer forming method into the color separation layers of seven kinds of different hues (i.e., red, green, blue, yellow, red purple, blue green and orange). The color separation layers, the liquid crystal panel and the reflection layer 30, thus prepared, were used to manufacture a light scattering mode reflection type liquid crystal display device. This liquid crystal display device was connected with the watch driving IC and the battery and was packaged in the digital wrist watch, as shown in FIG. 33. The display state of the digital digital wrist watch was observed. The individual segments of the letters of the even-segment construction could be displayed in the seven kinds of different clear colors on the background as white as the floss thereby to make a very colorful, bright and attractive display of novel design.

As described above, according to the present invention, it is possible to realize the reflection type liquid crystal display device which can display multiple colors on the bright white background.

(Embodiment 11)

Figure 29:
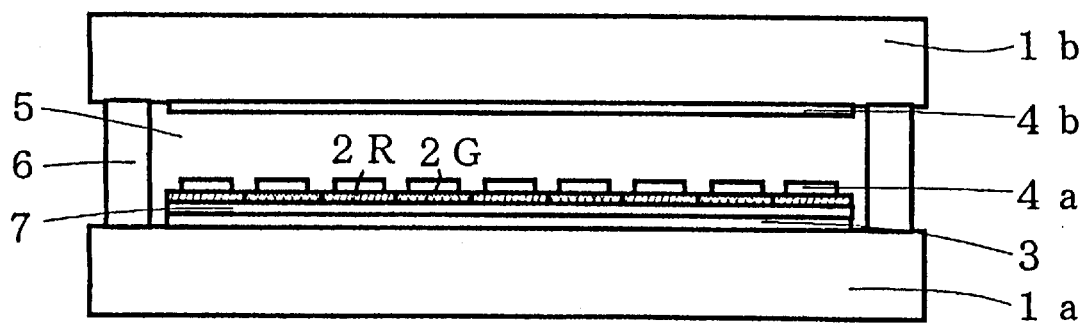
FIG. 29 presents schematic sections showing a reflection type liquid crystal display device of another embodiment of the present invention.

Still another embodiment of the present invention will be described with reference to FIG. 29. As shown in FIG. 29, the optically diffuse reflection plate 3 was formed on the substrate 1a, and a highly transparent polymer resin was then applied by the spinner so as to smoothen the surface. This polymer resin, as designated by 7, can be exemplified by a leveling material such as V259-PA of Nippon Steel Chemical Co., Ltd. or SS6699 of Japan Synthetic Rubber Co., Ltd., as used as a protection film for the color filter. These materials are highly heat-resistant and suitable for filming the transparent electrodes ITO by the sputtering method or the vacuum evaporation method so that they can film the dielectric thin film properly. In the present embodiment, the material V259-PA was applied to a thickness of 2 microns so that the surface roughness lowers from RA=1,000 to RA=15 to provide an excellent smoothness.

Then, two kinds of color separation layer patterns 2R and 2B and a transparent electrode pattern 4a were formed to manufacture a reflection type liquid crystal display device similar to that of Embodiment 8.

By a manufacture process similar to that of Embodiment 8, moreover, the reflection type liquid crystal display device shown in FIG. 29 was manufactured of two kinds of light modulation layers 5 having thicknesses of 8 microns and 16 microns.

As in Embodiment 8, the evaluating reflection type liquid crystal display device was manufactured, and the drive voltages of 0 V and 5 V were applied to the evaluating reflection type liquid crystal display device. The x and y values indicating the color levels (i.e., the XYZ display color system of the standard display color system CIE1931) of the color display, and the Y value indicating the brightness were measured and are enumerated in Table 5 (in the regular reflection eliminated mode by using the spectro-photometer CM2002 of Minolta Camera Co., Ltd.):

TABLE 5

Optical Characteristics of Another Example of
Reflection Type Liquid Crystal Display Device
of the Invention

|  | Applied Voltage | Thickness of Light Modulation Layer | | | | | |
|---|---|---|---|---|---|---|---|
|  |  | 8 μm | | | 16 μm | | |
|  |  | x | y | Y | x | y | Y |
| Characteristics of Standard White Plate | 0 V | 0.31 | 0.31 | 85.2 | 0.31 | 0.31 | 84.7 |
|  | 5 V | 0.31 | 0.32 | 82.2 | 0.31 | 0.32 | 80.9 |
| Characteristics of Red Separating Mirror Cell | 0 V | 0.33 | 0.33 | 40.5 | 0.33 | 0.33 | 43.1 |
|  | 5 V | 0.60 | 0.28 | 14.0 | 0.62 | 0.33 | 14.6 |
| Characteristics of Green Separating Mirror Cell | 0 V | 0.32 | 0.32 | 45.2 | 0.33 | 0.32 | 47.4 |
|  | 5 V | 0.29 | 0.58 | 22.7 | 0.29 | 0.65 | 24.2 |

It is found from Table 5 that the color display reflection type liquid crystal display device manufactured has a color purity similar to that of the standard white plate at the voltage of 0 V and has bright red and green colors.

Moreover, the reflection type liquid crystal display device according to the present invention, as shown in FIG. 25, was driven under the condition that the voltage to be applied to each pixel portion at the intersection between each signal electrode 4a and each scanning electrode 4b is higher than the saturation level of PN-LC5. A variety of beautiful color displays were obtained in combination of the two red and green colors on the bright white background of the paper white.

As another example of the multi-color display, the regions corresponding to the individual segments of the letters of a seven-segment construction of a digital watch were formed by a method similar to the aforementioned color separation layer forming method into the color separation layers of seven kinds of different hues (i.e., red, green, blue, yellow, red purple, blue green and orange). The color separation layers, the liquid crystal panel and the reflection layer 30, thus prepared, were used to manufacture a light scattering mode reflection type liquid crystal display device. This liquid crystal display device was connected with the watch driving IC and the battery and was packaged in the digital wrist watch, as shown in FIG. 33. The display state of the digital digital wrist watch was observed. The individual segments of the letters of the even-segment construction could be displayed in the seven kinds of different clear colors on the background as white as the floss thereby to make a very colorful, bright and attractive display of novel design.

As described above, according to the present invention, it is possible to realize the reflection type liquid crystal display device which can display multiple colors on the bright white background.

It is quite natural that the reflection type liquid crystal display device according to the present invention can be combined with either a two-terminal element such as the MIM or a three-terminal element such as the TFT thereby to improve the display characteristics.

According to the present invention, as has been described hereinbefore, the reflection type liquid crystal display device comprises: a light modulation layer having a light scattering state changed by controlling a voltage; at least one kind of color separation layer arranged at the back of the light modulation layer; and a reflection layer arranged at the back of the color separation layer. The light modulation layer is made of a polymer network type polymer dispersed liquid crystal layer or a phase conversion liquid crystal layer. The color separation layer is made of a cholesteric liquid crystal polymer layer or a dielectric multi-layered thin film. The reflection layer is made of a white diffuse reflection layer. The light modulation layer comes, when the voltage is not applied, into a scattered state like the paper white, and, when applied, into a highly transparent state so that an arbitrary color such as the red, blue or green color can be reconstructed as a highly pure color to provide an excellent contrast by the combined action of the color separation layer and the reflection layer. Thus, it is possible to provide a reflection type liquid crystal display device which can realize a high display quality.

Even when the color separation layer is made of a volume hologram layer whereas the reflection layer is made of a mirror layer of aluminum or silver, it is also possible to provide a reflection type liquid crystal display device which can realize a highly bright white like the paper white, a hue of highly pure color and a high display quality.

Since the light modulation layer is made of the polymer network type polymer dispersed type liquid crystal layer or phase conversion liquid crystal layer, satisfactory scattering characteristics and a drastic reduction in the voltage can be simultaneously achieved to find a highly appropriate application to a portable device requiring a low voltage and a low power consumption.

Moreover, an ultraviolet ray cut-off layer and a reflection preventing layer are formed to improve the visibility of the displayed content, as might otherwise be deteriorated by the reflection of an ambient light, and the deterioration of the liquid crystal is prevented from being deteriorated by the ultraviolet ray. As a result, it is possible to provide a highly reliable reflection type liquid crystal display device.

By using a reflection layer having photo-storage characteristics, moreover, it is possible to provide a power economy type reflection type liquid crystal display device for a bright display state, which can store the optical energy when the atmosphere is bright, so that the reflection layer itself can emit a light, when the atmosphere is dark, to make the display visible even in the dark atmosphere.

By using a reflection layer having fluorescent characteristics, moreover, a light such as an ultraviolet ray within a wavelength range disabling the human eyes to view can be efficiently converted into a light in a visible light region. Thus, it is possible to provide a reflection type liquid crystal display device which can realize a brighter and clear display.

Moreover, the cholesteric liquid crystal polymer layer can be prepared, when used as the color separation layer, from a less expensive material and by a easier manufacture process than the manufacture cost for the remaining color separation layers. The color separation layer can be prepared at a drastically low cost to lower the cost for the reflection type liquid crystal display device.

By using a color separation layer patterned with a plurality of colors, moreover, it is possible to provide a reflection type liquid crystal display device which can display multiple clear colors of high purity. Still moreover, it is possible to provide an apparatus and a process for the manufacture, which are not basically different from those of the prior art but more applicable and economical.

What is claimed is:

1. In a reflection type liquid crystal display device comprising a light modulation layer disposed between a pair of electrodes, at least one of which is transparent electrode, the light modulation layer being controlled to take on one of a light scattering state and light transmitting state in accordance with a voltage applied between the electrodes; at least one color separation layer mounted at the back of the light modulation layer; and a reflection layer mounted at the back of the color separation layer; wherein the color separation layer comprises one of a cholesteric liquid crystal polymer layer for reflecting light within a predetermined wavelength range and a dielectric multi-layered thin film for transmitting a light within a predetermined wavelength range and reflecting light outside the predetermined wavelength range.

2. A reflection type liquid crystal display device according to claim 1; wherein the light modulation layer is one of a polymer dispersed liquid crystal layer and a phase conversion liquid crystal layer having light scattering characteristics which are changed when the voltage is applied between the electrodes.

3. A reflection type liquid crystal display device according to claim 2; wherein the polymer dispersed liquid crystal layer comprises a liquid crystal material forming a continuous layer and a three-dimensional net-shaped photo-setting resin in the continuous layer.

4. A reflection type liquid crystal display device according to claim 2; wherein the phase conversion type liquid crystal layer has one of a planar texture and a focal conic texture and is stabilized by a three-dimensional net-shape photo-setting resin dispersed in a liquid crystal material.

5. A reflection type liquid crystal display device according to claim 1; wherein the color separation layer is formed of a cholesteric liquid crystal polymer layer which reflects light of a predetermined wavelength range selectively.

6. A reflection type liquid crystal display device according to claim 5; wherein the color separation layer is produced by a process comprising the steps of forming a fundamental reflection unit comprising a first cholesteric liquid crystal polymer layer for selectively reflecting a clockwise circular polarized light within a predetermined wavelength range of the visible light spectrum and a second cholesteric liquid crystal polymer layer for selectively reflecting a counter-clockwise circular polarized light of the predetermined wavelength, the first and second cholesteric liquid crystal polymer layers being arranged to have optical axes in parallel; and laminating at least one fundamental reflection unit of the first and second cholesteric liquid crystal polymer layers each having a different range of wavelengths of selective reflection in the visible light spectrum.

7. A reflection type liquid crystal display device according to claim 5; wherein the color separation layer is produced by a process comprising the steps of forming a fundamental reflection unit comprising a first cholesteric liquid crystal polymer layer for selectively reflecting a clockwise circular polarized light within a predetermined wavelength range of the visible light spectrum and a second cholesteric liquid crystal polymer layer for selectively reflecting a counter-clockwise circular polarized light of the predetermined wavelength, the first and second cholesteric liquid crystal polymer layers being arranged to have optical axes in parallel; and arranging in a common plane a plurality of the fundamental reflection units of the first and second cholesteric liquid crystal polymer layers each having a different range of wavelengths of selective reflection in the visible light spectrum.

8. A reflection type liquid crystal display device according to claim 6; wherein the process further comprises the steps of providing in a common plane a plurality of and laminating at least one fundamental reflection unit of the first and second cholesteric liquid crystal polymer layers each having a different range of wavelengths of selective reflection in the visible light spectrum.

9. A reflection type liquid crystal display device according to claim 5; wherein the color separation layer is produced by a process comprising the steps of forming a fundamental reflection unit comprising first and second opposing cholesteric liquid crystal polymer layers overlapped to have parallel optical axes for selectively reflecting circular polarized lights within a predetermined equal wavelength range in the visible light region and in the same turning direction, and a conversion element sandwiched between the cholesteric liquid crystal polymer layers for converting the phase of light within the predetermined identical wavelength range by 180 degrees; and laminating at least one of the fundamental reflection units of cholesteric liquid crystal polymer layers each having a different range of wavelengths of selective reflection in the visible light spectrum.

10. A reflection type liquid crystal display device according to claim 5; wherein the color separation layer is produced by a process comprising the steps of forming a fundamental reflection unit comprising first and second opposing cholesteric liquid crystal polymer layers overlapped to have parallel optical axes for selectively reflecting circular polarized lights within a predetermined equal wavelength range in the visible light region and in the same turning direction, and a conversion element sandwiched between the first and second cholesteric liquid crystal polymer layers for converting the phase of light within the predetermined identical wavelength range by 180 degrees; and arranging in a common plane a plurality of the fundamental reflection units of cholesteric liquid crystal polymer layers each having a different range of wavelengths of selective reflection in the visible light spectrum.

11. A reflection type liquid crystal display device according to claim 9: wherein the color separation layer is produced by a process comprising the steps of forming in a common plane a plurality of and laminating at least one fundamental reflection unit of the first and second cholesteric liquid crystal polymer layers each having a different range of wavelengths of selective reflection in the visible light spectrum.

12. A reflection type liquid crystal display device according to claim 1; wherein the color separation layer comprises a dielectric multi-layered thin film for transmitting light within a predetermined wavelength range in the visible light spectrum and ultraviolet light within a wavelength range of 370 nm to 400 nm and reflecting substantially all remaining light.

13. A reflection type liquid crystal display device according to claim 1; wherein the color separation layer is patterned to provide a display having a plurality of different display characteristics.

14. A reflection type liquid crystal display device according to claim 13; wherein the pattern of the color separation layer produces multi-color display segments.

15. A reflection type liquid crystal display device according to claim 1; wherein the reflection layer is a diffuse reflection layer having a substantially uniform diffuse reflectivity over the whole wavelength range of the visible light spectrum.

16. A reflection type liquid crystal display device according to claim 1; wherein the reflection layer has photo-storing characteristics.

17. A reflection type liquid crystal display device according to claim 1; wherein the reflection layer has fluorescent characteristics.

18. A reflection type liquid crystal display device according to claim 1; wherein the color separation layer is a hologram layer, and wherein the reflection layer is a mirror layer.

19. A reflection type liquid crystal display device according to claim 18; wherein the hologram layer is a Bragg reflection layer.

20. A reflection type liquid crystal display device according to claim 19; wherein the Bragg reflection layer is a volume hologram.

21. A reflection type liquid crystal display device according to claim 20; wherein the interference fringe of the volume hologram has an angle of no more than 30 degrees with respect to the electrodes.

22. A reflection type liquid crystal display device according to claim 18; wherein the mirror layer is one of a metallic and a dielectric multi-layered film containing at least one of a metal selected from the group consisting of aluminum, silver, nickel, chromium, palladium, rhodium, and an alloy or oxide of any one of said metals.

23. A reflection type liquid crystal display device according to claim 1; further comprising a reflection preventing layer and an ultraviolet ray cut-off layer arranged closest to an observation surface of the display device for absorbing or reflecting ultraviolet light harmful to the liquid crystal.

24. A reflection type liquid crystal display device according to claim 23; wherein the ultraviolet ray cut-off layer absorbs or reflects ultraviolet light having a wavelength of no more than 370 nm and transmits substantially all remaining light.

25. A reflection type liquid crystal display device according to claim 1; wherein the light modulation layer comprises one of a polymer dispersed liquid crystal layer having a liquid crystal material forming a continuous layer and a three-dimensional net-shaped photo-setting resin in the continuous layer, a cholesteric/nematic phase conversion liquid crystal layer, and a phase conversion liquid crystal layer having one of a planar texture and a focal conic texture stabilized by a three-dimensional net-shaped photo-setting resin dispersed in a liquid crystal material.

26. A reflection type liquid crystal display device according to claim 3; wherein an average pore size of the three-dimensional net-shaped photo-setting resin is within the range of 0.5 to 3.5 microns.

27. A reflection type liquid crystal display device according to claim 26; wherein the average pore size of the three-dimensional net-shaped photo-setting resin structure is within the range of 0.8 to 1.8 microns.

28. A reflection type liquid crystal display device according to claim 3; wherein the ratio of liquid crystal material to the photo-setting resin is within range of about 60 to 99%.

29. A reflection type liquid crystal display device according to claim 28; wherein the ratio of liquid crystal material to the photo-setting resin is within range of about 75 to 95%.

30. A reflection type liquid crystal display device according to claim 3; wherein the photo-setting resin comprises a precursor of a polymer resin having a copolymerizable photo-polymerizing group.

31. A reflection type liquid crystal display device according to claim 30; wherein the copolymerizable photo-polymerizing group is selected from the group consisting of meta-acrylols, acrylates and meta-acrylates.

32. A reflection type liquid crystal display device according to claim 1; wherein the light modulation layer comprises a phase conversion type liquid crystal having a chiral agent mixed with a nematic liquid crystal material having a positive or negative dielectric anisotropy.

33. A reflection type liquid crystal display device according to claim 32; wherein the nematic liquid crystal comprises one of a cyano, fluorine or chlorine type liquid crystal material.

34. A reflection type liquid crystal display device according to claim 32; wherein the mixing ratio between the nematic liquid crystal and the chiral agent is set to impart a chiral pitch of 0.2 to 5.0 microns.

35. A reflection type liquid crystal display device according to claim 5; wherein the cholesteric liquid crystal polymer layer is formed by a process comprising the steps of providing a cholesteric structure having a mixture of a lyotropic cholesteric liquid crystal and a solvent of photo-polymerizable unsaturated monomer, and photo-polymerizing and solidifying the cholesteric structure.

36. A reflection type liquid crystal display device according to claim 15; wherein the diffuse reflection layer has a sufficient thickness to prevent influence of a colored object disposed therebehind.

37. A reflection type liquid crystal display device according to claim 15; wherein the diffuse reflection layer comprises one of a polymer film and an inorganic substance.

38. A reflection type liquid crystal display device according to claim 37; wherein the diffuse reflection layer comprises barium sulfate.

39. A reflection type liquid crystal display device according to claim 15; wherein the diffuse reflection layer comprises a metallic film coated with glass beads.

40. A reflection type liquid crystal display device according to claim 16; wherein the photo-storing characteristics are provided by including in the reflection layer a rare earth element and a mother crystal comprising strontium aluminate.

41. A reflection type liquid crystal display device according to claim 1; wherein at least one of the electrodes is patterned to provide a multi-pixel display so that the display device may display at least one of characters, segments, and a dot matrix.

42. A reflection type liquid crystal display device according to claim 41; further comprising a switching element provided at each pixel.

43. A reflection type liquid crystal display device according to claim 1; further comprising a pair of opposing substrates on which the electrodes are formed.

44. A reflection type liquid crystal display device according to claim 43; wherein the substrates are formed of one of glass and a flexible plastic.

45. A reflection type liquid crystal display device according to claim 1; further comprising means for applying an image signal to the transparent electrode so that the light modulation layer is brought into a light transmitting state when the applied signal is at a high voltage level and a light scattering state when the applied signal is at a low voltage level.

46. A reflection type liquid crystal display device according to claim 1; further comprising means for applying an image signal to the transparent electrode so that the light modulation layer is brought into a light transmitting state when the applied signal is at a low voltage level and a light scattering state when the applied signal is at a high voltage level.

47. A wristwatch having time counting means and display means; wherein the display means comprises the reflection type liquid crystal display device according to claim 1.

48. A reflection type liquid crystal display device comprising: a pair of opposing electrodes disposed to form a gap therebetween, at least one of which is transparent; a light modulation layer disposed in the gap between the opposed electrodes, the light modulation layer being controlled to take on one of a light scattering state and a light transmitting state in accordance with a voltage applied across the electrodes; at least one non-absorptive color separation layer disposed on the light modulation layer so as to selectively reflect light within a predetermined range of wavelengths and transmit substantially all remaining light; and a reflection layer disposed on the color separation layer; wherein the light modulation layer comprises one of a polymer dispersed liquid crystal layer having a liquid crystal material forming a continuous layer and a three-dimensional net-shaped photo-setting resin in the continuous layer, a cholesteric/nematic phase conversion liquid crystal layer, and a phase conversion liquid crystal layer having one of a planar texture and a focal conic texture stabilized by a three-dimensional net-shaped photo-setting resin dispersed in a liquid crystal material.

49. A reflection type liquid crystal display device according to claim 48; wherein the light modulation layer comprises a polymer dispersed liquid crystal layer in which an average pore size of the three-dimensional net-shaped photo-setting resin structure is within the range of 0.5 to 3.5 microns.

50. A reflection type liquid crystal display device according to claim 49; wherein the average pore size of the three-dimensional net-shaped photo-setting resin structure is within the range of 0.8 to 1.8 microns.

51. A reflection type liquid crystal display device according to claim 49; wherein the ratio of liquid crystal material to the photo-setting resin is within range of about 60 to 99%.

52. A reflection type liquid crystal display device according to claim 51; wherein the ratio of liquid crystal material to the photo-setting resin is within range of about 75 to 95%.

53. A reflection type liquid crystal display device according to claim 48; wherein the photo-setting resin comprises a precursor of a polymer resin having a copolymerizable photo-polymerizing group.

54. A reflection type liquid crystal display device according to claim 53; wherein the copolymerizable photo-polymerizing group is selected from the group consisting of meta-acrylols, acrylates and meta-acrylates.

55. A reflection type liquid crystal display device according to claim 48; wherein the light modulation layer comprises a phase conversion type liquid crystal having a chiral agent mixed with a nematic liquid crystal material having a positive or negative dielectric anisotropy.

56. A reflection type liquid crystal display device according to claim 55; wherein the nematic liquid crystal comprises one of a cyano, fluorine or chlorine type liquid crystal material.

57. A reflection type liquid crystal display device according to claim 55; wherein the mixing ratio between the nematic liquid crystal and the chiral agent is set to impart a chiral pitch of 0.2 to 5.0 microns.

58. A reflection type liquid crystal display device according to claim 48; wherein the color separation layer comprises a cholesteric liquid crystal polymer layer which selectively reflects light of a predetermined wavelength range.

59. A reflection type liquid crystal display device according to claim 58; wherein the cholesteric liquid crystal polymer layer is formed by a process comprising the steps of providing a cholesteric structure having a mixture of a lyotropic cholesteric liquid crystal and a solvent of photo-polymerizable unsaturated monomer, and photo-polymerizing and solidifying the cholesteric structure.

60. A reflection type liquid crystal display device according to claim 48; wherein the color separation layer comprises a cholesteric liquid crystal polymer layer having a plurality of fundamental reflection units each comprising a first cholesteric liquid crystal polymer layer for selectively reflecting a clockwise circular polarized light within a predetermined wavelength range of the visible light spectrum and a second cholesteric liquid crystal polymer layer for selectively reflecting a counter-clockwise circular polarized light of the predetermined wavelength, the first and second cholesteric liquid crystal polymer layers being arranged to have optical axes in parallel; wherein each of the fundamental reflection units forming the color separation layer has a different range of wavelengths of selective reflection in the visible light spectrum.

61. A reflection type liquid crystal display device according to claim 60; wherein a plurality of the fundamental reflection units are laminated to each other to provide a multi-color display.

62. A reflection type liquid crystal display device according to claim 60; wherein a plurality of the fundamental reflection units are formed in the same plane to provide a multi-color display.

63. A reflection type liquid crystal display device according to claim 60; wherein two or more fundamental reflection units each having a different range of wavelengths of selective reflection in the visible light spectrum are laminated to produce a reflection unit having a desired range of wavelengths of selective reflection different from the individual range of wavelengths of selective reflection of each of the two or more individual fundamental reflection units.

64. A reflection type liquid crystal display device according to claim 48; wherein the color separation layer comprises a cholesteric liquid crystal polymer layer having a plurality of fundamental reflection units each comprising first and second opposing cholesteric overlapping liquid crystal polymer layers having parallel optical axes for selectively reflecting circular polarized light within a predetermined equal wavelength range in the visible light region and in the same turning direction, and a conversion element sandwiched between the first and second cholesteric liquid crystal polymer layers for converting the phase of light within the predetermined identical wavelength range by 180 degrees.

65. A reflection type liquid crystal display device according to claim 64; wherein a plurality of the fundamental reflection units are laminated to each other to provide a multi-color display.

66. A reflection type liquid crystal display device according to claim 64; wherein a plurality of the fundamental reflection units are formed in the same plane to provide a multi-color display.

67. A reflection type liquid crystal display device according to claim 64; wherein two or more fundamental reflection units each having a different range of wavelengths of selective reflection in the visible light spectrum are laminated to produce a reflection unit having a desired range of wavelengths of selective reflection different from the individual range of wavelengths of selective reflection of each of the two or more individual fundamental reflection units.

68. A reflection type liquid crystal display device according to claim 48; wherein the color separation layer comprises a dielectric multi-layered thin film.

69. A reflection type liquid crystal display device according to claim 68; wherein the dielectric multi-layered thin film transmits light within a predetermined wavelength range in the visible light spectrum and ultraviolet light within a wavelength range of 370 nm to 400 nm and reflects substantially all other light.

70. A reflection type liquid crystal display device according to claim 68; wherein the dielectric multi-layered thin film comprises a plurality of alternately laminated highly transparent dielectric thin films having relatively high refractive indexes and transparent dielectric thin films having relatively low refractive indexes.

71. A reflection type liquid crystal display device according to claim 48; wherein the color separation layer is patterned to provide a display having a plurality of different display characteristics.

72. A reflection type liquid crystal display device according to claim 71; wherein the pattern of the color separation layer produces multi-color display segments.

73. A reflection type liquid crystal display device according to claim 48; wherein the reflection layer comprises a diffuse reflection layer having a substantially uniform diffuse reflectivity over substantially the entire visible light spectrum.

74. A reflection type liquid crystal display device according to claim 73; wherein the diffuse reflection layer has a sufficient thickness to prevent influence of a colored object disposed therebehind.

75. A reflection type liquid crystal display device according to claim 73; wherein the diffuse reflection layer comprises one of a polymer film and an inorganic substance.

76. A reflection type liquid crystal display device according to claim 73; wherein the diffuse reflection layer comprises barium sulfate.

77. A reflection type liquid crystal display device according to claim 73; wherein the diffuse reflection layer comprises a metallic film coated with glass beads.

78. A reflection type liquid crystal display device according to claim 48; wherein the reflection layer has photo-storing characteristics.

79. A reflection type liquid crystal display device according to claim 78; wherein the photo-storing characteristics are provided by including in the reflection layer a rare earth element and a mother crystal comprising strontium aluminate.

80. A reflection type liquid crystal display device according to claim 48; wherein the reflection layer has fluorescent characteristics.

81. A reflection type liquid crystal display device according to claim 48; wherein the color separation layer comprises a hologram layer, and the reflection layer comprises a mirror layer.

82. A reflection type liquid crystal display device according to claim 81; wherein the hologram layer is a Bragg reflection layer.

83. A reflection type liquid crystal display device according to claim 82; wherein the Bragg reflection layer is a volume hologram.

84. A reflection type liquid crystal display device according to claim 83; wherein the interference fringe of the volume hologram has an angle of no more than 30 degrees with respect to opposed surfaces of the electrodes.

85. A reflection type liquid crystal display device according to claim 81; wherein the mirror layer comprises one of a metallic and a dielectric multi-layered film containing at least one of a metal selected from the group consisting of aluminum, silver, nickel, chromium, palladium, rhodium, and an alloy or oxide of any one of said metals.

86. A reflection type liquid crystal display device according to claim 48; further comprising a reflection preventing layer and an ultraviolet ray cut-off layer arranged closest to an observation surface of the display device for absorbing or reflecting ultraviolet light harmful to the liquid crystal.

87. A reflection type liquid crystal display device according to claim 86; wherein the ultraviolet ray cut-off layer absorbs or reflects ultraviolet light of a wavelength of no more than 370 nm and to transmit substantially all remaining light.

88. A reflection type liquid crystal display device according to claim 48; wherein at least one of the electrodes is patterned to provide a multi-pixel display so that the display device may display at least one of characters, segments and a dot matrix.

89. A reflection type liquid crystal display device according to claim 48; further comprising a switching element provided at each pixel.

90. A reflection type liquid crystal display device according to claim 48; further comprising a pair of opposing substrates on which the electrodes are provided.

91. A reflection type liquid crystal display device according to claim 90; wherein the substrates formed of one of glass and a flexible plastic.

92. A reflection type liquid crystal display device according to claim 48; further comprising means for applying an image signal to the transparent electrode so that the light modulation layer is brought into a light transmitting state when the applied signal is at a high voltage level and a light scattering state when the applied signal is at a low voltage level.

93. A reflection type liquid crystal display device according to claim 48; further comprising means for applying an image signal to the transparent electrode so that the light modulation layer is brought into a light transmitting state when the applied signal is at a low voltage level and a light scattering state when the applied signal is at a high voltage level.

94. A wristwatch having time counting means and display means; wherein the display means comprises the reflection type liquid crystal display device according to claim 48.

95. A reflection type liquid crystal display device comprising: a pair of opposed electrodes, at least one of which is transparent; a light modulation layer disposed between the opposed electrodes, the light modulation layer being controlled to take on one of a light scattering state and a light transmitting state in response to a voltage applied across the opposed electrodes; at least one color separation layer disposed on the light modulation layer; and a reflection layer disposed on the at least one color separation layer; wherein the light modulation layer comprises one of a polymer dispersed liquid crystal layer having a liquid crystal material forming a continuous layer and a three-dimensional, net-shaped photo-setting resin in the continuous layer, and a phase conversion liquid crystal layer having one of a planar texture and a focul conic texture stabilized by a three-dimensional net-shaped photo-setting resin dispersed in a liquid crystal material; wherein the color separation layer comprises a dielectric multi-layered thin film for transmitting light within a wavelength range of 370 nm to 400 nm and for reflecting substantially all remaining light; and wherein the reflection layer comprises a diffuse reflection layer having a uniform thickness in the visible light spectrum.

96. A wristwatch having time counting means and display means; wherein the display means comprises the reflection type liquid crystal display device according to claim 95.

* * * * *